(12) United States Patent
Cedrone et al.

(10) Patent No.: US 8,753,097 B2
(45) Date of Patent: Jun. 17, 2014

(54) METHOD AND SYSTEM FOR HIGH VISCOSITY PUMP

(75) Inventors: James Cedrone, Braintree, MA (US);
George Gonnella, Pepperell, MA (US);
Iraj Gashgaee, Marlborough, MA (US);
Ralph J. Stankowski, Westford, MA (US)

(73) Assignee: Entegris, Inc., Billerica, MA (US)

( * ) Notice: Subject to any disclaimer, the term of this patent is extended or adjusted under 35 U.S.C. 154(b) by 912 days.

(21) Appl. No.: 12/218,325

(22) Filed: Jul. 14, 2008

(65) Prior Publication Data

US 2009/0047143 A1     Feb. 19, 2009

Related U.S. Application Data

(63) Continuation-in-part of application No. 11/602,464, filed on Nov. 20, 2006, now Pat. No. 8,087,429.

(60) Provisional application No. 60/742,435, filed on Dec. 5, 2005.

(51) Int. Cl.
*F04B 17/00* (2006.01)

(52) U.S. Cl.
USPC ........................................ 417/413.1; 137/884

(58) Field of Classification Search
USPC .......... 417/413.1; 137/884; 210/134, 188, 767
See application file for complete search history.

(56) References Cited

U.S. PATENT DOCUMENTS

| | | | |
|---|---|---|---|
| 269,626 A | 12/1882 | Bodel et al. | |
| 826,018 A | 7/1906 | Concoff | |
| 1,664,125 A | 3/1928 | Lowrey | |
| 2,153,664 A | 4/1939 | Freedlander | |
| 2,215,505 A | 9/1940 | Hollander | |
| 2,328,468 A | 8/1943 | Laffly | |
| 2,457,384 A | 12/1948 | Krenz | |
| 2,631,538 A | 3/1953 | Johnson | |
| 2,673,522 A | 3/1954 | Dickey | |
| 2,757,966 A | 8/1956 | Samiran | |
| 3,072,058 A | 1/1963 | Christopher et al. | |

(Continued)

FOREIGN PATENT DOCUMENTS

| | | |
|---|---|---|
| AU | B-78872/87 | 4/1988 |
| CA | 1 271 140 | 7/1990 |

(Continued)

OTHER PUBLICATIONS

International Preliminary Report on Patentability, Chapter I, issued in PCT/US2006/044985, mailed Jun. 23, 2008, 5 pgs.

(Continued)

*Primary Examiner* — Devon Kramer
*Assistant Examiner* — Patrick Hamo
(74) *Attorney, Agent, or Firm* — Sprinkle IP Law Group

(57) ABSTRACT

Embodiments described herein provide systems and methods for high viscosity pumps including a noncompliant filter. One embodiment can include a multi-stage pump comprising an pump inlet flow path, a pump outlet flow path, a feed stage in fluid communication with the pump inlet flow path, a dispense stage in fluid communication with the feed stage and the pump outlet flow path, a noncompliant disposable filter for high viscosity fluid in a flow path between the feed stage and the dispense stage and a set of valves to selectively allow fluid flow through the multi-stage pump.

21 Claims, 43 Drawing Sheets

(56) References Cited

U.S. PATENT DOCUMENTS

| | | |
|---|---|---|
| 3,227,279 A | 1/1966 | Bokelman |
| 3,250,225 A | 5/1966 | Taplin |
| 3,327,635 A | 6/1967 | Sachnik |
| 3,623,661 A | 11/1971 | Wagner |
| 3,660,200 A | 5/1972 | Anderson et al. |
| 3,741,298 A | 6/1973 | Canton |
| 3,895,748 A | 7/1975 | Klingenberg |
| 3,954,352 A | 5/1976 | Sakai |
| 3,977,255 A | 8/1976 | Groleau et al. |
| 4,023,592 A | 5/1977 | Patzke et al. |
| 4,093,403 A | 6/1978 | Schrimpf |
| 4,452,265 A | 6/1984 | Lonnebring |
| 4,483,665 A | 11/1984 | Hauser |
| 4,541,455 A | 9/1985 | Hauser |
| 4,597,719 A | 7/1986 | Tano et al. |
| 4,597,721 A | 7/1986 | Santefort |
| 4,601,409 A | 7/1986 | DiRegolo |
| 4,605,591 A | 8/1986 | Nose et al. |
| 4,614,438 A | 9/1986 | Kobayashi |
| 4,671,545 A | 6/1987 | Miyazaki |
| 4,690,621 A | 9/1987 | Swain |
| 4,699,298 A | 10/1987 | Grant et al. |
| 4,705,461 A | 11/1987 | Clements |
| 4,797,834 A | 1/1989 | Honganen et al. |
| 4,808,077 A | 2/1989 | Kan et al. |
| 4,810,168 A | 3/1989 | Nogami et al. |
| 4,821,997 A | 4/1989 | Zdeblick |
| 4,824,073 A | 4/1989 | Zdeblick |
| 4,827,110 A | 5/1989 | Rossi et al. |
| 4,865,525 A | 9/1989 | Kern |
| 4,891,254 A | 1/1990 | Bianco |
| 4,913,624 A | 4/1990 | Seki et al. |
| 4,915,126 A | 4/1990 | Gyllinder |
| 4,943,032 A | 7/1990 | Zdeblick |
| 4,950,134 A | 8/1990 | Bailey et al. |
| 4,952,386 A | 8/1990 | Davison |
| 4,965,933 A | 10/1990 | Mraz et al. |
| 4,966,646 A | 10/1990 | Zdeblick |
| 5,061,156 A | 10/1991 | Kuehne et al. |
| 5,061,574 A | 10/1991 | Henager, Jr. et al. |
| 5,062,770 A | 11/1991 | Story |
| 5,108,015 A | 4/1992 | Rauworth et al. |
| 5,134,962 A | 8/1992 | Amada |
| 5,135,031 A | 8/1992 | Burgess |
| 5,152,057 A | 10/1992 | Murphy |
| 5,167,837 A | 12/1992 | Snodgrass et al. |
| 5,192,198 A | 3/1993 | Gebauer et al. |
| 5,194,327 A | 3/1993 | Takahashi et al. |
| 5,203,060 A | 4/1993 | Mraz et al. |
| 5,230,445 A | 7/1993 | Rusnak |
| 5,261,442 A | 11/1993 | Kingsford et al. |
| 5,262,068 A * | 11/1993 | Bowers et al. ............... 210/767 |
| 5,312,233 A | 5/1994 | Tanny et al. |
| 5,316,181 A | 5/1994 | Burch |
| 5,318,413 A | 6/1994 | Bertoncini |
| 5,336,884 A | 8/1994 | Khoshnevisan et al. |
| 5,344,195 A | 9/1994 | Parimore, Jr. et al. |
| 5,344,703 A | 9/1994 | Kovar et al. |
| 5,350,200 A | 9/1994 | Peterson et al. |
| 5,380,019 A | 1/1995 | Hillery et al. |
| 5,389,769 A | 2/1995 | Yamashita et al. |
| 5,420,757 A | 5/1995 | Eberhardt et al. |
| 5,434,774 A | 7/1995 | Seberger |
| 5,448,110 A | 9/1995 | Tuttle et al. |
| 5,476,004 A | 12/1995 | Kingsford |
| 5,490,765 A | 2/1996 | Bailey et al. |
| 5,511,797 A | 4/1996 | Nikirk et al. |
| 5,516,429 A | 5/1996 | Snodgrass et al. |
| 5,526,956 A | 6/1996 | Osgar |
| 5,527,161 A | 6/1996 | Bailey et al. |
| 5,528,222 A | 6/1996 | Moskowitz et al. |
| 5,546,009 A | 8/1996 | Raphael |
| 5,575,311 A | 11/1996 | Kingsford |
| 5,580,103 A | 12/1996 | Hall |
| 5,599,100 A | 2/1997 | Jackson et al. |
| 5,599,394 A | 2/1997 | Yabe |
| 5,645,301 A | 7/1997 | Kingsford et al. |
| 5,652,391 A | 7/1997 | Kingsford et al. |
| 5,653,251 A | 8/1997 | Handler |
| 5,743,293 A | 4/1998 | Kelly |
| 5,762,795 A | 6/1998 | Bailey et al. |
| 5,772,899 A | 6/1998 | Snodgrass et al. |
| 5,779,839 A | 7/1998 | Tuttle et al. |
| 5,784,573 A | 7/1998 | Szczepanek et al. |
| 5,785,508 A | 7/1998 | Bolt |
| 5,793,754 A | 8/1998 | Houldsworth et al. |
| 5,811,197 A | 9/1998 | Nishiyama et al. |
| 5,839,828 A | 11/1998 | Glanville |
| 5,846,056 A | 12/1998 | Dhindsa et al. |
| 5,848,605 A | 12/1998 | Bailey et al. |
| RE36,178 E | 4/1999 | Freudinger et al. |
| 5,947,702 A | 9/1999 | Biederstadt |
| 5,953,682 A | 9/1999 | McCarrick et al. |
| 5,957,328 A | 9/1999 | Osgar |
| 5,971,723 A | 10/1999 | Bolt et al. |
| 5,973,600 A | 10/1999 | Mosher, Jr. |
| 5,986,569 A | 11/1999 | Mish et al. |
| 5,991,279 A | 11/1999 | Haugli et al. |
| 6,013,949 A | 1/2000 | Tuttle |
| 6,025,054 A | 2/2000 | Tiffany, III |
| 6,027,027 A | 2/2000 | Smithgall |
| 6,033,302 A | 3/2000 | Ahmed et al. |
| 6,045,000 A | 4/2000 | Rauworth et al. |
| 6,045,331 A | 4/2000 | Gehm et al. |
| 6,100,804 A | 8/2000 | Brady et al. |
| 6,105,829 A | 8/2000 | Snodgrass et al. |
| 6,147,662 A | 11/2000 | Grabau et al. |
| 6,164,530 A | 12/2000 | Cheesebrow et al. |
| 6,177,859 B1 | 1/2001 | Tuttle et al. |
| 6,190,565 B1 | 2/2001 | Bailey et al. |
| 6,195,007 B1 | 2/2001 | Takayama et al. |
| 6,206,282 B1 | 3/2001 | Hayes, Sr. et al. |
| 6,209,592 B1 | 4/2001 | Gilboa et al. |
| 6,210,745 B1 | 4/2001 | Gaughan et al. |
| 6,238,576 B1 | 5/2001 | Yajima |
| 6,248,199 B1 | 6/2001 | Smulson |
| 6,250,502 B1 | 6/2001 | Cote et al. |
| 6,251,293 B1 | 6/2001 | Snodgrass et al. |
| 6,255,949 B1 | 7/2001 | Nicholson et al. |
| 6,259,367 B1 | 7/2001 | Klein |
| 6,298,941 B1 | 10/2001 | Spadafora |
| 6,302,461 B1 | 10/2001 | Debras et al. |
| 6,302,660 B1 | 10/2001 | Kurita et al. |
| 6,318,971 B1 | 11/2001 | Ota |
| 6,319,317 B1 | 11/2001 | Takamori |
| 6,325,032 B1 | 12/2001 | Sekiya et al. |
| 6,325,294 B2 | 12/2001 | Tuttle et al. |
| 6,325,932 B1 | 12/2001 | Gibson |
| 6,330,517 B1 | 12/2001 | Dobrowski |
| 6,330,971 B1 | 12/2001 | Mabry et al. |
| 6,340,932 B1 | 1/2002 | Rodgers et al. |
| 6,348,098 B1 | 2/2002 | McLoughlin et al. |
| 6,348,124 B1 | 2/2002 | Garbett |
| 6,451,154 B1 | 9/2002 | Grabau et al. |
| 6,474,949 B1 | 11/2002 | Arai et al. |
| 6,474,950 B1 | 11/2002 | Waldo |
| 6,478,547 B1 | 11/2002 | Savard et al. |
| 6,483,434 B1 | 11/2002 | UmiKer |
| 6,497,817 B1 * | 12/2002 | Liang ............................ 210/232 |
| 6,506,030 B1 | 1/2003 | Kottke |
| 6,520,519 B2 | 2/2003 | Howard |
| 6,522,549 B2 | 2/2003 | Kano et al. |
| 6,540,265 B2 | 4/2003 | Turk |
| 6,554,579 B2 | 4/2003 | Martin et al. |
| 6,575,264 B2 | 6/2003 | Spadafora |
| 6,592,825 B2 | 7/2003 | Pelc |
| 6,609,041 B1 | 8/2003 | Sanka et al. |
| 6,635,183 B2 | 10/2003 | Gibson |
| 6,661,339 B2 | 12/2003 | Muirhead |
| 6,718,888 B2 | 4/2004 | Muirhead |
| 6,720,865 B1 | 4/2004 | Forster et al. |
| 6,720,877 B2 | 4/2004 | Lian et al. |
| 6,722,530 B1 | 4/2004 | King et al. |
| 6,729,501 B2 | 5/2004 | Peterson |

(56) References Cited

U.S. PATENT DOCUMENTS

| | | |
|---|---|---|
| 6,742,992 B2 | 6/2004 | Davis |
| 6,742,993 B2 | 6/2004 | Savard et al. |
| 6,758,000 B2 | 7/2004 | Sandt et al. |
| 6,766,810 B1 | 7/2004 | Van Cleemput |
| 6,767,877 B2 | 7/2004 | Kuo |
| 6,771,981 B1 | 8/2004 | Zalewski et al. |
| 6,778,089 B2 | 8/2004 | Yoakum |
| 6,816,076 B2 | 11/2004 | Pomes |
| 6,837,484 B2 | 1/2005 | Kingsford et al. |
| 6,879,876 B2 | 4/2005 | O'Dougherty et al. |
| 6,886,246 B2 | 5/2005 | Chung |
| 6,900,536 B1 | 5/2005 | Derbenwick et al. |
| 6,901,791 B1 | 6/2005 | Frenz et al. |
| 6,925,072 B1 | 8/2005 | Grohn |
| 6,943,678 B2 | 9/2005 | Muirhead |
| 6,952,618 B2 | 10/2005 | Davlin et al. |
| 7,013,223 B1 | 3/2006 | Zhang et al. |
| 7,029,238 B1 | 4/2006 | Zagars et al. |
| 7,063,785 B2 | 6/2006 | Hiraku et al. |
| 7,083,202 B2 | 8/2006 | Eberle et al. |
| 7,152,781 B2 | 12/2006 | O'Dougherty et al. |
| 7,156,115 B2 | 1/2007 | Everett et al. |
| 7,175,397 B2 | 2/2007 | Claude et al. |
| 7,247,245 B1 | 7/2007 | Proulx et al. |
| 7,249,628 B2 | 7/2007 | Pillion et al. |
| 7,272,452 B2 | 9/2007 | Coogan et al. |
| 7,273,172 B2 | 9/2007 | Olsen, III et al. |
| 7,370,791 B2 | 5/2008 | O'Dougherty et al. |
| 7,383,967 B2 | 6/2008 | Gibson |
| 7,454,317 B2 | 11/2008 | Karasawa |
| 7,456,418 B1 | 11/2008 | Stevens et al. |
| 7,476,087 B2 | 1/2009 | Zagars et al. |
| 7,494,265 B2 | 2/2009 | Niermeyer et al. |
| 7,547,049 B2 | 6/2009 | Gashgaee |
| 7,684,446 B2 | 3/2010 | McLoughlin |
| 7,878,765 B2 | 2/2011 | Gonnella et al. |
| 7,897,196 B2 | 3/2011 | Cedrone et al. |
| 8,025,486 B2 | 9/2011 | Gonnella et al. |
| 8,029,247 B2 | 10/2011 | Cedrone et al. |
| 8,083,498 B2 | 12/2011 | Gonnella et al. |
| 8,087,429 B2 | 1/2012 | Cedrone et al. |
| 8,172,546 B2 | 5/2012 | Cedrone et al. |
| 8,292,598 B2 | 10/2012 | Laverdiere et al. |
| 8,322,994 B2 | 12/2012 | Claude et al. |
| 8,382,444 B2 | 2/2013 | Gonnella et al. |
| 8,651,823 B2 | 2/2014 | Cedrone et al. |
| 8,662,859 B2 | 3/2014 | Gonnella et al. |
| 8,678,775 B2 | 3/2014 | Gonnella et al. |
| 2001/0000865 A1 | 5/2001 | Gaughen et al. |
| 2001/0014477 A1 | 8/2001 | Pelc |
| 2002/0044536 A1 | 4/2002 | Izumi et al. |
| 2002/0095240 A1 | 7/2002 | Sickinger |
| 2002/0124945 A1 | 9/2002 | Muir et al. |
| 2002/0187025 A1 | 12/2002 | Speasl et al. |
| 2003/0010387 A1 | 1/2003 | Rauworth et al. |
| 2003/0033052 A1 | 2/2003 | Hillen et al. |
| 2003/0040881 A1 | 2/2003 | Steger |
| 2003/0062382 A1 | 4/2003 | Savard et al. |
| 2003/0135388 A1 | 7/2003 | Martucci et al. |
| 2003/0148759 A1 | 8/2003 | Leliveid |
| 2003/0222798 A1 | 12/2003 | Floros |
| 2003/0235027 A1 | 12/2003 | Smeyak et al. |
| 2004/0041709 A1 | 3/2004 | Forster |
| 2004/0041854 A1 | 3/2004 | Saito et al. |
| 2004/0050771 A1 | 3/2004 | Gibson |
| 2004/0072450 A1 | 4/2004 | Collins |
| 2004/0076526 A1 | 4/2004 | Fukano et al. |
| 2004/0094949 A1 | 5/2004 | Savagian et al. |
| 2004/0133728 A1 | 7/2004 | Ellerbrock et al. |
| 2004/0168618 A1 | 9/2004 | Muirhead |
| 2004/0172229 A1 | 9/2004 | Aragones et al. |
| 2004/0208750 A1 | 10/2004 | Masuda |
| 2004/0238623 A1 | 12/2004 | Asp |
| 2004/0262404 A1 | 12/2004 | Fujiki et al. |
| 2004/0265151 A1 | 12/2004 | Bertram |
| 2005/0012620 A1 | 1/2005 | Yoakum |
| 2005/0025634 A1 | 2/2005 | Bernard et al. |
| 2005/0042127 A1 | 2/2005 | Ohtsuka et al. |
| 2005/0061722 A1 | 3/2005 | Takao et al. |
| 2005/0066563 A1 | 3/2005 | Junhan et al. |
| 2005/0068182 A1 | 3/2005 | Dunlap et al. |
| 2005/0099303 A1 | 5/2005 | Zuckerman |
| 2005/0113941 A1 | 5/2005 | Ii et al. |
| 2005/0126985 A1 | 6/2005 | Campbell |
| 2005/0128086 A1 | 6/2005 | Brown et al. |
| 2005/0151802 A1 | 7/2005 | Neese et al. |
| 2005/0173458 A1 | 8/2005 | Hiranaga et al. |
| 2005/0173463 A1 | 8/2005 | Wesner |
| 2005/0182497 A1 | 8/2005 | Nakano |
| 2005/0184087 A1 | 8/2005 | Zagars |
| 2005/0197074 A1 | 9/2005 | Cullen et al. |
| 2005/0197722 A1 | 9/2005 | Varone et al. |
| 2005/0199700 A1 | 9/2005 | Baker et al. |
| 2005/0232296 A1 | 10/2005 | Schultze et al. |
| 2005/0237184 A1 | 10/2005 | Muirhead |
| 2005/0237195 A1 | 10/2005 | Urban |
| 2005/0238497 A1 | 10/2005 | Holst |
| 2005/0241548 A1 | 11/2005 | Muirhead |
| 2005/0244276 A1 | 11/2005 | Pfister et al. |
| 2005/0280542 A1 | 12/2005 | Schieh |
| 2005/0285735 A1 | 12/2005 | Imura et al. |
| 2006/0015294 A1 | 1/2006 | Yetter, Jr. et al. |
| 2006/0070960 A1 | 4/2006 | Gibson |
| 2006/0083259 A1 | 4/2006 | Metcalf et al. |
| 2006/0184264 A1 | 8/2006 | Willis et al. |
| 2006/0257707 A1* | 11/2006 | Kaschmitter et al. ........... 429/34 |
| 2006/0283932 A1 | 12/2006 | Asp et al. |
| 2007/0104586 A1 | 5/2007 | Cedrone |
| 2007/0125796 A1 | 6/2007 | Cedrone |
| 2007/0125797 A1 | 6/2007 | Cedrone |
| 2007/0126233 A1 | 6/2007 | Gashgaee |
| 2007/0127511 A1 | 6/2007 | Cedrone |
| 2007/0128046 A1 | 6/2007 | Gonnella |
| 2007/0128047 A1 | 6/2007 | Gonnella |
| 2007/0128048 A1 | 6/2007 | Gonnella |
| 2007/0128050 A1 | 6/2007 | Cedrone |
| 2007/0206436 A1 | 9/2007 | Niermeyer et al. |
| 2007/0217442 A1 | 9/2007 | McLoughlin |
| 2007/0254092 A1 | 11/2007 | Lin et al. |
| 2008/0036985 A1 | 2/2008 | Clarke et al. |
| 2008/0089361 A1 | 4/2008 | Metcalf et al. |
| 2008/0131290 A1 | 6/2008 | Magoon et al. |
| 2009/0132094 A1 | 5/2009 | Laverdiere et al. |
| 2011/0051576 A1 | 3/2011 | Ashizawa et al. |
| 2011/0098864 A1 | 4/2011 | Gonnella et al. |
| 2012/0057990 A1 | 3/2012 | Cedrone et al. |
| 2012/0070311 A1 | 3/2012 | Cedrone et al. |
| 2012/0070313 A1 | 3/2012 | Gonnella et al. |
| 2012/0091165 A1 | 4/2012 | Cedrone et al. |
| 2012/0288379 A1 | 11/2012 | Laverdiere et al. |
| 2013/0004340 A1 | 1/2013 | Gonnella et al. |
| 2014/0044570 A1 | 2/2014 | Cedrone et al. |

FOREIGN PATENT DOCUMENTS

| | | |
|---|---|---|
| CA | 2246826 | 3/1999 |
| CN | 1331783 A | 1/2002 |
| CN | 1434557 | 8/2003 |
| CN | 1526950 A | 9/2004 |
| CN | 1582203 | 2/2005 |
| CN | 1590761 A | 3/2005 |
| CN | 1685156 | 10/2005 |
| DE | 299 09 100 U1 | 8/1999 |
| DE | 199 33 202 A1 | 1/2001 |
| EP | 0 249 655 A1 | 12/1987 |
| EP | 0 410 394 A1 | 1/1991 |
| EP | 0513843 A1 | 11/1992 |
| EP | 0 261 972 B1 | 12/1992 |
| EP | 0577104 A1 | 1/1994 |
| EP | 0 892 204 A2 | 1/1998 |
| EP | 0855675 A2 | 7/1998 |
| EP | 0 863 538 A2 | 9/1998 |
| EP | 0 867 649 A2 | 9/1998 |
| EP | 1 133 639 B1 | 6/2004 |

(56) References Cited

FOREIGN PATENT DOCUMENTS

| | | |
|---|---|---|
| EP | 1 462 652 A2 | 9/2004 |
| GB | 661522 | 11/1951 |
| JP | 54-081119 | 6/1979 |
| JP | 54-165812 | 7/1979 |
| JP | 55-073563 | 6/1980 |
| JP | 58-119983 | 7/1983 |
| JP | 58203340 A | 11/1983 |
| JP | 61-178582 | 8/1986 |
| JP | 63-255575 | 10/1988 |
| JP | 02-13184 | 1/1990 |
| JP | 02-091485 | 3/1990 |
| JP | H02-227794 | 9/1990 |
| JP | 04-167916 | 6/1992 |
| JP | 05-184827 | 7/1993 |
| JP | 51-081413 | 7/1993 |
| JP | 06-103688 | 4/1994 |
| JP | H07-253081 | 10/1995 |
| JP | 08-016563 | 1/1996 |
| JP | 08-61246 | 3/1996 |
| JP | 2633005 | 4/1997 |
| JP | 10-169566 | 6/1998 |
| JP | 11026430 | 1/1999 |
| JP | 11-076394 | 3/1999 |
| JP | 2963514 | 8/1999 |
| JP | 11-356081 | 12/1999 |
| JP | 2001-203196 | 7/2001 |
| JP | 2001-304650 | 10/2001 |
| JP | 2001-342989 | 12/2001 |
| JP | 2002-024783 A | 1/2002 |
| JP | 2002-106467 | 4/2002 |
| JP | 2002-183695 A | 6/2002 |
| JP | 2002-298116 A | 10/2002 |
| JP | 2002-305890 | 10/2002 |
| JP | 2003-021069 | 1/2003 |
| JP | 2003-516820 | 5/2003 |
| JP | 2003-293958 | 10/2003 |
| JP | 2004-032916 | 1/2004 |
| JP | 2004-052748 | 2/2004 |
| JP | 2004-143960 | 5/2004 |
| JP | 2004-225672 | 8/2004 |
| JP | 2004-232616 | 8/2004 |
| JP | 2005-090410 | 4/2005 |
| JP | 2006-504035 | 2/2006 |
| JP | 2006-161677 | 6/2006 |
| TW | 466301 | 12/2001 |
| TW | 477862 B | 3/2002 |
| TW | 593888 | 6/2004 |
| TW | I225908 B | 1/2005 |
| WO | WO 94/18700 A1 | 8/1994 |
| WO | WO 96/35876 A1 | 11/1996 |
| WO | WO 99/37435 | 7/1999 |
| WO | WO 99/66415 A1 | 12/1999 |
| WO | WO 00/02236 A2 | 1/2000 |
| WO | WO 00/21030 A1 | 4/2000 |
| WO | WO 00/31416 A1 | 6/2000 |
| WO | WO 00/43952 A1 | 7/2000 |
| WO | WO 01/40646 A3 | 6/2001 |
| WO | WO 01/43798 | 6/2001 |
| WO | WO 02/056344 A2 | 7/2002 |
| WO | WO 02/090771 A2 | 11/2002 |
| WO | WO 03/060818 A2 | 7/2003 |
| WO | WO 2005/081182 A2 | 9/2005 |
| WO | WO 2006/057957 A2 | 6/2006 |
| WO | WO 2009/059324 A2 | 5/2009 |

OTHER PUBLICATIONS

Office Action issued in U.S. Appl. No. 11/292,559, mailed Apr. 17, 2009, 20 pgs.
Office Action issued in U.S. Appl. No. 11/273,091, mailed Feb. 17, 2006, 8 pgs.
Office Action issued in U.S. Appl. No. 11/273,091, mailed Jul. 3, 2006, 8 pgs.
Office Action issued in U.S. Appl. No. 11/273,091, mailed Oct. 13, 2006, 8 pgs.
Office Action issued in U.S. Appl. No. 11/273,091, mailed Feb. 23, 2007, 6 pgs.
Office Action issued in U.S. Appl. No. 11/273,091, mailed Oct. 15, 2007, 8 pgs.
Office Action issued in U.S. Appl. No. 11/386,427, mailed Nov. 13, 2007, 11 pgs.
Office Action issued in U.S. Appl. No. 11/364,286 mailed Jun. 1, 2009, 14 pgs.
International Preliminary Report on Patentability and Written Opinion, Ch. I, issued in PCT/US2006/045176 dated Apr. 9, 2009, 5 pgs.
Intellectual Property Office of Singapore, Written Opinion, Patent Application No. 200803948-9, dated Jul. 2, 2009, 10 pgs.
International Search Report, PCT/US99/28002, mailed Mar. 14, 2000, Millipore Corp., 5 pgs.
Written Opinion issued in PCT/US99/28002, mailed Oct. 25, 2000, 8 pgs.
International Preliminary Examination Report, PCT/US99/28002, mailed Feb. 21, 2001, 9 pgs.
International Search Report and Written Opinion, PCT/US06/44907, mailed Aug. 8, 2007, 9 pgs.
International Preliminary Report on Patentability, Ch. I, PCT/US06/044906, mailed Jun. 5, 2008, 7 pgs.
International Preliminary Report on Patentability, Ch. I, PCT/US2006/044907, mailed Jun. 5, 2008, 7 pgs.
International Preliminary Report on Patentability, Ch. I, PCT/US2006/044980, mailed Jun. 12, 2008, 7 pgs.
International Preliminary Report on Patentability, Ch. I, PCT/US2006/044908, mailed Jun. 12, 2008, 8 pgs.
International Preliminary Report on Patentability, Ch. I, PCT/US2006/045175, mailed Jun. 12, 2008, 6 pgs.
International Preliminary Report on Patentability, Ch. I, PCT/US2006/045127, mailed Jun. 12, 2008, 8 pgs.
International Preliminary Report on Patentability, Ch. I, PCT/US2006/045177, mailed Jun. 12, 2008, 5 pgs.
International Preliminary Report on Patentability, Ch. II, PCT/US07/05377, mailed Oct. 14, 2008, 14 pgs.
European Search Report, European Application No. 06838223.3, dated Aug. 12, 2009, 8 pgs.
Japanese Laid Open Publication No. JP-2009-528631, published Aug. 6, 2009, with International Search Report, Japanese Patent Office, 38 pgs.
Office Action issued in U.S. Appl. No. 09/447,504 mailed Feb. 27, 2001, 4 pgs.
Office Action issued in U.S. Appl. No. 09/447,504 mailed Nov. 18, 2003, 4 pgs.
Office Action issued in U.S. Appl. No. 09/447,504 mailed Jul. 13, 2004, 5 pgs.
Japanese Laid Open Publication No. JP-2009-529847, published Aug. 20, 2009, with International Search Report, Japanese Patent Office, 21 pgs.
Intellectual Property Office of Singapore, Written Opinion issued in Patent Application No. 200703671-8 dated Jul. 20, 2009, 4 pages.
Chinese Patent Office Official Action, Chinese Patent Application No. 200580039961.2, dated Aug. 21, 2009 with English translation, 33 pgs.
European Search Report for European Patent Application No. 07836336.3, European Patent Office, dated Sep. 19, 2011, 5 pgs.
Intellectual Property Office of Singapore, Written Opinion issued in Patent Application No. 200806425-5 dated Oct. 14, 2009, 8 pgs.
Office Action issued in U.S. Appl. No. 11/602,507 mailed Oct. 28, 2009, 12 pgs.
Office Action issued in U.S. Appl. No. 11/292,559 mailed Nov. 3, 2009, 17 pgs.
Office Action issued in U.S. Appl. No. 11/364,286 mailed Nov. 9, 2009, 19 pgs.
Notice of Allowance for U.S. Appl. No. 11/602,508, mailed Mar. 4, 2011, 8 pgs.
Office Action for Japanese Patent Application No. 2907-543342, dated Feb. 25, 2011, mailed Mar. 1, 2011, Japanese Patent Office, 12 pgs. with English translation.
Notice of Allowance issued in U.S. Appl. No. 11/602,507 mailed Oct. 14, 2010, 8 pgs.

(56) References Cited

OTHER PUBLICATIONS

Office Action issued in Chinese Patent Application No. CN 200780046952.5, mailed Sep. 27, 2010, 8 pgs. (English Translation).
Office Action issued Chinese Patent Appl. No. 200680050665.7, dated Mar. 11, 2010 (with English translation) 6 pgs.
Office Action issued in U.S. Appl. No. 11/364,286 mailed Apr. 7, 2010, 23 pgs.
Office Action issued in U.S. Appl. No. 11/292,559 mailed Apr. 14, 2010, 20 pgs.
Office Action issued in U.S. Appl. No. 11/602,508 mailed Apr. 15, 2010, 20 pgs.
Office Action for U.S. Appl. No. 11/602,485, mailed Apr. 27, 2011, 16 pgs.
Chinese Office Action for Chinese Patent Application No. 200680050665.7, mailed Apr. 26, 2011, Chinese Patent Office, 11 pgs. (English translation).
Office Action for U.S. Appl. No. 11/948,585, mailed May 19, 2011, 59 pgs.
Supplementary European Search Report and European Written Opinion in Application No. EP06838071.6, dated Apr. 28, 2010, 5 pgs.
Office Action issued in U.S. Appl. No. 11/602,485 mailed Jun. 9, 2010, 9 pgs.
Office Action issued in U.S. Appl. No. 11/602,507 mailed Jun. 14, 2010, 13 pgs.
Office Action issued in U.S. Appl. No. 11/602,472 mailed Jun. 18, 2010, 13 pgs.
Office Action issued in U.S. Appl. No. 11/602,465 mailed Jun. 18, 2010, 14 pgs.
Office Action issued in U.S. Appl. No. 11/602,464 mailed Jun. 21, 2010, 19 pgs.
Notice of Allowance for U.S. Appl. No. 11/602,465, mailed Jun. 8, 2011, 15 pgs.
Chinese Office Action for Chinese Patent Application No. 200680045074.0, Chinese Patent Office, dated Jun. 2, 2011, 10 pgs.
Office Action for U.S. Appl. No. 11/602,472, mailed Mar. 21, 2011, 11 pgs.
European Search Report and Written Opinion for European Patent Application No. 06838070.8, dated Mar. 18, 2011, 7 pgs.
European Office Action for European Patent Application No. 06838071.6, dated Mar. 18, 2011, 5 pgs.
Office Action issued in U.S. Appl. No. 11/602,485 mailed Nov. 19, 2010, 9 pgs.
Furon Co., "Chempure Pump—A Furon Product" Brochure, 1996, Anaheim, CA, US, 2 pages.
Krishna, "Characterization of Low Viscosity Photoresist Coating," Proceedings of SPIE, Advances in Resist Tech. and Processing XV, Feb. 23-25, 1998, SPIE vol. 3333/1323-36.
Chinese Patent Office Official Action, Chinese Patent Application No. 200410079193.0.
International Search Report and Written Opinion, PCT/US2006/045127, dated May 23, 2007.
International Search Report and Written Opinion, PCT/US2006/044908, dated Jul. 16, 2007.
International Search Report and Written Opinion, PCT/US2006/045175, dated Jul. 25, 2007.
International Search Report and Written Opinion, PCT/US2006/044907, dated Aug. 8, 2007.
International Search Report and Written Opinion, PCT/US2006/045177, dated Aug. 9, 2007.
European Patent Office Official Action, European Patent Application No. 00982386.5, dated Sep. 4, 2007.
International Search Report and Written Opinion, PCT/US2006/044906, dated Sep. 5, 2007.
International Search Report and Written Opinion, PCT/US2005/042127, dated Sep. 26, 2007.
International Search Report and Written Opinion, PCT/US2006/044980, dated Oct. 4, 2007.
United States Patent Office Official Action issued in U.S. Appl. No. 11/051,576, dated Dec. 13, 2007.
International Search Report and Written Opinion PCT/US2006/045176, dated Apr. 21, 2008.
Office Action issued in U.S. Appl. No. 11/602,513, dated May 22, 2008.
International Search Report and Written Opinion issued in PCT/US2007/05377 dated Jun. 4, 2008.
Chinese Patent Office Official Action, Chinese Patent Application No. 2005101088364, dated May 23, 2008.
International Search Report and Written Opinion issued in PCT/US06/44985, dated Jun. 23, 2008.
International Search Report and Written Opinion issued in PCT/US07/17017, dated Jul. 3, 2008.
International Search Report and Written Opinion issued in PCT/US06/44981, dated Aug. 8, 2008, 10 pages.
Office Action issued in U.S. Appl. No. 11/365,395, dated Aug. 19, 2008, McLoughlin, 19 pages.
Notice of Allowance issued in U.S. Appl. No. 11/364,286 mailed Sep. 21, 2010, 11 pgs.
LG International Identification Technologies, The FIM Process Illustrated two-page printout from website, Copyright 2001.
LG International Identification Technologies, "Our FIM system is setting the standard for the rest of the industry"two-page printout from website, Copyright, 2001.
Modern Plastics, "RFID is here—is it time for you to worry?," Dec. 2004, p. 66-67.
Office Action for Chinese Patent Application No. 200680051205.6, dated Oct. 10, 2011, State Intellectual Property Office of the People's Republic of China, 9 pgs., English translation only.
Office Action issued in U.S. Appl. No. 11/364,286 dated Nov. 14, 2008, Gonella, 11 pages.
Office Action issued in U.S. Appl. No. 11/602,513, dated Nov. 14, 2008, Gashgaee, 7 pages.
Office Action for Korean Patent Application No. 10-2007-7014324, dated Oct. 31, 2011, Korean Patent Office, 18 pgs. (with English translation).
Office Action issued in U.S. Appl. No. 11/292,559 dated Aug. 28, 2008, Gonella, 19 pages.
Notification of Transmittal of International Preliminary Report on Patentability for PCT/US07/17017. Eight pages, dated Jan. 13, 2009.
International Preliminary Report on Patentability, Chap. I, issued in PCT/US2006/044981, mailed Nov. 6, 2008, 7 pgs.
International Preliminary Report on Patentability, Chap. II, issued in PCT/US2006/044981, mailed Feb. 2, 2009, 9 pgs.
Office Action issued in U.S. Appl. No. 11/365,395, mailed Feb. 2, 2009, McLoughlin, 18 pgs.
Office Action issued in U.S. Appl. No. 11/292,559, mailed Dec. 24, 2008, Gonnella, 18 pgs.
Notice of Allowance for U.S. Appl. No. 11/602,508, mailed Jul. 20, 2011, 11 pgs.
Office Action for Chinese Patent Application No. 200680043297.3, Chinese Patent Office, dated Jul. 27, 2011 (English translation), 8 pgs.
Office Action for Chinese Patent Application No. 200580039961.2, Chinese Patent Office, dated Aug. 9, 2011, 6 pgs.
European Search Report for European Patent Application No. 06844456.1, European Patent Office, dated Jun. 28, 2011, 9 pgs.
Notice of Allowance for U.S. Appl. No. 11/602,472, mailed Sep. 8, 2011, 25 pgs.
Office Action issued in Chinese Patent Application No. CN 200680050814.X (with English translation), mailed Aug. 6, 2010, 10 pgs.
Office Action for Chinese Patent Application No. 200680050801.2 dated Aug. 31, 2011, 5 pgs (English translation only).
Notice of Allowance for U.S. Appl. No. 11/602,508, mailed Dec. 14, 2010, 10 pgs.
Official Action for Chinese Patent Application No. 200680051448.X, mailed Dec. 1, 2010, with English translation, 20 pgs.
Office Action issued in U.S. Appl. No. 11/602,464 mailed Jan. 5, 2011, 12 pgs.
Notice of Allowance for U.S. Appl. No. 11/602,465, mailed Jan. 12, 2011, 19 pgs.
Office Action for Chinese Patent Application No. 200680050801.2, dated Jan. 6, 2011, with English translation, 7 pgs.

(56) References Cited

OTHER PUBLICATIONS

Office Action issued in Chinese Patent Application No. CN 200680045074.0, mailed Jun. 7, 2010, 8 pgs. (with English translation).
Notice of Allowance for U.S. Appl. No. 11/602,464, mailed Jul. 11, 2011, 12 pgs.
Mykrolis; Optimizer II ST Manifold; "The Solution for Rapid Filter Changeout", Product Profile, 2004, 2 pgs.
Office Action issued in Chinese Patent Application No. CN 200680050801.2, mailed Mar. 26, 2010, 13 pgs. (with English translation).
Final Rejection for Japanese Patent Application No. 2007-543342, Japanese Patent Office, mailed Feb. 21, 2012, 8 pgs. (with English translation).
English translation of Office Action for Chinese Patent Application No. 200780046952.5, Chinese Patent Office, mailed Feb. 28, 2012, 5 pgs.
Office Action for U.S. Appl. No. 11/948,585, mailed Mar. 14, 2012, 14 pgs.
Notice of Allowance for U.S. Appl. No. 11/602,472, mailed Mar. 29, 2012, 11 pgs.
English translation of Office Action for Chinese Patent Application No. 200680050665.7 dated Nov. 23, 2011, 7 pgs.
English translation of Office Action for Chinese Patent Application No. 200680050801.2 dated Dec. 1, 2011, 3 pgs.
Office Action for Japanese Patent Application No. 2008-543354, mailed Dec. 22, 2011, Japanese Patent Office, 7 pgs. (with English translation).
Office Action for Chinese Patent Application No. 200680050814.X, dated Dec. 23, 2011, State Intellectual Property Office of the People's Republic of China, 6 pgs. (with English translation).
Office Action for Japanese Patent Application No. 2008-543355, mailed Jan. 5, 2012, Japanese Patent Office, 5 pgs. (with English translation).
Office Action for Japanese Patent Application No. 2008-541406, mailed Jan. 10, 2012, Japanese Patent Office, 11 pgs. (with English translation).
Office Action for U.S. Appl. No. 11/948,585, mailed Jan. 19, 2012, 19 pgs.
Office Action for Japanese Patent Application No. 2008-543344, mailed Feb. 2, 2012, Japanese Patent Office, 6 pgs. (with English translation).
Office Action for Japanese Patent Application No. 2008-544358, mailed Feb. 1, 2012, Japanese Patent Office, 6 pgs. (with English translation).
Office Action for Chinese Patent Application No. 200680051448.X, dated Feb. 21, 2012, 3 pgs., Chinese Patent Office.
Notice of Allowance for U.S. Appl. No. 12/983,737, mailed Jul. 30, 2012, 9 pgs.
Notice of Allowance for Japanese Patent Application No. 2007-543342, dated Jul. 31, 2007, 3 pgs., Japanese Patent Office.
Office Action for Chinese Patent Application No. 200580039961.2, dated Apr. 12, 2012 (with English translation) 6 pgs.
Notice of Allowability for U.S. Appl. No. 11/666,124, mailed May 8, 2012, 9 pgs.
Office Action for Taiwan Patent Application No. 094140888, mailed Mar. 20, 2012, 5 pgs.
Office Action for Korea Patent Application No. 10-2007-7014324, mailed May 18, 2012, 6 pgs.
Office Action for Japanese Patent Application No. 2008-543342, mailed Jun. 5, 2012, 8 pgs. (with English translation).
Office Action for Chinese Patent Application No. 200680050665.7, mailed Jul. 4, 2012, 12 pgs. (with English translation).
Office Action for Japanese Patent Application No. 2008-541407, Japanese Patent Office, mailed Mar. 27, 2012, 7 pgs. (with English translation).
Office Action for Japanese Patent Application No. 2008-543343, Japanese Patent Office, mailed Mar. 27, 2012, 6 pgs. (with English translation).
Office Action for Japanese Patent Application No. 2009-539238, mailed Apr. 24, 2012, 6 pgs. (with English translation).
Office Action for European Patent Application No. 07836336.3, mailed May 15, 2012, 5 pgs.
Office Action for Chinese Patent Application No. 200680051205.6, mailed May 24, 2012, 7 pgs. (with English translation).
Office Action for Japanese Patent Application No. 2008-543354, mailed Jul. 24, 2012, 6 pgs. (with English translation).
Office Action and Search Report for Taiwan Patent Application No. 095142929, issued Aug. 17, 2012, from the Intellectual Property Office of Taiwan, 7 pgs. (with English translation).
Office Action for Taiwanese Patent Application No. 095142926, issued Aug. 9, 2012, 12 pgs. (with English translation).
Office Action for Taiwanese Patent Application No. 095142932, issued Aug. 17, 2012, 9 pgs. (with English translation).
Office Action for Taiwanese Patent Application No. 095142928, issued Aug. 17, 2012, 9 pgs. (with English translation).
Office Action for U.S. Appl. No. 11/948,585, mailed Sep. 28, 2012, 17 pgs.
Office Action (with English translation) for Taiwan Patent Application No. 095143263, dated Aug. 17, 2012, 9 pgs.
Office Action (with English translation) for Japanese Patent Application No. 2008-541406, mailed Oct. 16, 2012, 7 pgs.
Office Action for U.S. Appl. No. 13/216,944, mailed Oct. 25, 2012, 12 pgs.
Notice of Allowance for U.S. Appl. No. 12/983,737, mailed Nov. 1, 2012, 7 pgs.
Office Action for Chinese Patent Application No. 200680051448.X, dated Nov. 2, 2012, 3 pgs.
Office Action (with English translation) for Taiwan Patent Application No. 095142923, dated Aug. 29, 2012, 9 pgs.
Office Action (with English translation) for Taiwan Patent Application No. 096106723, dated Sep. 21, 2012, 8 pgs.
Office Action (with English translation) for Japanese Patent Application No. 2008-544358, mailed Nov. 13, 2012, 2 pgs.
Office Action (with English translation) for Japanese Patent Application No. 2008-543344, mailed Nov. 13, 2012, 4 pgs.
Office Action (with English translation) for Japanese Patent Application No. 2008-543355, mailed Nov. 13, 2012, 4 pgs.
Notice of Allowance for U.S. Appl. No. 12/983,737, mailed Dec. 6, 2012, 5 pgs.
Office Action (with English translation) for Chinese Patent Application No. 200780046952.5, dated Dec. 4, 2012, 5 pgs.
Office Action (with English translation) for Taiwanese Patent Application No. 094140888, dated Nov. 19, 2012, 6 pgs.
Office Action (with English translation) for Japanese Patent Application No. 2008-541407, mailed Dec. 21, 2012, 7 pgs.
Office Action (with English translation) for Japanese Patent Application No. 2009-539238, mailed Jan. 29, 2013, 5 pgs.
Office Action (with English translation) for Japanese Patent Application No. 2008-543354, mailed Jan. 29, 2013, 6 pgs.
Office Action (English translation only) for Korean Patent Application No. 10-2008-7015803, dated Feb. 13, 2013, 3 pgs.
Office Action (with English translation) for Korean Patent Application No. 10-2008-7013326, dated Feb. 13, 2013, 6 pgs.
Office Action for U.S. Appl. No. 13/615,926, mailed Mar. 15, 2013, 17 pgs.
Notice of Allowance for U.S. Appl. No. 13/216,944, mailed Mar. 19, 2013, 2 pgs.
Office Action (with English translation) for Korean Patent Application No. 10-2008-7015528, dated Apr. 22, 2013, 15 pgs., Korean Patent Office.
Office Action for U.S. Appl. No. 11/948,585, mailed May 10, 2013, 12 pgs.
Office Action for U.S. Appl. No. 13/301,516, mailed Jun. 4, 2013, 8 pgs.
Office Action for U.S. Appl. No. 13/615,926, mailed Jun. 19, 2013, 17 pgs.
Notice of Allowance for Taiwan Application No. 095142923, dated Jun. 26, 2013, 5 pgs. (with English translation of search report only), Taiwan Intellectual Property Office.

(56) References Cited

OTHER PUBLICATIONS

Notice of Allowance for Taiwan Application No. 095142926, dated Jun. 27, 2013, 5 pgs. (with English translation of search report only), Taiwan Intellectual Property Office.

Office Action (with English translation) for Japanese Patent Application No. 2011-168830, mailed Jul. 23, 2013, 6 pgs., Japanese Patent Office.

Office Action (with English translation) for Japanese Patent Application No. 2012-059979, mailed Jul. 23, 2013, 6 pgs., Japanese Patent Office.

Office Action (with English translation) for Japanese Patent Application No. 2012-085238, mailed Aug. 20, 2013, 7 pgs., Japanese Patent Office.

Office Action for U.S. Appl. No. 13/251,976, mailed Oct. 17, 2013, 11 pgs.

Office Action (with English translation) for Japanese Patent Application No. 2012-087168, mailed Sep. 24, 2013, 6 pgs., Japanese Patent Office.

Office Action (with English translation) for Taiwanese Patent Application No. 095142930, issued Sep. 18, 2013, 8 pgs.

Office Action for U.S. Appl. No. 13/554,746, mailed Oct. 25, 2013, 10 pgs.

Office Action for U.S. Appl. No. 13/316,093, mailed Oct. 29, 2013, 7 pgs.

Notice of Allowance for U.S. Appl. No. 13/615,926, mailed Nov. 20, 2013, 5 pgs.

Notice of Allowance for U.S. Appl. No. 13/301,516, mailed Nov. 21, 2013, 5 pgs.

Office Action (with English translation) for Japanese Patent Application No. 2009-539238, mailed Dec. 3, 2013, 3 pgs.

Office Action (with English translation) for Japanese Patent Application No. 2013-018339, mailed Dec. 3, 2013, 7 pgs.

Notice of Allowance for U.S. Appl. No. 11/948,585, mailed Dec. 19, 2013, 5 pgs.

Office Action (with English translation) for Japanese Patent Application No. 2012-059979, mailed Dec. 17, 2013, 4 pgs.

Corrected Notice of Allowability for U.S. Appl. No. 13/615,926, mailed Feb. 4, 2014, 6 pgs.

Notice of Allowance for Japanese Patent Application. No. 2012-085238, dated Mar. 10, 2014, 3 pages.

Office Action (with English translation) for Japanese Patent Application No. 2013-086392, mailed Mar. 3, 2014, 8 pgs.

* cited by examiner

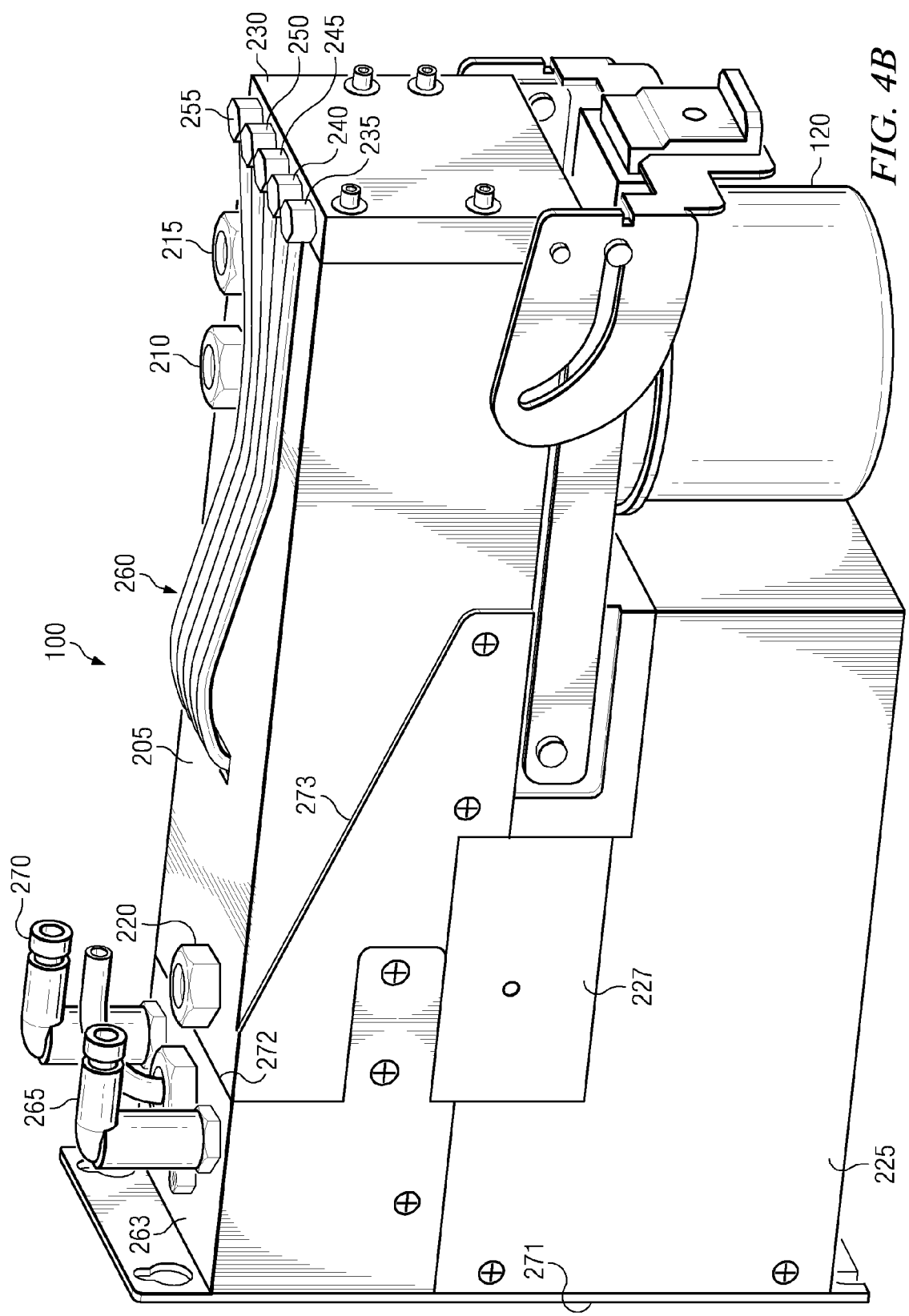

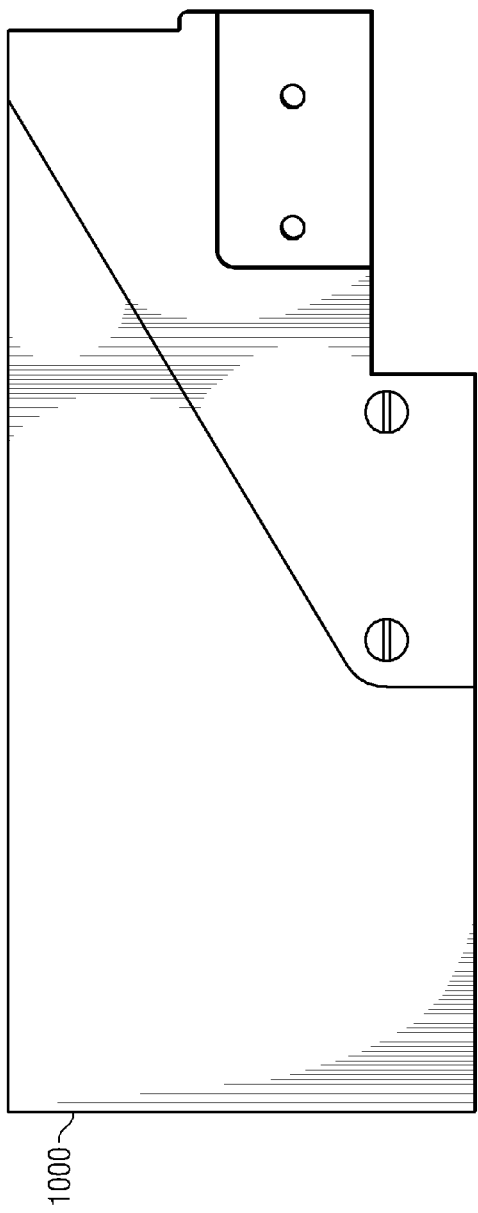
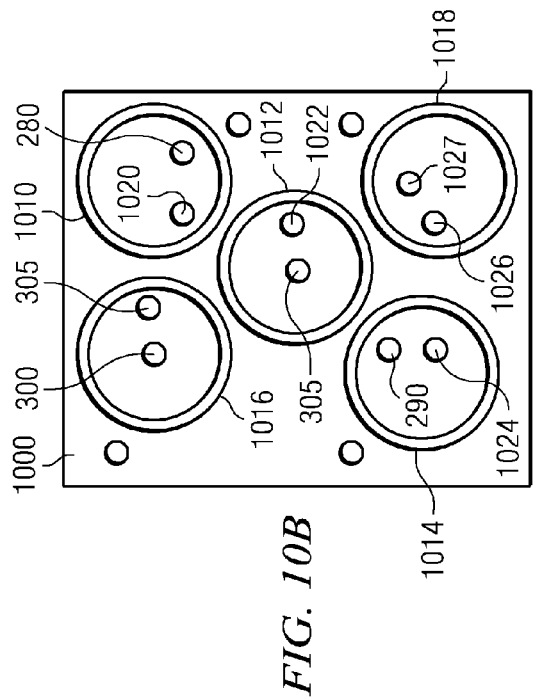
FIG. 10A
FIG. 10B

FIG. 20A

| SYSTEM SEGMENT NAME | SYSTEM SEGMENT NUMBER | VALVE DELAY NUMBER | BLDCM FORWARD | BLDCM REVERSE | BLDCM DISPENSE | STEPPER FORWARD | STEPPER REVERSE | VALVE INLET | VALVE PURGE | VALVE VENT | VALVE ISOLATE | VALVE BARRIER |
|---|---|---|---|---|---|---|---|---|---|---|---|---|
| READY | | | | | | | | | | | | |
| OPEN ADJ | 1 | | ▨ | | ▨ | | ▨ | | | | ▨ | |
| DISPENSE AND FILL | 2 | | ▨ | | ▨ | | ▨ | | | | ▨ | |
|  | 3 | | ▨ | | ▨ | | ▨ | | | | ▨ | |
|  | 4 | | ▨ | | ▨ | | ▨ | | | | ▨ | |
|  | 5 | | ▨ | | ▨ | | ▨ | | | | ▨ | |
|  | 6 | | ▨ | | ▨ | | ▨ | | | | ▨ | |
| CLOSE ADJ | 7 | | | | ▨ | ▨ | | | | | ▨ | |
| END FILL | 8 | | | | | | ▨ | | | | ▨ | |
|  | 9 | 0 | | | | | | ▨ | | | ▨ | |
|  | 10 | 1 | | | | | | ▨ | | | ▨ | |
|  | 11 | 2 | | | | | | ▨ | | | ▨ | |
|  | 12 | 3 | | | | | | | | | ▨ | ▨ |
| PRE FILTR | 13 | | | | | ▨ | | | | | ▨ | ▨ |
| FILTRATION | 14 | | | ▨ | | ▨ | | | | | ▨ | ▨ |
|  | 15 | 4 | | ▨ | | ▨ | | | | | ▨ | ▨ |
|  | 16 | 5 | | | | | | | | ▨ | ▨ | |
| VENT | 17 | | | | ▨ | | | | | ▨ | ▨ | |
|  | 18 | 6 | | | | | | | | ▨ | ▨ | |
| PRS ZERO A | 19 | 7 | | | | | | | | ▨ | ▨ | |
|  | 20 | 8 | | | | | | | | ▨ | ▨ | |
|  | 21 | 9 | | | | | | | ▨ | ▨ | ▨ | |
|  | 22 | 10 | | | | | | | ▨ | ▨ | | ▨ |
|  | 23 | 11 | | | | | | | ▨ | ▨ | | |
|  | 24 | 12 | ▨ | | | | | | ▨ | ▨ | | |
| PURGE | 25 | | | | | | | | ▨ | ▨ | | |
| ST PRG | 26 | 13 | | | | | | | ▨ | ▨ | | |
| PRS ZERO B | 27 | 14 | | | | | | | ▨ | ▨ | | |
|  | 28 | 15 | | | | | | | ▨ | ▨ | | |
| P.C. 2A | 29 | | | | ▨ | | | | ▨ | | | |

| SYSTEM SEGMENT NAME | SEGMENT NUMBER | VALVE DELAY NUMBER | FORWARD | REVERSE | FORWARD | REVERSE | INLET VALVE | OUTLET VALVE | PURGE VALVE | VENT VALVE | ISOLATION VALVE | BARRIER VALVE |
|---|---|---|---|---|---|---|---|---|---|---|---|---|
| VENT | 17 | | | | | ▨ | | | | | ▨ | |
| | 18 | 6 | | | | | | | | | ▨ | |
| PRS ZERO A | 19 | 7 | | | | | | | | | ▨ | ▨ |
| | 20 | 8 | | | | | | | | ▨ | ▨ | ▨ |
| | 21 | 9 | | | | | | | | ▨ | | |
| | 22 | 10 | | | | | | | | | | |
| | 23 | 11 | | | | | | | | | | |
| | 24 | 12 | | | | | ▨ | | ▨ | | | |
| PURGE | 25 | | ▨ | | | | ▨ | | ▨ | | | |
| ST PURGE | 26 | 13 | | | | | ▨ | | ▨ | | | |
| PRS ZERO B | 27 | 14 | | | | | ▨ | | ▨ | | | |
| | 28 | 15 | | | | | ▨ | | | | | |
| P.C. 2A | 29 | | | ▨ | | | | | | | | |
| P.C. 2B | 30 | | ▨ | | | | | | | | | |
| READY | | | | | | | | | | | | |

⏎ DISPENSE ⏎ FILL

→ TIME

*FIG. 20D*

METHOD AND SYSTEM FOR HIGH VISCOSITY PUMP

RELATED APPLICATIONS

This application is an continuation-in-part of and claims the benefit of priority under 35 U.S.C. 120 to U.S. patent application Ser. No. 11/602,464, which is a continuation-in-part of and claims the benefit of priority under 35 U.S.C. 120 to PCT/US2005/042127 and the benefit of priority under 35 U.S.C. 119(e) to U.S. Provisional Patent Application No. 60/742,435. Each of these applications is hereby fully incorporated by reference herein.

TECHNICAL FIELD

The disclosure describes systems and methods relating generally to fluid pumps. More particularly, embodiments described herein relate to multi-stage pumps. Even more particularly, embodiments described herein relate to a multi-stage pumps and filters for high viscosity fluids.

BACKGROUND

There are many applications for which precise control over the amount and/or rate at which a fluid is dispensed by a pumping apparatus is necessary. In semiconductor processing, for example, it is important to control the amount and rate at which photochemicals, such as photoresist chemicals, are applied to a semiconductor wafer. The coatings applied to semiconductor wafers during processing typically require a flatness across the surface of the wafer that is measured in angstroms. The rates at which processing chemicals are applied to the wafer has to be controlled in order to ensure that the processing liquid is applied uniformly.

Many photochemicals used in the semiconductor industry today are very expensive, frequently costing as much as $1000 a liter. Therefore, it is preferable to ensure that a minimum but adequate amount of chemical is used and that the chemical is not damaged by the pumping apparatus. Current multiple stage pumps can cause sharp pressure spikes in the liquid. Such pressure spikes and subsequent drops in pressure may be damaging to the fluid (i.e., may change the physical characteristics of the fluid unfavorably). Additionally, pressure spikes can lead to built up fluid pressure that may cause a dispense pump to dispense more fluid than intended or dispense the fluid in a manner that has unfavorable dynamics.

Some previous pump designs for photo-resist dispense pumps relied on flat diaphragms in the feed and dispense chambers to move exert pressure on the process fluid. Hydraulic fluid was typically used to assert pressure on one side of the diaphragm to cause the diaphragm to move, thereby displacing the process fluid. The hydraulic fluid could either be put under pressure by a pneumatic piston or a stepper motor driven piston. In order to get the displacement volume required by dispense pumps, the diaphragm had to have a relatively large surface area, and therefore diameter. Moreover, in previous pumps the various plates defining various portions of the pump were held together by external metal plates that were clamped or screwed together. The spaces between the various plates increased the likelihood of fluid leakage. Additionally, valves were distributed throughout the pump, making replacement and repair more difficult.

SUMMARY OF THE DISCLOSURE

Embodiments described herein provide high viscosity multi-stage pumps and disposable filters adapted for use with a high-viscosity pump. One embodiment can include a multi-stage pump comprising an pump inlet flow path, a pump outlet flow path, a feed stage in fluid communication with the pump inlet flow path, a dispense stage in fluid communication with the feed stage and the pump outlet flow path, a noncompliant disposable filter for high viscosity fluid in a flow path between the feed stage and the dispense stage and a set of valves to selectively allow fluid flow through the multi-stage pump.

Another embodiment can include a disposable filter comprising a head portion defining an inlet port, an outlet port and a vent port and sized and shaped to be compatible with a quick change manifold, a bowl portion coupled to the head portion with the head portion and the bowl portion at least partially defining a filter cavity and forming a noncompliant filter housing, and a high viscosity filter cartridge disposed in the filter cavity, the filter cartridge having a filter cartridge outlet in fluid communication with the outlet port. The disposable filter can be adapted for use with a multi-stage pump for pumping high viscosity fluid.

Another embodiment can include a disposable filter comprising a head portion defining an inlet port, an outlet port and a vent port and sized and shaped to be compatible with a quick change manifold and a bowl portion coupled to the head portion. The head portion can include a top surface defining a portion of a filter cavity that is sloped towards the vent port. The bowl portion can include a cylindrical sidewall and a curved bottom portion. The head portion and bowl portion form a noncompliant filter housing. The filter can further include a high viscosity filter cartridge disposed in the filter cavity and coupled to the head portion. The filter cartridge can have a filter cartridge outlet in fluid communication with an outlet port of the head portion. The disposable filter is adapted for use with a multi-stage pump for pumping high viscosity fluid.

BRIEF DESCRIPTION OF THE DRAWINGS

A more complete understanding of the embodiments and the advantages thereof may be acquired by referring to the following description, taken in conjunction with the accompanying drawings in which like reference numbers indicate like features and wherein:

FIGS. 4A, 4B, 5A, 5C, and 5D are diagrammatic representations of various embodiments of a multi-stage pump;

FIG. 10A is a diagrammatic representation of a side view of a dispense block and FIG. 10B is a diagrammatic representation of an end surface of the dispense block;

FIGS. 20A, 20C, 20D, 20E and 20F are chart diagrams illustrating cycle timing of a stepper motor and a BLDCM in various stages, according to one embodiment and FIG. 20B is chart diagram illustrating one embodiment of configuring a stepper motor and BLDCM;

DETAILED DESCRIPTION

The disclosure and the various features and advantageous details thereof are explained more fully with reference to the non-limiting embodiments that are illustrated in the accompanying drawings and detailed in the following description. Descriptions of well known starting materials, processing techniques, components and equipment are omitted so as not to unnecessarily obscure the disclosure in detail. Skilled artisans should understand, however, that the detailed description and the specific examples, while disclosing preferred embodiments, are given by way of illustration only and not by way of limitation. Various substitutions, modifications, additions or rearrangements within the scope of the underlying inventive concept(s) will become apparent to those skilled in the art after reading this disclosure.

Various embodiments described herein are related to a pumping system that accurately dispenses fluid using a multiple stage ("multi-stage") pump with reduced form factor and pumps and filters for pumping high viscosity fluids. Embodiments can be utilized for the dispense of photo-resist and other photosensitive chemicals in semiconductor manufacturing.

Figure 1:
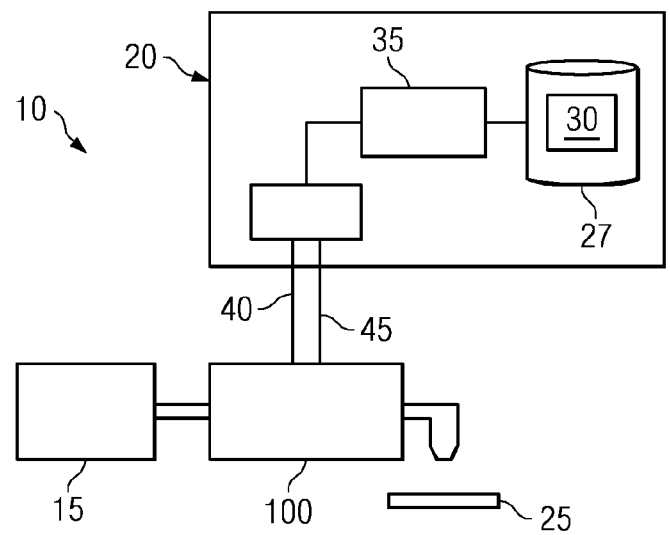
FIG. 1 is a diagrammatic representation of one embodiment of a pumping system.

FIG. 1 is a diagrammatic representation of a pumping system 10. The pumping system 10 can include a fluid source 15, a pump controller 20 and a multi-stage pump 100, which work together to dispense fluid onto a wafer 25. The operation of multi-stage pump 100 can be controlled by pump controller 20, which can be onboard multi-stage pump 100 or connected to multi-stage pump 100 via a one or more communications links for communicating control signals, data or other information. Additionally, the functionality of pump controller 20 can be distributed between an onboard controller and another controller. Pump controller 20 can include a computer readable medium 27 (e.g., RAM, ROM, Flash memory, optical disk, magnetic drive or other computer readable medium) containing a set of control instructions 30 for controlling the operation of multi-stage pump 100. A processor 35 (e.g., CPU, ASIC, RISC, DSP or other processor) can execute the instructions. One example of a processor is the Texas Instruments TMS320F2812PGFA 16-bit DSP (Texas Instruments is Dallas, Tex. based company). In the embodiment of FIG. 1, controller 20 communicates with multi-stage pump 100 via communications links 40 and 45. Communications links 40 and 45 can be networks (e.g., Ethernet, wireless network, global area network, DeviceNet network or other network known or developed in the art), a bus (e.g., SCSI bus) or other communications link. Controller 20 can be implemented as an onboard PCB board, remote controller or in other suitable manner. Pump controller 20 can include appropriate interfaces (e.g., network interfaces, I/O interfaces, analog to digital converters and other components) to controller to communicate with multi-stage pump 100. Additionally, pump controller 20 can include a variety of computer components known in the art including processors, memories, interfaces, display devices, peripherals or other computer components not shown for the sake of simplicity. Pump controller 20 can control various valves and motors in multi-stage pump to cause multi-stage pump to accurately dispense fluids, including low viscosity fluids (i.e., less than 100 centipoise) or other fluids. An I/O interface connector as described in U.S. Provisional Patent Application No. 60/741,657, entitled "/O INTERFACE SYSTEM AND METHOD FOR A PUMP," by Cedrone et al., filed Dec. 2, 2005, which is hereby fully incorporated by reference herein, can be used to connected pump controller 20 to a variety of interfaces and manufacturing tools.

Figure 2:
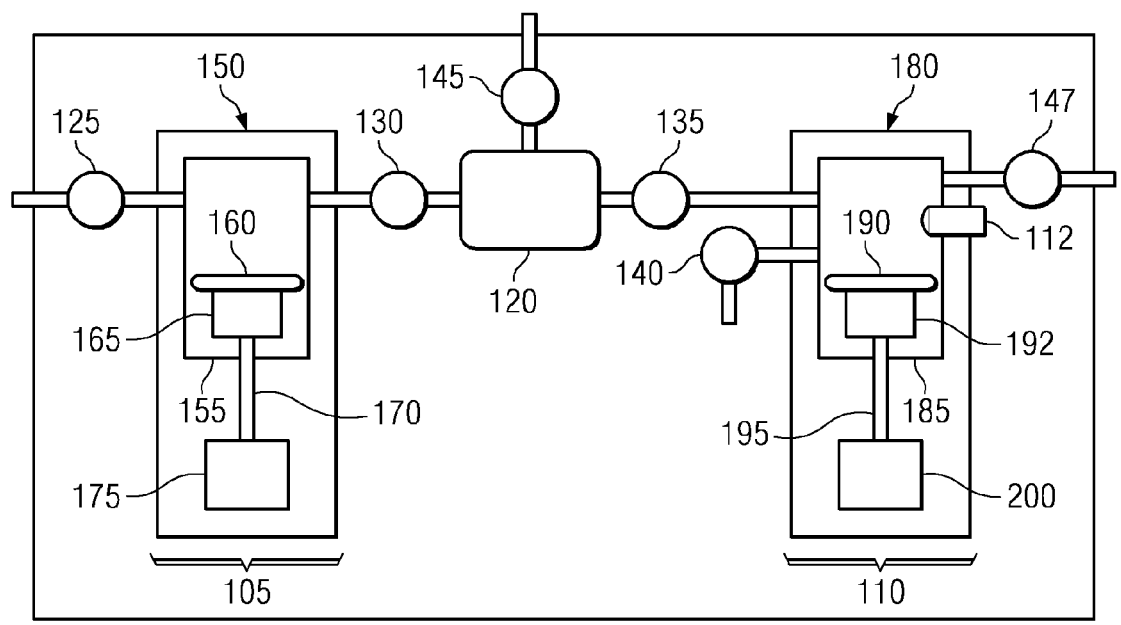
FIG. 2 is a diagrammatic representation of a multiple stage pump ("multi-stage pump") according to one embodiment.

FIG. 2 is a diagrammatic representation of a multi-stage pump 100. Multi-stage pump 100 includes a feed stage portion 105 and a separate dispense stage portion 110. Located between feed stage portion 105 and dispense stage portion 110, from a fluid flow perspective, is filter 120 to filter impurities from the process fluid. A number of valves can control fluid flow through multi-stage pump 100 including, for example, inlet valve 125, isolation valve 130, barrier valve 135, purge valve 140, vent valve 145 and outlet valve 147. Dispense stage portion 110 can further include a pressure sensor 112 that determines the pressure of fluid at dispense stage 110. The pressure determined by pressure sensor 112 can be used to control the speed of the various pumps as described below. Example pressure sensors include ceramic and polymer pezioresistive and capacitive pressure sensors, including those manufactured by Metallux AG, of Korb, Germany. According to one embodiment, the face of pressure sensor 112 that contacts the process fluid is a perfluoropolymer. Pump 100 can include additional pressure sensors, such as a pressure sensor to read pressure in feed chamber 155.

Feed stage 105 and dispense stage 110 can include rolling diaphragm pumps to pump fluid in multi-stage pump 100. Feed-stage pump 150 ("feed pump 150"), for example, includes a feed chamber 155 to collect fluid, a feed stage diaphragm 160 to move within feed chamber 155 and displace fluid, a piston 165 to move feed stage diaphragm 160, a lead screw 170 and a stepper motor 175. Lead screw 170 couples to stepper motor 175 through a nut, gear or other mechanism for imparting energy from the motor to lead screw 170. According to one embodiment, feed motor 170 rotates a nut that, in turn, rotates lead screw 170, causing piston 165 to actuate. Dispense-stage pump 180 ("dispense pump 180") can similarly include a dispense chamber 185, a dispense stage diaphragm 190, a piston 192, a lead screw 195, and a dispense motor 200. Dispense motor 200 can drive lead screw 195 through a threaded nut (e.g., a Torlon or other material nut).

According to other embodiments, feed stage 105 and dispense stage 110 can be a variety of other pumps including pneumatically or hydraulically actuated pumps, hydraulic pumps or other pumps. One example of a multi-stage pump using a pneumatically actuated pump for the feed stage and a stepper motor driven hydraulic pump is described in U.S. patent application Ser. No. 11/051,576 entitled "PUMP CONTROLLER FOR PRECISION PUMPING APPARATUS" by inventors Zagars et al., filed Feb. 4, 2005, hereby incorporated by reference. The use of motors at both stages, however, provides an advantage in that the hydraulic piping, control systems and fluids are eliminated, thereby reducing space and potential leaks.

Figure 17:
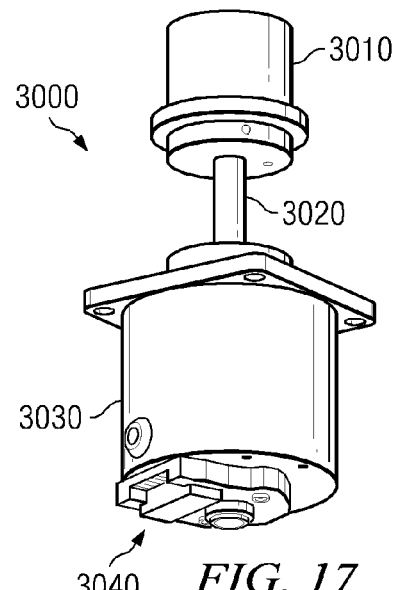
FIG. 17 is a diagrammatic representation of a motor assembly with a brushless DC motor, according to one embodiment.
Figure 18:
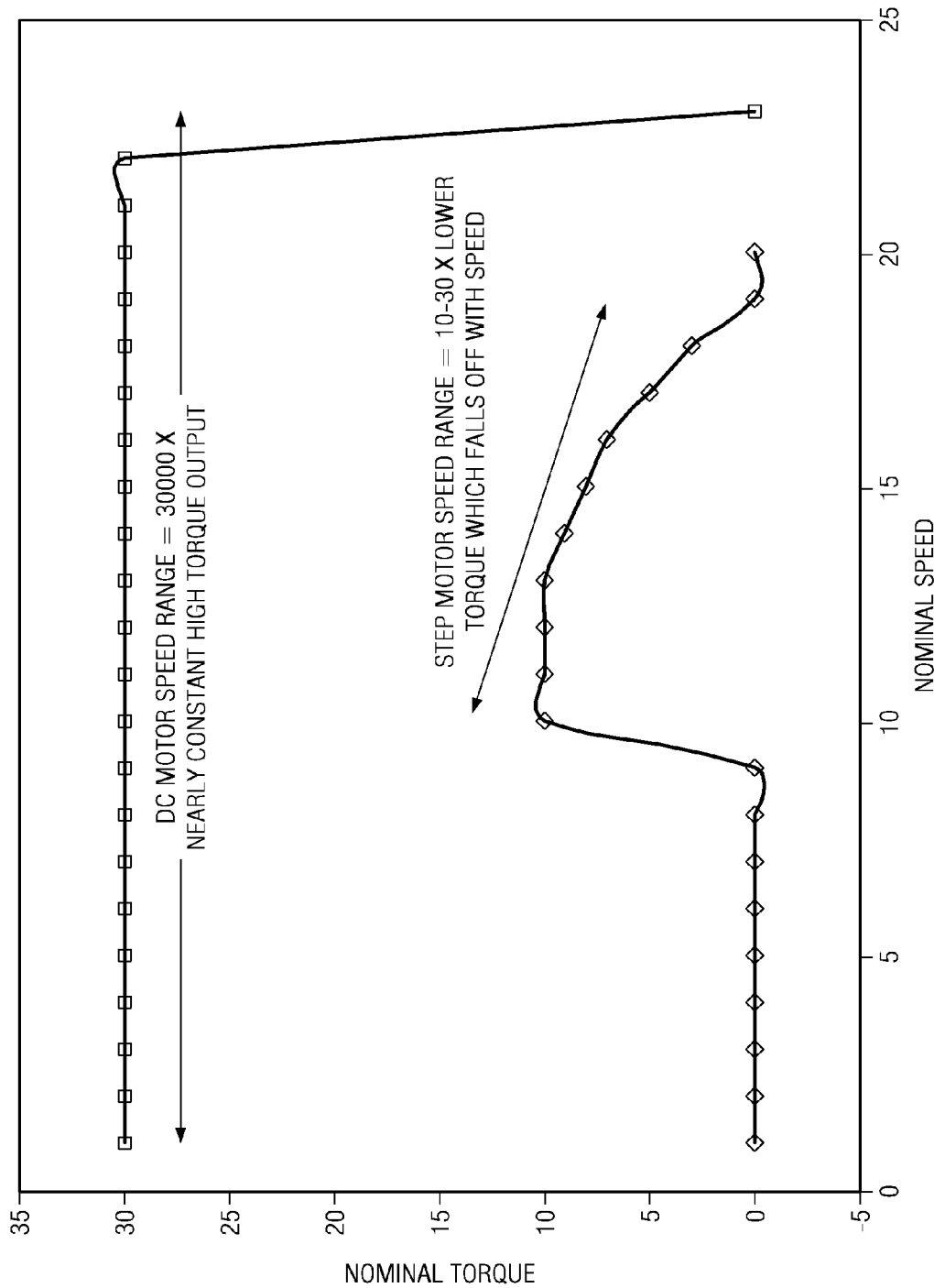
FIG. 18 is a plot diagram comparing average torque output and speed range of a brushless DC motor and a stepper motor, according to one embodiment.
Figure 19:
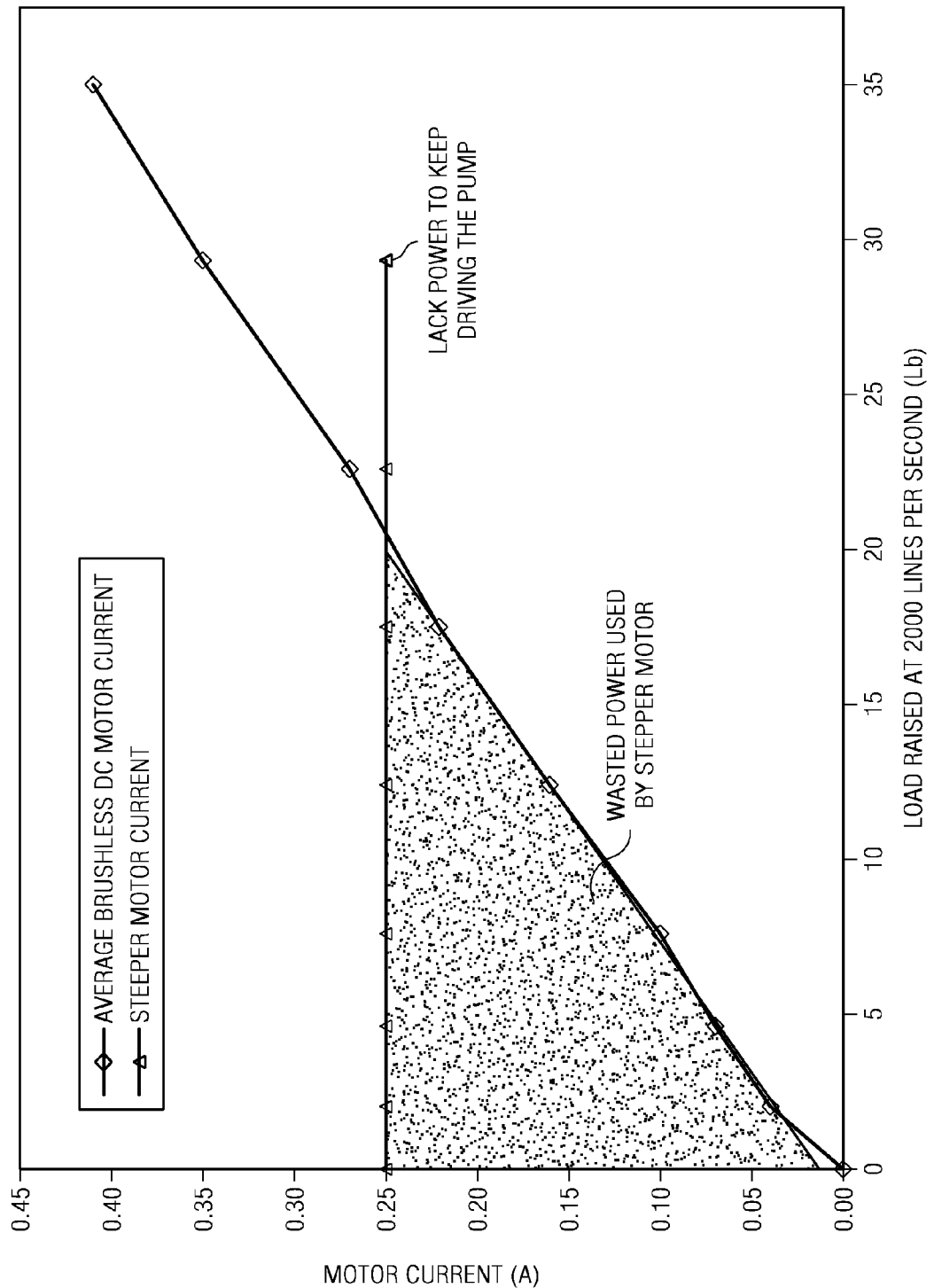
FIG. 19 is a plot diagram comparing average motor current and load between a brushless DC motor and a stepper motor, according to one.

Feed motor 175 and dispense motor 200 can be any suitable motor. According to one embodiment, dispense motor 200 is a Permanent-Magnet Synchronous Motor ("PMSM"). The PMSM can be controlled by a digital signal processor ("DSP") utilizing Field-Oriented Control ("FOC") or other type of position/speed control known in the art at motor 200, a controller onboard multi-stage pump 100 or a separate pump controller (e.g. as shown in FIG. 1). PMSM 200 can further include an encoder (e.g., a fine line rotary position encoder) for real time feedback of dispense motor 200's position. FIGS. 17-19 describe one embodiment of a PMSM motor. The use of a position sensor gives accurate and repeatable control of the position of piston 192, which leads to accurate and repeatable control over fluid movements in dispense chamber 185. For, example, using a 2000 line encoder, which according to one embodiment gives 8000 pulses to the DSP, it is possible to accurately measure to and control at 0.045 degrees of rotation. In addition, a PMSM can run at low velocities with little or no vibration. Feed motor 175 can also be a PMSM or a stepper motor. It should also be noted that the feed pump can include a home sensor to indicate when the feed pump is in its home position.

During operation of multi-stage pump 100, the valves of multi-stage pump 100 are opened or closed to allow or restrict fluid flow to various portions of multi-stage pump 100. According to one embodiment, these valves can be pneumatically actuated (i.e., gas driven) diaphragm valves that open or close depending on whether pressure or a vacuum is asserted. However, in other embodiments, any suitable valve can be used. One embodiment of a valve plate and corresponding valve components is described below in conjunction with FIGS. 9-16.

The following provides a summary of various stages of operation of multi-stage pump 100. However, multi-stage pump 100 can be controlled according to a variety of control schemes including, but not limited to those described in U.S. Provisional Patent Application No. 60/741,682 entitled "SYSTEM AND METHOD FOR PRESSURE COMPENSATION IN A PUMP" by Inventors Cedrone et al., filed Dec. 2, 2005, U.S. patent application Ser. No. 11/502,729 entitled "SYSTEMS AND METHODS FOR FLUID FLOW CONTROL IN AN IMMERSION LITHOGRAPHY SYSTEM" by Inventors Clarke et al., filed Aug. 11, 2006, U.S. patent application Ser. No. 11/602,472, entitled "SYSTEM AND METHOD FOR CORRECTING FOR PRESSURE VARIATIONS USING A MOTOR" by Inventors Gonnella et al., filed Nov. 20, 2006, U.S. patent application Ser. No. 11/292, 559 entitled "SYSTEM AND METHOD FOR CONTROL OF FLUID PRESSURE" by Inventors Gonnella et al., filed Dec. 2, 2005; U.S. patent application Ser. No. 11/364,286 entitled "SYSTEM AND METHOD FOR MONITORING OPERATION OF A PUMP" by Inventors Gonnella et al., filed Feb. 28, 2006, U.S. patent application Ser. No. 11/602, 508, entitled "SYSTEM AND METHOD FOR PRESSURE COMPENSATION IN A PUMP" by Inventors Cedrone et al., filed Nov. 20, 2006, U.S. patent application Ser. No. 11/602, 449, entitled "I/O SYSTEMS, METHODS AND DEVICES FOR INTERFACING A PUMP CONTROLLER" by Inventors Cedrone et al., filed Nov. 20, 2006, each of which is fully incorporated by reference herein, to sequence valves and control pressure. According to one embodiment, multi-stage pump 100 can include a ready segment, dispense segment, fill segment, pre-filtration segment, filtration segment, vent segment, purge segment and static purge segment. During the feed segment, inlet valve 125 is opened and feed stage pump 150 moves (e.g., pulls) feed stage diaphragm 160 to draw fluid into feed chamber 155. Once a sufficient amount of fluid has filled feed chamber 155, inlet valve 125 is closed. During the filtration segment, feed-stage pump 150 moves feed stage diaphragm 160 to displace fluid from feed chamber 155. Isolation valve 130 and barrier valve 135 are opened to allow fluid to flow through filter 120 to dispense chamber 185. Isolation valve 130, according to one embodiment, can be opened first (e.g., in the "pre-filtration segment") to allow pressure to build in filter 120 and then barrier valve 135 opened to allow fluid flow into dispense chamber 185. According to other embodiments, both isolation valve 130 and barrier valve 135 can be opened and the feed pump moved to build pressure on the dispense side of the filter. During the filtration segment, dispense pump 180 can be brought to its home position. As described in U.S. Provisional Patent Application No. 60/630,384, entitled "SYSTEM AND METHOD FOR A VARIABLE HOME POSITION DISPENSE SYSTEM" by Layerdiere, et al. filed Nov. 23, 2004 , U.S. patent application Ser. No. 11/666,124, entitled "SYSTEM AND METHOD FOR A VARIABLE HOME POSITION DISPENSE SYSTEM" by Layerdiere, et al. filed Apr. 24, 2007, and PCT Application No. PCT/US2005/042127, entitled "SYSTEM AND METHOD FOR VARIABLE HOME POSITION DISPENSE SYSTEM", by Applicant Entegris Inc. and Inventors Layerdiere et al., filed Nov. 21, 2005, all of which are hereby incorporated by reference, the home position of the dispense pump can be a position that gives the greatest available volume at the dispense pump for the dispense cycle, but is less than the maximum available volume that the dispense pump could provide. The home position is selected based on various parameters for the dispense cycle to reduce unused hold up volume of multi-stage pump 100. Feed pump 150 can similarly be brought to a home position that provides a volume that is less than its maximum available volume.

At the beginning of the vent segment, isolation valve 130 is opened, barrier valve 135 closed and vent valve 145 opened. In another embodiment, barrier valve 135 can remain open during the vent segment and close at the end of the vent segment. During this time, if barrier valve 135 is open, the pressure can be understood by the controller because the pressure in the dispense chamber, which can be measured by pressure sensor 112, will be affected by the pressure in filter 120. Feed-stage pump 150 applies pressure to the fluid to remove air bubbles from filter 120 through open vent valve 145. Feed-stage pump 150 can be controlled to cause venting to occur at a predefined rate, allowing for longer vent times and lower vent rates, thereby allowing for accurate control of the amount of vent waste. If feed pump is a pneumatic style pump, a fluid flow restriction can be placed in the vent fluid path, and the pneumatic pressure applied to feed pump can be increased or decreased in order to maintain a "venting" set point pressure, giving some control of an other wise uncontrolled method.

At the beginning of the purge segment, isolation valve 130 is closed, barrier valve 135, if it is open in the vent segment, is closed, vent valve 145 closed, and purge valve 140 opened and inlet valve 125 opened. Dispense pump 180 applies pressure to the fluid in dispense chamber 185 to vent air bubbles through purge valve 140. During the static purge segment, dispense pump 180 is stopped, but purge valve 140 remains open to continue to vent air. Any excess fluid removed during the purge or static purge segments can be routed out of multi-stage pump 100 (e.g., returned to the fluid source or discarded) or recycled to feed-stage pump 150. During the ready segment, inlet valve 125, isolation valve 130 and barrier valve 135 can be opened and purge valve 140 closed so that feed-stage pump 150 can reach ambient pressure of the source (e.g., the source bottle). According to other embodiments, all the valves can be closed at the ready segment.

During the dispense segment, outlet valve 147 opens and dispense pump 180 applies pressure to the fluid in dispense chamber 185. Because outlet valve 147 may react to controls more slowly than dispense pump 180, outlet valve 147 can be opened first and some predetermined period of time later dispense motor 200 started. This prevents dispense pump 180 from pushing fluid through a partially opened outlet valve 147. Moreover, this prevents fluid moving up the dispense nozzle caused by the valve opening, followed by forward fluid motion caused by motor action. In other embodiments, outlet valve 147 can be opened and dispense begun by dispense pump 180 simultaneously.

An additional suckback segment can be performed in which excess fluid in the dispense nozzle is removed. During the suckback segment, outlet valve 147 can close and a secondary motor or vacuum can be used to suck excess fluid out of the outlet nozzle. Alternatively, outlet valve 147 can remain open and dispense motor 200 can be reversed to such fluid back into the dispense chamber. The suckback segment helps prevent dripping of excess fluid onto the wafer.

Figure 3:
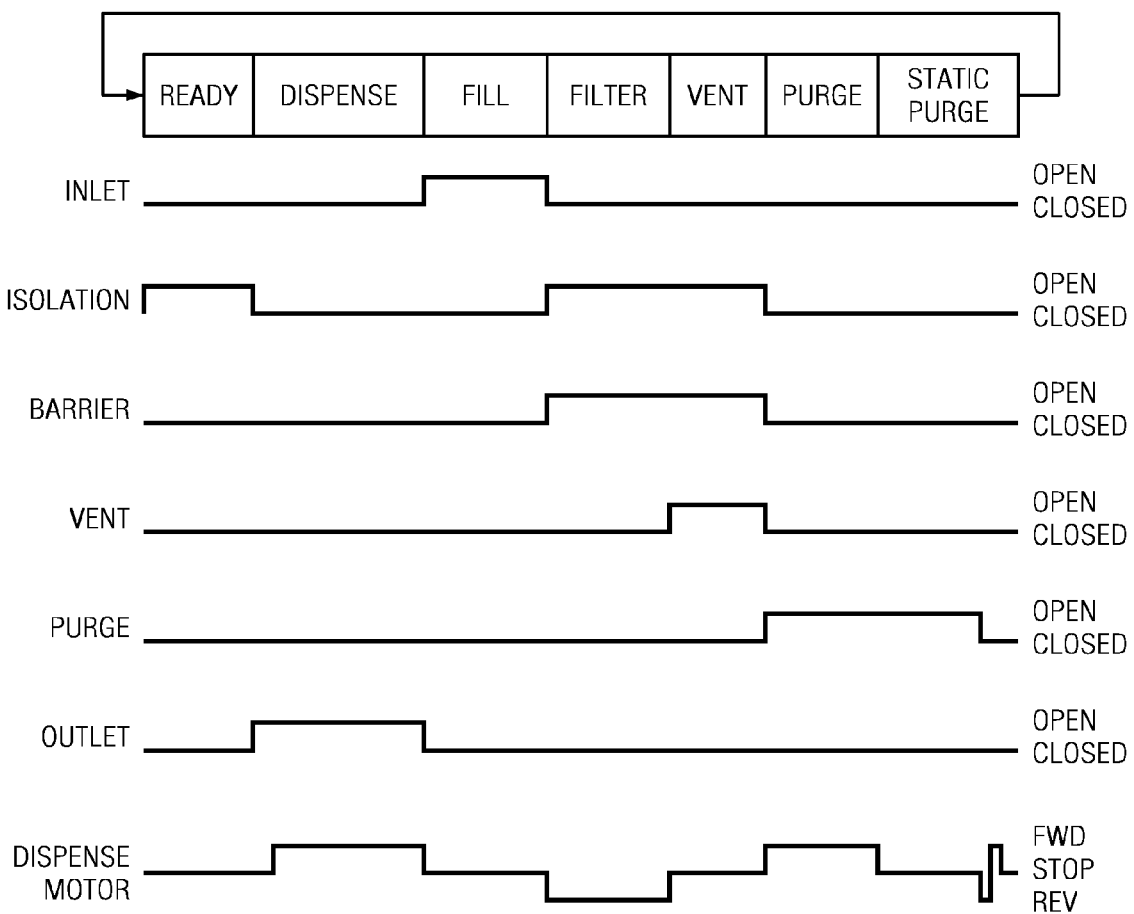
FIG. 3 is a diagrammatic representation of valve and motor timings for one embodiment.

Referring briefly to FIG. 3, this figure provides a diagrammatic representation of valve and dispense motor timings for various segments of the operation of multi-stage pump 100 of FIG. 2. Other sequences are shown in FIGS. 20A and 20C-F. While several valves are shown as closing simultaneously during segment changes, the closing of valves can be timed slightly apart (e.g., 100 milliseconds) to reduce pressure spikes. For example, between the vent and purge segment, isolation valve 130 can be closed shortly before vent valve 145. It should be noted, however, other valve timings can be utilized in various embodiments. Additionally, several of the segments can be performed together (e.g., the fill/dispense stages can be performed at the same time, in which case both the inlet and outlet valves can be open in the dispense/fill segment). It should be further noted that specific segments do not have to be repeated for each cycle. For example, the purge and static purge segments may not be performed every cycle. Similarly, the vent segment may not be performed every cycle.

The opening and closing of various valves can cause pressure spikes in the fluid within multi-stage pump 100. Because outlet valve 147 is closed during the static purge segment, closing of purge valve 140 at the end of the static purge segment, for example, can cause a pressure increase in dispense chamber 185. This can occur because each valve may displace a small volume of fluid when it closes. More particularly, in many cases before a fluid is dispensed from chamber 185 a purge cycle and/or a static purge cycle is used to purge air from dispense chamber 185 in order to prevent sputtering or other perturbations in the dispense of the fluid from multi-stage pump 100. At the end of the static purge cycle, however, purge valve 140 closes in order to seal dispense chamber 185 in preparation for the start of the dispense. As purge valve 140 closes it forces a volume of extra fluid (approximately equal to the hold-up volume of purge valve 140) into dispense chamber 185, which, in turn, causes an increase in pressure of the fluid in dispense chamber 185 above the baseline pressure intended for the dispense of the fluid. This excess pressure (above the baseline) may cause problems with a subsequent dispense of fluid. These problems are exacerbated in low pressure applications, as the pressure increase caused by the closing of purge valve 140 may be a greater percentage of the baseline pressure desirable for dispense.

More specifically, because of the pressure increase that occurs due to the closing of purge valve 140 a "spitting" of fluid onto the wafer, a double dispense or other undesirable fluid dynamics may occur during the subsequent dispense segment if the pressure is not reduced. Additionally, as this pressure increase may not be constant during operation of multi-stage pump 100, these pressure increases may cause variations in the amount of fluid dispensed, or other characteristics of the dispense, during successive dispense segments. These variations in the dispense may in turn cause an increase in wafer scrap and rework of wafers. Various embodiments account for the pressure increase due to various valve closings within the system to achieve a desirable starting pressure for the beginning of the dispense segment, account for differing head pressures and other differences in equipment from system to system by allowing almost any baseline pressure to be achieved in dispense chamber 185 before a dispense.

In one embodiment, to account for unwanted pressure increases to the fluid in dispense chamber 185, during the static purge segment dispense motor 200 may be reversed to back out piston 192 a predetermined distance to compensate for any pressure increase caused by the closure of barrier valve 135, purge valve 140 and/or any other sources which may cause a pressure increase in dispense chamber 185.

Thus, embodiments described herein provide a multi-stage pump with gentle fluid handling characteristics. By compensating for pressure fluctuations in a dispense chamber before a dispense segment, potentially damaging pressure spikes can be avoided or mitigated. Embodiments of a multi-stage pump can also employ other pump control mechanisms and valve timings to help reduce deleterious effects of pressure on a process fluid.

Figure 4A:
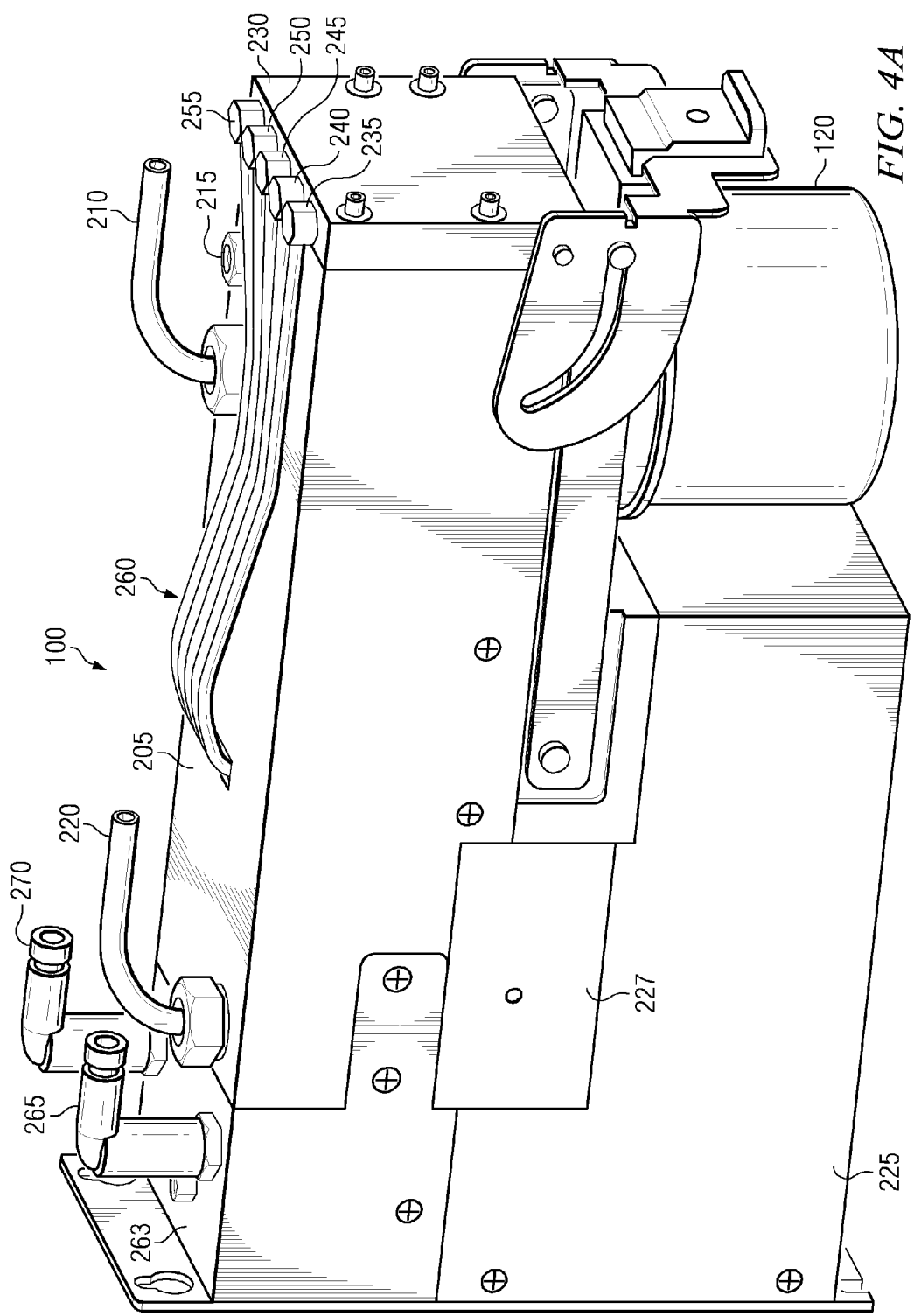

FIG. 4A is a diagrammatic representation of one embodiment of a pump assembly for multi-stage pump 100. Multi-stage pump 100 can include a dispense block 205 that defines various fluid flow paths through multi-stage pump 100 and at least partially defines feed chamber 155 and dispense chamber 185. Dispense pump block 205, according to one embodiment, can be a unitary block of PTFE, modified PTFE or other material. Because these materials do not react with or are minimally reactive with many process fluids, the use of these materials allows flow passages and pump chambers to be machined directly into dispense block 205 with a minimum of additional hardware. Dispense block 205 consequently reduces the need for piping by providing an integrated fluid manifold.

Figure 5A:
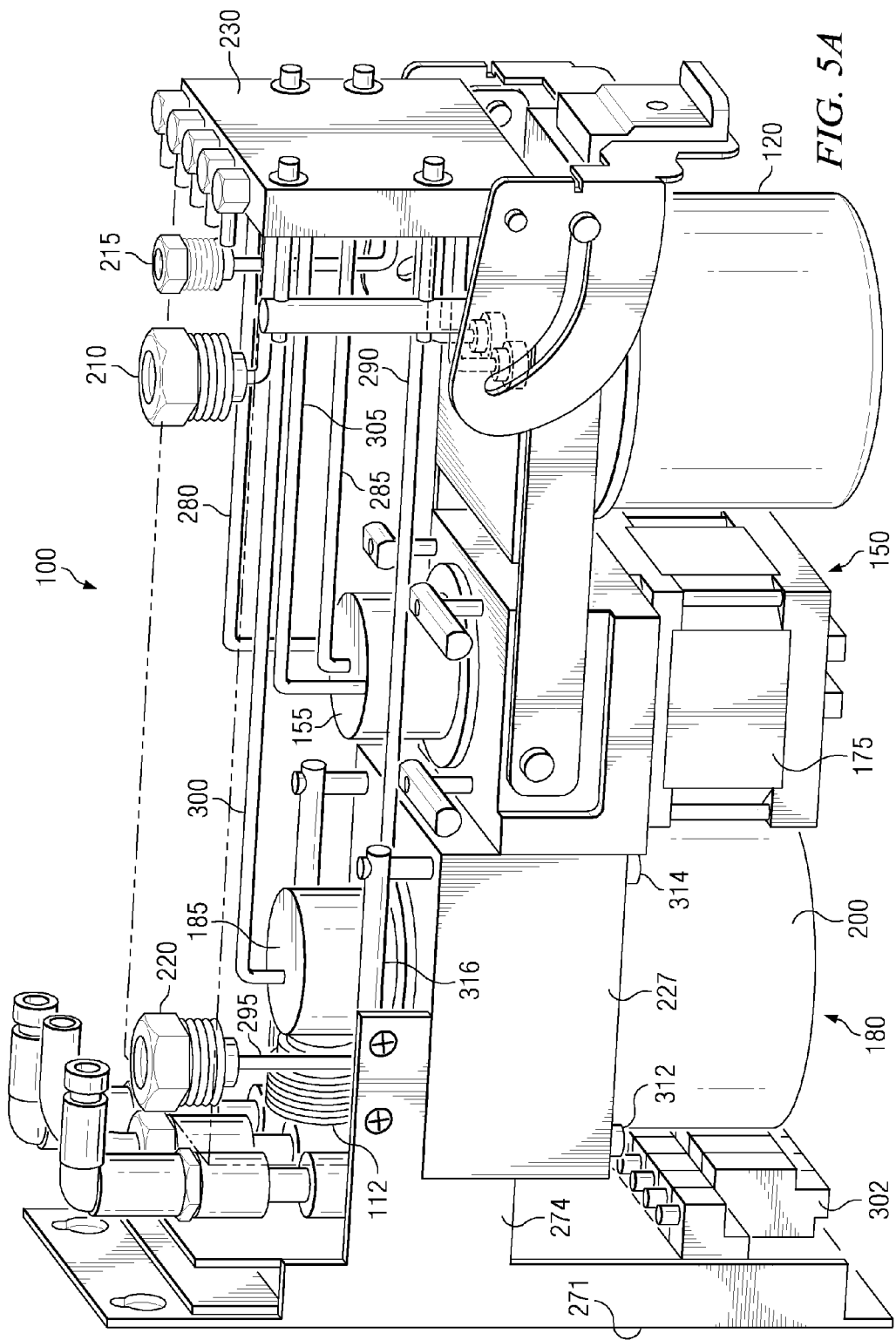
Figure 5B:
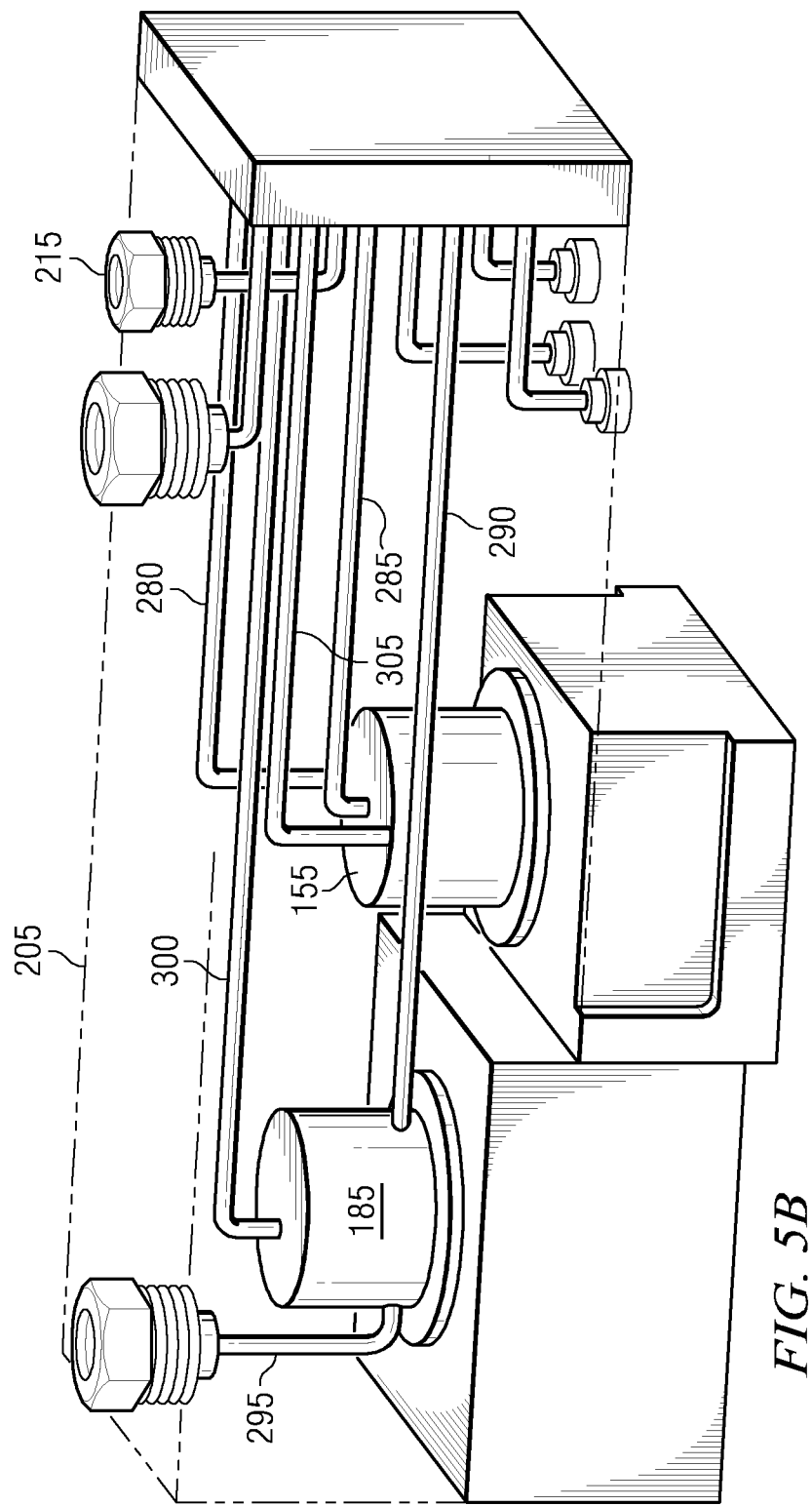
FIG. 5B is a diagrammatic representation of one embodiment of a dispense block.

Dispense block 205 can include various external inlets and outlets including, for example, inlet 210 through which the fluid is received, vent outlet 215 for venting fluid during the vent segment, and dispense outlet 220 through which fluid is dispensed during the dispense segment. Dispense block 205, in the example of FIG. 4A, does not include an external purge outlet as purged fluid is routed back to the feed chamber (as shown in FIG. 5A and FIG. 5B). In other embodiments, however, fluid can be purged externally. U.S. Provisional Patent Application No. 60/741,667, entitled "O-RING-LESS LOW PROFILE FITTING AND ASSEMBLY THEREOF" by Iraj Gashgaee, filed Dec. 2, 2005, which is hereby fully incorporated by reference herein, describes an embodiment of fittings that can be utilized to connect the external inlets and outlets of dispense block 205 to fluid lines.

Dispense block 205 routes fluid to the feed pump, dispense pump and filter 120. A pump cover 225 can protect feed motor 175 and dispense motor 200 from damage, while piston housing 227 can provide protection for piston 165 and piston 192 and, according to one embodiment, be formed of polyethylene or other polymer. Valve plate 230 provides a valve housing for a system of valves (e.g., inlet valve 125, isolation valve 130, barrier valve 135, purge valve 140 and vent valve 145 of FIG. 2) that can be configured to direct fluid flow to various components of multi-stage pump 100. According to one embodiment, each of inlet valve 125, isolation valve 130, barrier valve 135, purge valve 140 and vent valve 145 is at least partially integrated into valve plate 230 and is a diaphragm valve that is either opened or closed depending on whether pressure or vacuum is applied to the corresponding diaphragm. In other embodiments, some of the valves may be external to dispense block 205 or arranged in additional valve plates. According to one embodiment, a sheet of PTFE is sandwiched between valve plate 230 and dispense block 205 to form the diaphragms of the various valves. Valve plate 230 includes a valve control inlet for each valve to apply pressure or vacuum to the corresponding diaphragm. For example, inlet 235 corresponds to barrier valve 135, inlet 240 to purge valve 140, inlet 245 to isolation valve 130, inlet 250 to vent valve 145, and inlet 255 to inlet valve 125 (outlet valve 147 is external in this case). By the selective application of pressure or vacuum to the inlets, the corresponding valves are opened and closed.

A valve control gas and vacuum are provided to valve plate 230 via valve control supply lines 260, which run from a valve control manifold (in an area beneath top cover 263 or housing cover 225), through dispense block 205 to valve plate 230. Valve control gas supply inlet 265 provides a pressurized gas to the valve control manifold and vacuum inlet 270 provides vacuum (or low pressure) to the valve control manifold. The valve control manifold acts as a three way valve to route pressurized gas or vacuum to the appropriate inlets of valve plate 230 via supply lines 260 to actuate the corresponding valve(s). As discussed below in conjunction with FIGS. 9-16, a valve plate can be used that reduces the hold-up volume of the valve, eliminates volume variations due to vacuum fluctuations, reduces vacuum requirements and reduces stress on the valve diaphragm.

FIG. 4B is a diagrammatic representation of another embodiment of multistage pump 100. Many of the features shown in FIG. 4B are similar to those described in conjunction with FIG. 4A above. However, the embodiment of FIG. 4B includes several features to prevent fluid drips from entering the area of multi-stage pump 100 housing electronics. Fluid drips can occur, for example, when an operator connects or disconnects a tube from inlet 210, outlet 215 or vent 220. The "drip-proof" features are designed to prevent drips of potentially harmful chemicals from entering the pump, particularly the electronics chamber and do not necessarily require that the pump be "water-proof" (e.g., submersible in fluid without leakage). According to other embodiments, the pump can be fully sealed.

According to one embodiment, dispense block 205 can include a vertically protruding flange or lip 272 protruding outward from the edge of dispense block 205 that meets top cover 263. On the top edge, according to one embodiment, the top of top cover 263 is flush with the top surface of lip 272. This causes drips near the top interface of dispense block 205 and top cover 263 to tend to run onto dispense block 205, rather than through the interface. On the sides, however, top cover 263 is flush with the base of lip 272 or otherwise inwardly offset from the outer surface of lip 272. This causes drips to tend to flow down the corner created by top cover 263 and lip 272, rather than between top cover 263 and dispense block 205. Additionally, a rubber seal is placed between the top edge of top cover 263 and back plate 271 to prevent drips from leaking between top cover 263 and back plate 271.

Dispense block 205 can also include sloped feature 273 that includes a sloped surface defined in dispense block 205 that slopes down and away from the area of pump 100 housing electronics. Consequently, drips near the top of dispense block 205 are lead away from the electronics. Additionally, pump cover 225 can also be offset slightly inwards from the outer side edges of dispense block 205 so that drips down the side of pump 100 will tend to flow past the interface of pump cover 225 and other portions of pump 100.

According to one embodiment, wherever a metal cover interfaces with dispense block 205, the vertical surfaces of the metal cover can be slightly inwardly offset (e.g., 1/64 of an inch or 0.396875 millimeters) from the corresponding vertical surface of dispense block 205. Additionally, multi-stage pump 100 can include seals, sloped features and other features to prevent drips from entering portions of multi-stage pump 100 housing electronics. Furthermore, as shown in FIG. 5A, discussed below, back plate 271 can include features to further "drip-proof" multi-stage pump 100.

FIG. 5A is a diagrammatic representation of one embodiment of multi-stage pump 100 with dispense block 205 made transparent to show the fluid flow passages defined there through. Dispense block 205 defines various chambers and fluid flow passages for multi-stage pump 100. According to one embodiment, feed chamber 155 and dispense chamber 185 can be machined directly into dispense block 205. Additionally, various flow passages can be machined into dispense block 205. Fluid flow passage 275 (shown in FIG. 5C) runs from inlet 210 to the inlet valve. Fluid flow passage 280 runs from the inlet valve to feed chamber 155, to complete the pump inlet path from inlet 210 to feed pump 150. Inlet valve 125 in valve housing 230 regulates flow between inlet 210 and feed pump 150. Flow passage 285 routes fluid from feed pump 150 to isolation valve 130 in valve plate 230. The output of isolation valve 130 is routed to filter 120 by another flow passage (not shown). These flow paths act as a feed stage outlet flow path to filter 120. Fluid flows from filter 120 through flow passages that connect filter 120 to the vent valve 145 and barrier valve 135. The output of vent valve 145 is routed to vent outlet 215 to complete a vent flow path while the output of barrier valve 135 is routed to dispense pump 180 via flow passage 290. Thus, the flow passage from filter 120 to barrier valve 135 and flow passage 290 act as feed stage inlet flow path. Dispense pump, during the dispense segment, can output fluid to outlet 220 via flow passage 295 (e.g., a pump outlet flow path) or, in the purge segment, to the purge valve through flow passage 300. During the purge segment, fluid can be returned to feed pump 150 through flow passage 305. Thus, flow passage 300 and flow passage 305 act as a purge flow path to return fluid to feed chamber 155. Because the fluid flow passages can be formed directly in the PTFE (or other material) block, dispense block 205 can act as the piping for the process fluid between various components of multi-stage pump 100, obviating or reducing the need for additional tubing. In other cases, tubing can be inserted into dispense block 205 to define the fluid flow passages. FIG. 5B provides a diagrammatic representation of dispense block 205 made transparent to show several of the flow passages therein, according to one embodiment.

Returning to FIG. 5A, FIG. 5A also shows multi-stage pump 100 with pump cover 225 and top cover 263 removed to show feed pump 150, including feed stage motor 190, dispense pump 180, including dispense motor 200, and valve control manifold 302. According to one embodiment, portions of feed pump 150, dispense pump 180 and valve plate 230 can be coupled to dispense block 205 using bars (e.g., metal bars) inserted into corresponding cavities in dispense block 205. Each bar can include on or more threaded holes to receive a screw. As an example, dispense motor 200 and piston housing 227 can be mounted to dispense block 205 via one or more screws (e.g., screw 312 and screw 314) that run through screw holes in dispense block 205 to thread into corresponding holes in bar 316. It should be noted that this mechanism for coupling components to dispense block 205 is provided by way of example and any suitable attachment mechanism can be used.

Back plate 271, according to one embodiment, can include inwardly extending tabs (e.g., bracket 274) to which top cover 263 and pump cover 225 mount. Because top cover 263 and pump cover 225 overlap bracket 274 (e.g., at the bottom and back edges of top cover 263 and the top and back edges pump cover 225) drips are prevented from flowing into the electronics area between any space between the bottom edge of top cover 263 and the top edge of pump cover 225 or at the back edges of top cover 263 and pump cover 225.

Manifold 302, according to one embodiment, can include a set of solenoid valves to selectively direct pressure/vacuum to valve plate 230. When a particular solenoid is on thereby directing vacuum or pressure to a valve, depending on implementation, the solenoid will generate heat. According to one embodiment, manifold 302 is mounted below a PCB board (which is mounted to back plate 271 and better shown in FIG. 5C) away from dispense block 205 and particularly dispense chamber 185. Manifold 302 can be mounted to a bracket that is, in turn, mounted to back plate 271 or can be coupled otherwise to back plate 271. This helps prevent heat from the solenoids in manifold 302 from affecting fluid in dispense block 205. Back plate 271 can be made of stainless steel machined aluminum or other material that can dissipate heat from manifold 302 and the PCB. Put another way, back plate 271 can act as a heat dissipating bracket for manifold 302 and the PCB. Pump 100 can be further mounted to a surface or other structure to which heat can be conducted by back plate 271. Thus, back plate 271 and the structure to which it is attached act as a heat sink for manifold 302 and the electronics of pump 100.

Figure 5C:
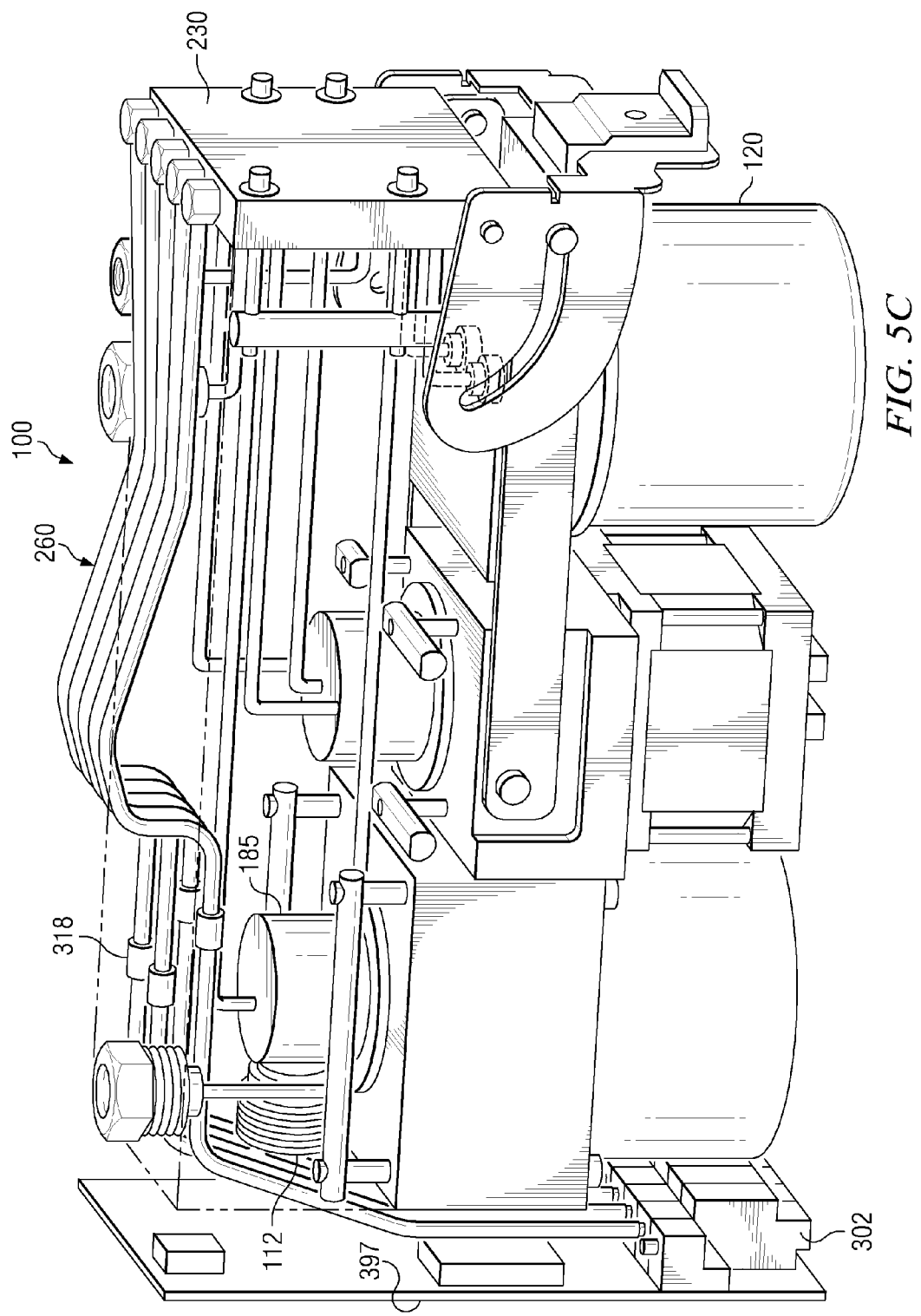

FIG. 5C is a diagrammatic representation of multi-stage pump 100 showing supply lines 260 for providing pressure or vacuum to valve plate 230. As discussed in conjunction with FIG. 4, the valves in valve plate 230 can be configured to allow fluid to flow to various components of multi-stage pump 100. Actuation of the valves is controlled by the valve control manifold 302 that directs either pressure or vacuum to each supply line 260. Each supply line 260 can include a fitting (an example fitting is indicated at 318) with a small orifice. This orifice may be of a smaller diameter than the diameter of the corresponding supply line 260 to which fitting 318 is attached. In one embodiment, the orifice may be approximately 0.010 inches in diameter. Thus, the orifice of fitting 318 may serve to place a restriction in supply line 260. The orifice in each supply line 260 helps mitigate the effects of sharp pressure differences between the application of pressure and vacuum to the supply line and thus may smooth transitions between the application of pressure and vacuum to the valve. In other words, the orifice helps reduce the impact of pressure changes on the diaphragm of the downstream valve. This allows the valve to open and close more smoothly and more slowly which may lead to smoother pressure transitions within the system which may be caused by the opening and closing of the valve and may in fact increase the longevity of the valve itself.

Figure 5D:
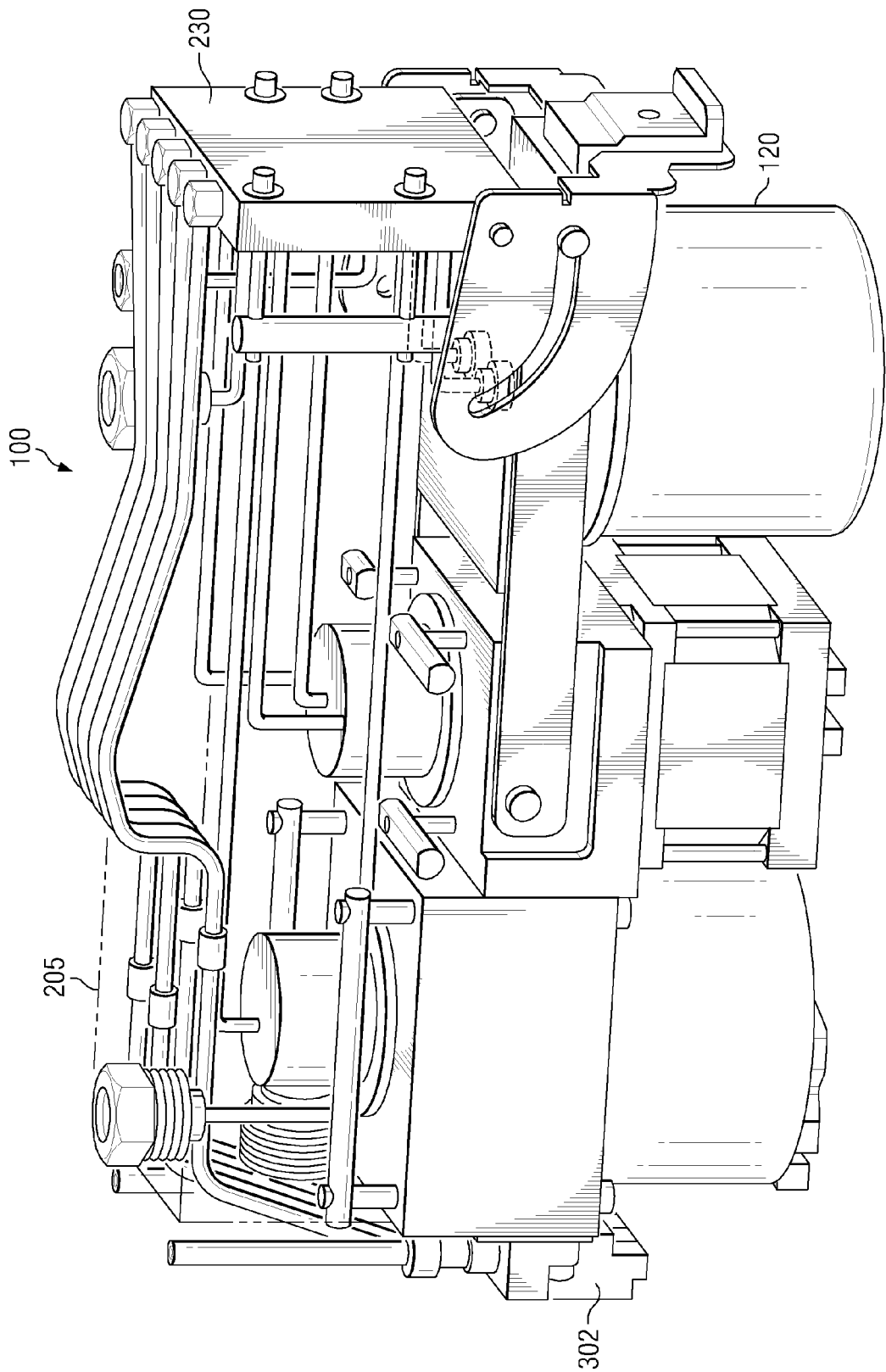

FIG. 5C also illustrates PCB 397. Manifold 302, according to one embodiment, can receive signals from PCB board 397 to cause solenoids to open/close to direct vacuum/pressure to the various supply lines 260 to control the valves of multi-stage pump 100. Again, as shown in FIG. 5C, manifold 302 can be located at the distal end of PCB 397 from dispense block 205 to reduce the effects of heat on the fluid in dispense block 205. Additionally, to the extent feasible based on PCB design and space constraints, components that generate heat can be placed on the side of PCB away from dispense block 205, again reducing the effects of heat. Heat from manifold 302 and PCB 397 can be dissipated by back plate 271. FIG. 5D, on the other hand, is a diagrammatic representation of an embodiment of pump 100 in which manifold 302 is mounted directly to dispense block 205.

Figure 6:
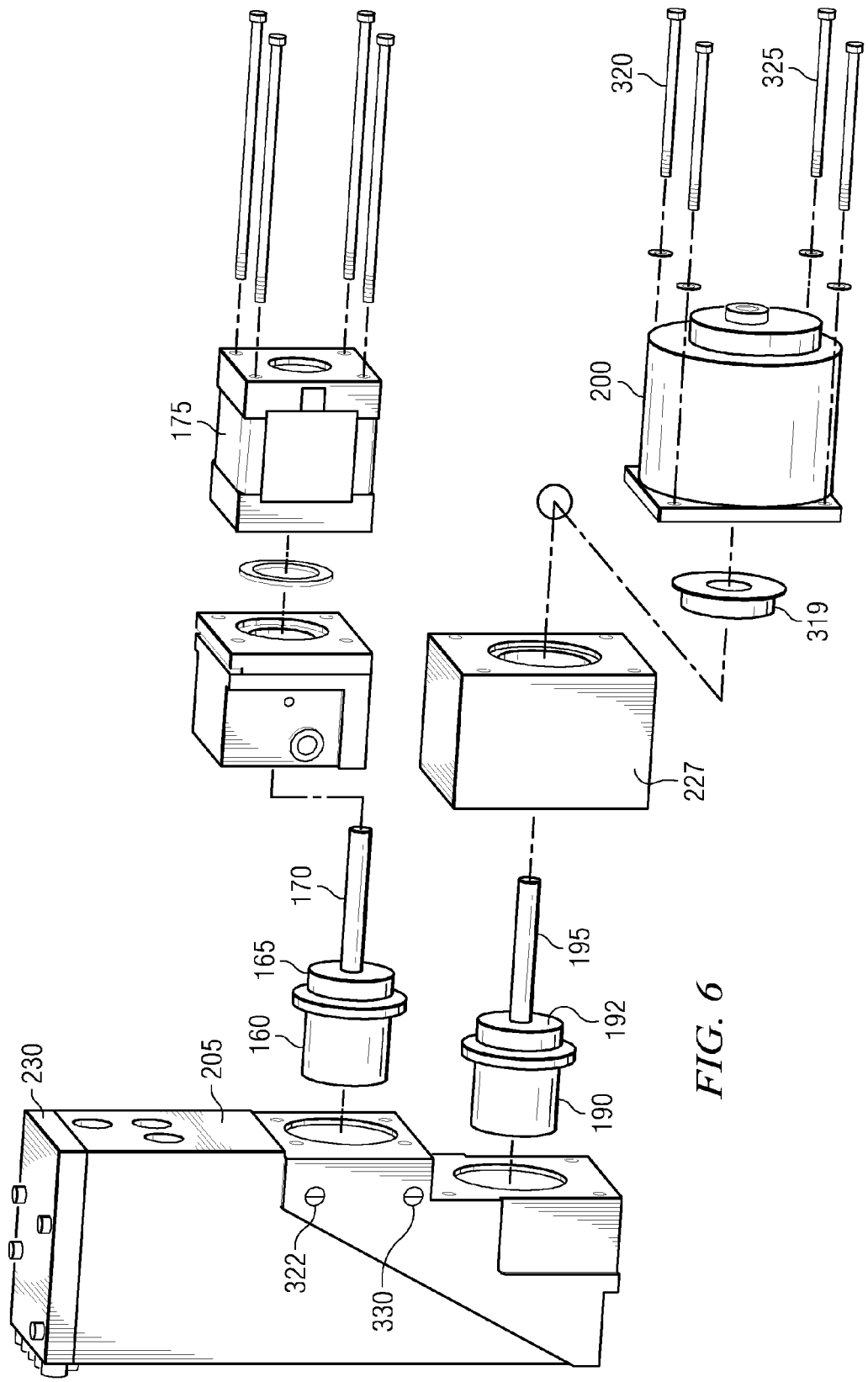
FIG. 6 is a diagrammatic representation of one embodiment of a partial assembly of a multi-stage pump.

FIG. 6 is a diagrammatic representation illustrating the partial assembly of one embodiment of multi-stage pump 100. In FIG. 6, valve plate 230 is already coupled to dispense block 205, as described above. For feed stage pump 150, diaphragm 160 with lead screw 170 can be inserted into the feed chamber 155, whereas for dispense pump 180, diaphragm 190 with lead screw 195 can be inserted into dispense chamber 185. Piston housing 227 is placed over the feed and dispense chambers with the lead screws running there through. In this case a single shaped block acts as a piston housing for the dispense stage piston and feed stage piston, however each stage can have separate housing components. Dispense motor 200 couples to lead screw 195 and can impart linear motion to lead screw 195 through a rotating female-threaded nut. Similarly, feed motor 175 is coupled to lead screw 170 and can also impart linear motion to lead screw 170 through a rotating female-threaded nut. A spacer 319 can be used to offset dispense motor 200 from piston housing 227. Screws in the embodiment shown, attach feed motor 175 and dispense motor 200 to multi-stage pump 100 using bars with threaded holes inserted into dispense block 205, as described in conjunction with FIG. 5. For example, screw 315 can be threaded into threaded holes in bar 320 and screw 325 can be threaded into threaded holes in bar 330 to attach feed motor 175.

Figure 7:
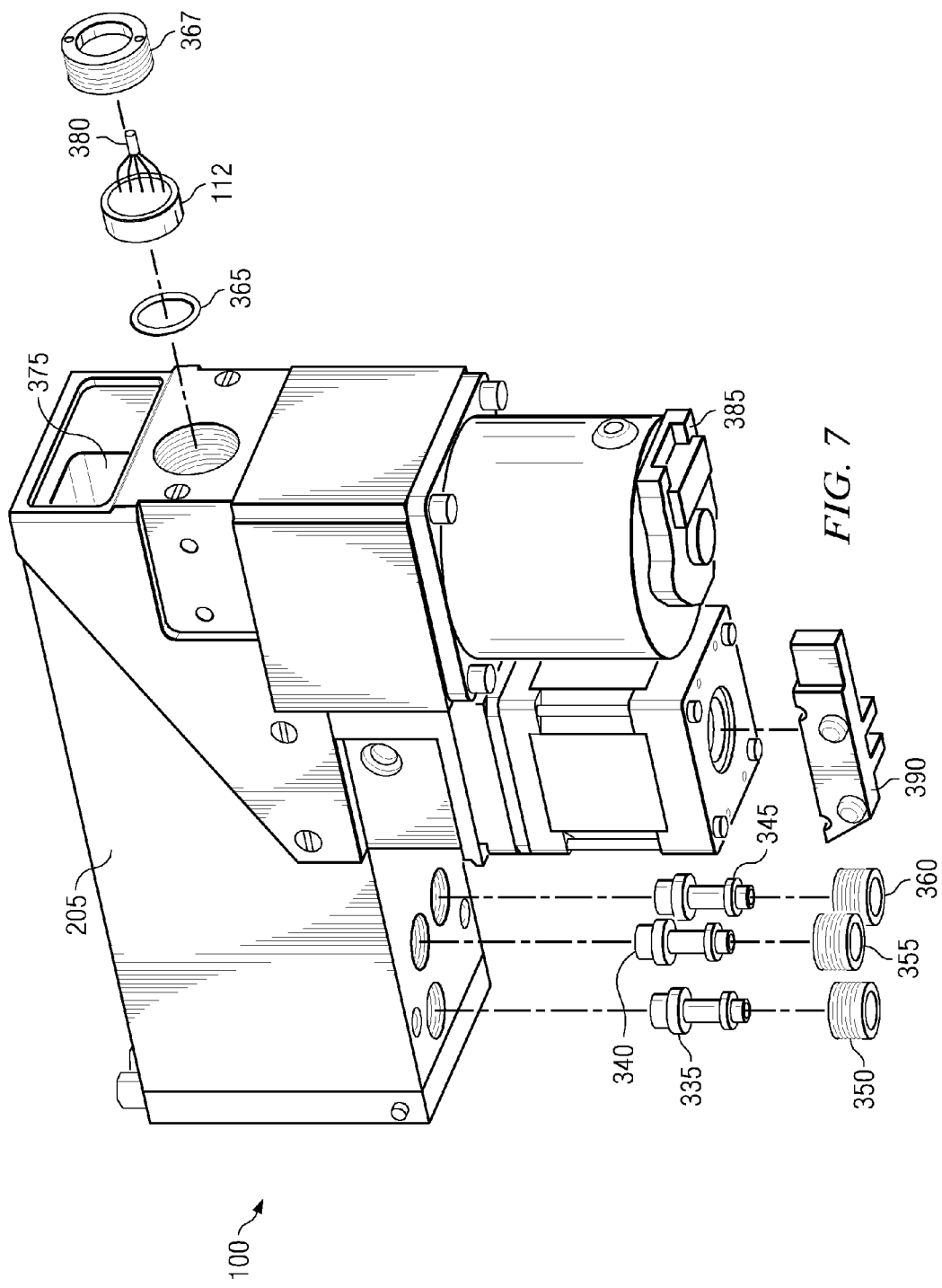
FIG. 7 is a diagrammatic representation of another embodiment of a partial assembly of a multi-stage pump.

FIG. 7 is a diagrammatic representation further illustrating a partial assembly of one embodiment of multi-stage pump 100. FIG. 7 illustrates adding filter fittings 335, 340 and 345 to dispense block 205. Nuts 350, 355, 360 can be used to hold filter fittings 335, 340, 345. U.S. Provisional Patent Application No. 60/741,667, entitled "O-RING-LESS LOW PROFILE FITTING AND ASSEMBLY THEREOF" by Iraj Gashgaee, filed Dec. 2, 2005, which is hereby fully incorporated by reference herein, describes an embodiment of low profile fittings that can be used between filter 120 and dispense block 205. However, it should be noted that any suitable fitting can be used and the fittings illustrated are provided by way of example. Each filter fitting leads to one of the flow passage to feed chamber, the vent outlet or dispense chamber (all via valve plate 230). Pressure sensor 112 can be inserted into dispense block 205, with the pressure sensing face exposed to dispense chamber 185. An o-ring 365 seals the interface of pressure sensor 112 with dispense chamber 185. Pressure sensor 112 is held securely in place by nut 367. The valve control lines (not shown) run from the outlet of the valve manifold (e.g., valve manifold 302) into dispense block 205 at opening 375 and out the top of dispense block 205 to valve plate 230 (as shown in FIG. 4). In other embodiments, the pressure sensor can be located to read pressure in the feed chamber or multiple pressure sensors can be used to determine the pressure in the feed chamber, the dispense chamber or elsewhere in the pump.

FIG. 7 also illustrates several interfaces for communications with a pump controller (e.g., pump controller 20 of FIG. 1). Pressure sensor 112 communicates pressure readings to controller 20 via one or more wires (represented at 380). Dispense motor 200 includes a motor control interface 385 to receive signals from pump controller 20 to cause dispense motor 200 to move. Additionally, dispense motor 200 can communicate information to pump controller 20 including position information (e.g., from a position line encoder). Similarly, feed motor 175 can include a communications interface 390 to receive control signals from and communicate information to pump controller 20.

Figure 8A:
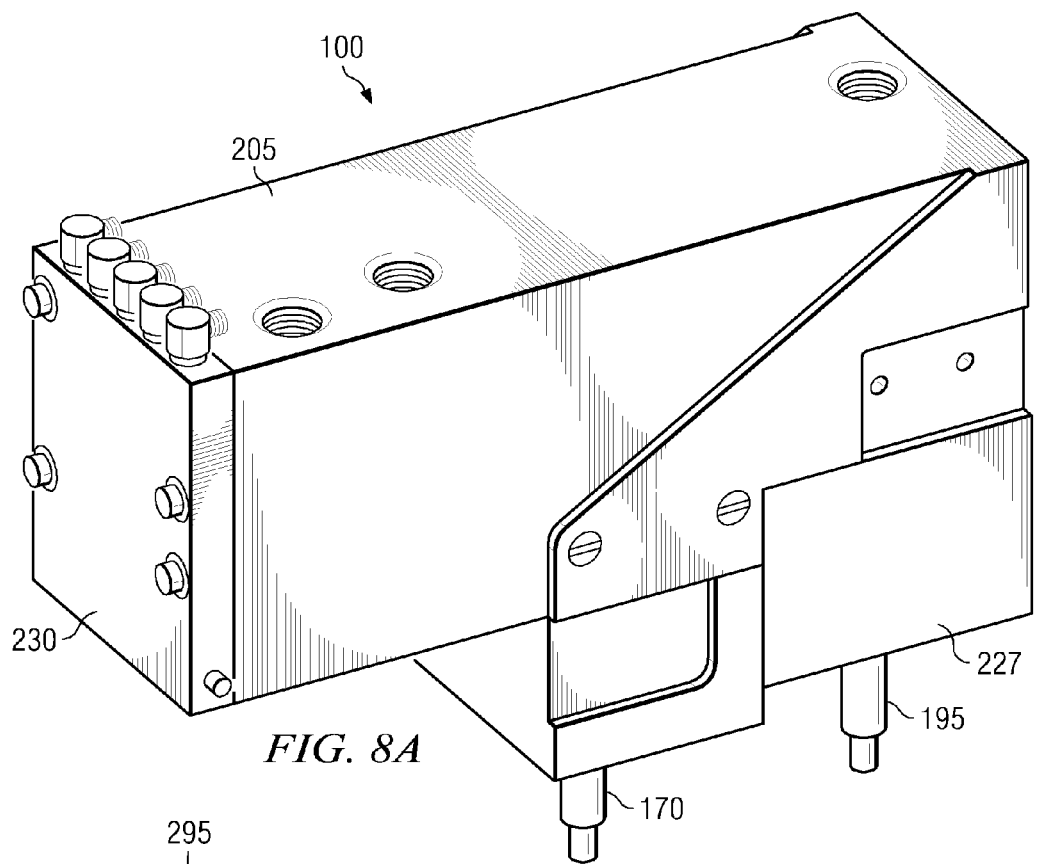
FIG. 8A is a diagrammatic representation of one embodiment of a portion of a multi-stage pump.
Figure 8B:
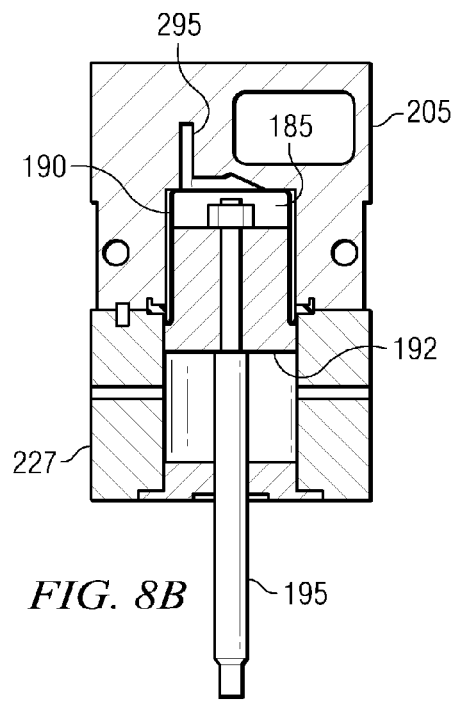
FIG. 8B is diagrammatic representation of a section of the embodiment of multi-stage pump of FIG. 8A including the dispense chamber.
Figure 8C:
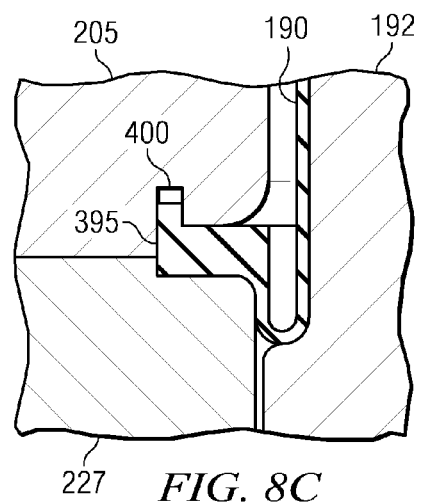
FIG. 8C is a diagrammatic representation of a section of the embodiment of multi-stage pump of FIG. 8B.

FIG. 8A illustrates a side view of a portion of multi-stage pump 100 including dispense block 205, valve plate 230, piston housing 227, lead screw 170 and lead screw 195. FIG. 8B illustrates a section view of FIG. 8A showing dispense block 205, dispense chamber 185, piston housing 227, lead screw 195, piston 192 and dispense diaphragm 190. As shown in FIG. 8B, dispense chamber 185 can be at least partially defined by dispense block 205. As lead screw 195 actuates, piston 192 can move up (relative to the alignment shown in FIG. 8B) to displace dispense diaphragm 190, thereby causing fluid in dispense chamber 185 to exit the chamber via outlet flow passage 295 or purge flow passage 300. In other embodiments, lead screw 195 can rotate as it moves up and down. It should be noted that the entrances and exits of the flow passages can be variously placed in dispense chamber 185 and FIG. 22b shows and embodiment in which purge flow passage 300 exits the top of dispense chamber 185. FIG. 8C illustrates a portion of FIG. 8B. In the embodiment shown in FIG. 8C, dispense diaphragm 190 includes a tong 395 that fits into a grove 400 in dispense block 205. The edge of dispense diaphragm 190, in this embodiment, is thus sealed between piston housing 227 and dispense block 205. According to one embodiment, dispense pump and/or feed pump 150 can be a rolling diaphragm pump.

It should be noted that the multi-stage pump 100 described in conjunction with FIGS. 1-8C is provided by way of example, but not limitation, and other multi-stage pump configurations can be implemented.

Figure 9:
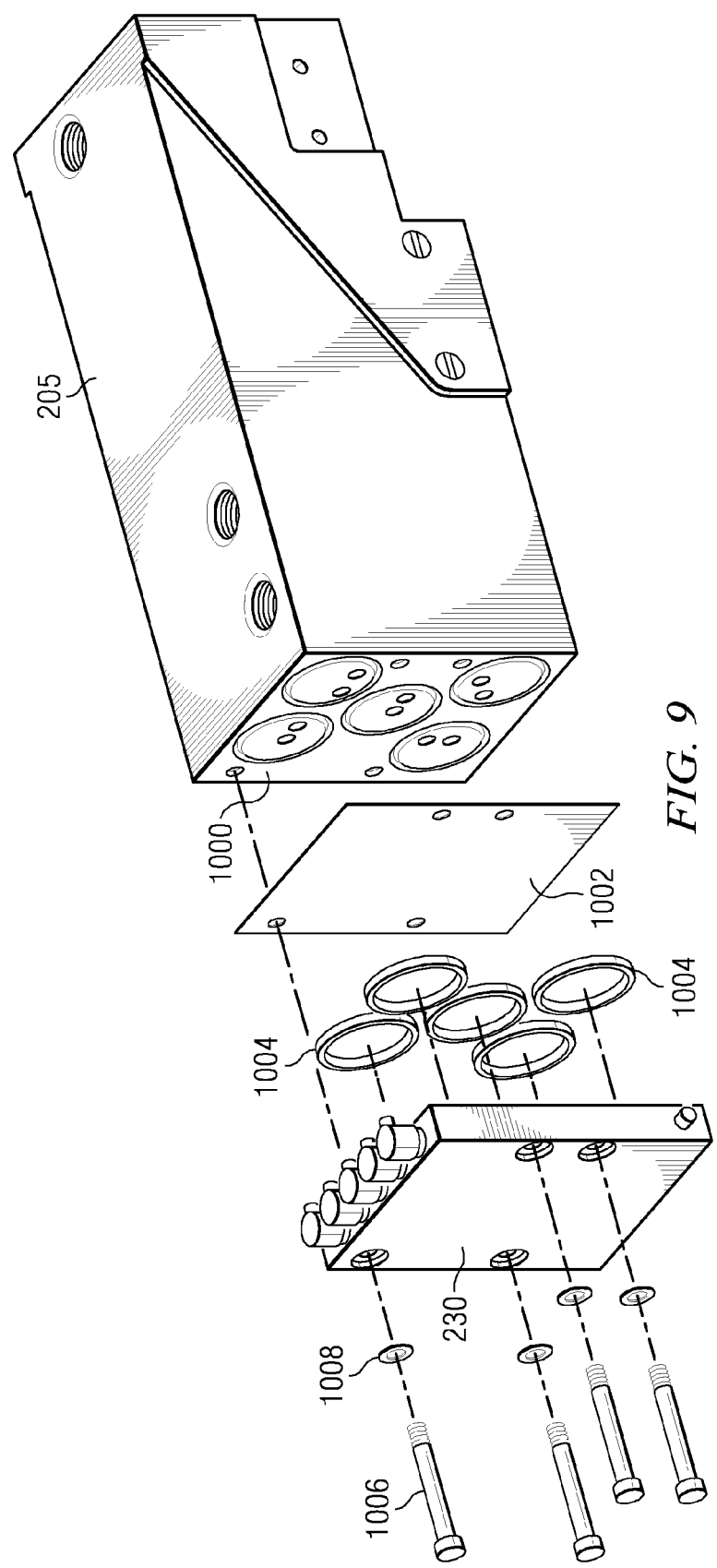
FIG. 9 is a diagrammatic representation illustrating the construction of one or more valves using an embodiment of a valve plate and dispense block.

FIG. 9 illustrates one embodiment of various components used in forming input valve 125, isolation valve 130, barrier valve 135, purge valve 140 and vent valve 145 according to one embodiment. Output valve 147 is external to the pump in this embodiment. As shown in FIG. 9, dispense block 205 has an end surface 1000 upon which diaphragm 1002 is placed. O-rings 1004 are aligned with corresponding rings on end surface 1000 and press diaphragm 1002 partially into the rings in dispense block 205. Valve plate 230 also includes corresponding rings in which O-rings 1004 are at least partially seated. Valve plate 230 is connected to dispense block 205 using washers and screws (shown at 1006 and 1008). Thus, as shown in FIG. 9, the body of each valve can be formed of multiple pieces such as the dispense block (or other part of the pump body) and a valve plate. A sheet of elastomeric material, illustrated as diaphragm 1002, is sandwiched between valve plate 230 and dispense block 205 to form the diaphragms of the various valves. Diaphragm 1002, according to one embodiment, can be a single diaphragm used for each of input valve 125, isolation valve 130, barrier valve 135, purge valve 140 and vent valve 145. Diaphragm 1002 can be PTFE, modified PTFE, a composite material of different layer types or other suitable material that is non-reactive with the process fluid. According to one embodiment, diaphragm 1002 can be approximately 0.013 inches thick. It should be noted that in other embodiments, separate diaphragms can be used for each valve and other types of diaphragms can be used.

FIG. 10A illustrates one embodiment of a side view of dispense block 205 having end surface 1000. FIG. 10B illustrates one embodiment of end surface 1000 of dispense block 205. For each valve, in the embodiment shown, end surface 1000 includes an annular ring into which an O-Ring partially pushes a portion of the diaphragm. For example, ring 1010 corresponds to input valve 125, ring 1012 corresponds to isolation valve 130, ring 1014 corresponds to barrier valve 135, ring 1016 corresponds to purge valve 130 and ring 1018 corresponds to vent valve 145. FIG. 10B also illustrates the input/output flow passages for each valve. Flow passage 1020 leads from the inlet 210 (shown in FIG. 4) to inlet valve 125 and flow passage 280 leads from inlet valve 125 to the feed chamber; for isolation valve 130, flow passage 305 leads from the feed chamber to isolation valve 130 and flow passage 1022 leads from isolation valve 130 to the filter; for barrier valve 135, flow passage 1024 leads from the filter to barrier valve 135 and flow passage 290 leads from barrier valve 135 to the dispense chamber; for purge valve 140, flow passage 300 leads from the dispense chamber and flow passage 305 leads to the feed chamber; and for vent valve 145, flow passage 1026 leads from the filter and flow passage 1027 leads out of the pump (e.g., out vent 215, shown in FIG. 4). Several of the above-referenced flow passages can be seen running through dispense block 205 in FIGS. 5A-D, above.

Figure 11:
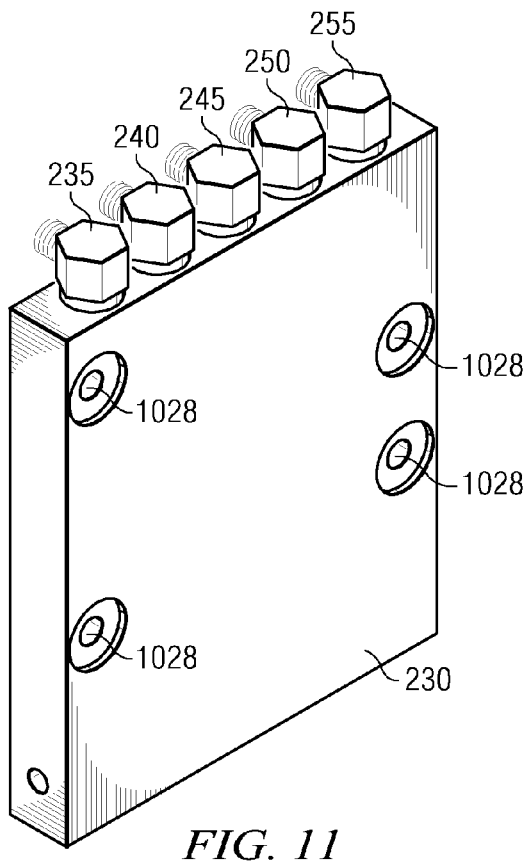
FIG. 11 is a diagrammatic representation of one embodiment of a valve plate.

FIG. 11 is a diagrammatic representation of one embodiment of the outer side of valve plate 230. As shown in FIG. 11, valve plate 230 includes various holes (e.g., represented at 1028) through which screws can be inserted to attached valve plate 230 to dispense block 205. Additionally, shown in FIG. 11 are the valve control inlets for each valve to apply pressure or vacuum to the corresponding diaphragm. For example, inlet 235 corresponds to barrier valve 135, inlet 240 to purge valve 140, inlet 245 to isolation valve 130, inlet 250 to vent valve 145, and inlet 255 to inlet valve 125. By the selective application of pressure or vacuum to the inlets, the corresponding valves are opened and closed.

Figure 12:
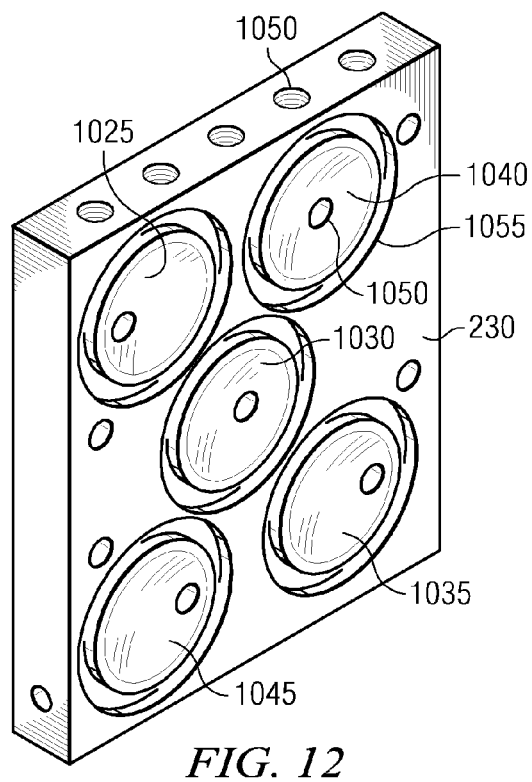
FIG. 12 is a diagrammatic representation of another view of an embodiment of a valve plate.

FIG. 12 is a diagrammatic representation of valve plate 230 showing the inner surface of valve plate 230 (i.e., the surface that faces dispense block 205). For each of inlet valve 125, isolation valve 130, barrier valve 135, purge valve 140 and vent valve 145, valve plate 230 at least partially defines a valve chamber into which a diaphragm (e.g., diaphragm 1002) is displaced when the valve opens. In the example of FIG. 12, chamber 1025 corresponds to inlet valve 125, chamber 1030 to isolation valve 130, chamber 1035 to barrier valve 135, chamber 1040 to purge valve 140 and chamber 1045 to vent valve 140. Each valve chamber preferably has an arced valve seat from the edge of the valve chamber to the center of the valve chamber towards which the diaphragm displaces. For example, if the edge of the valve chamber is circular (as shown in FIG. 12) and radius of the arced surface is constant, the valve chamber will have a semi-hemispherical shape.

Figure 13:
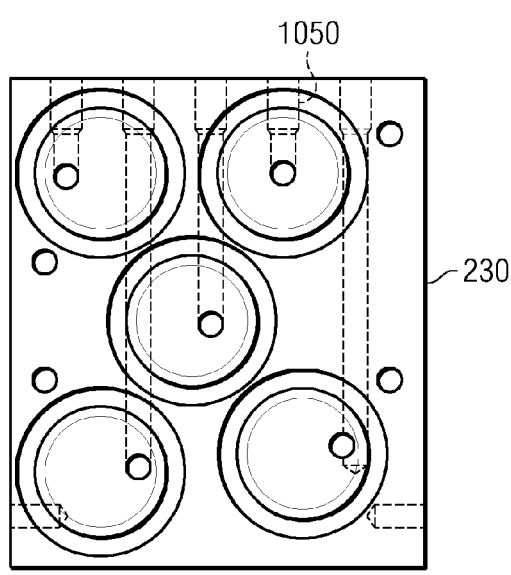
FIG. 13 is a diagrammatic representation of a view of an embodiment of a valve plate showing passages defined in the valve plate.

A flow passage is defined for each valve for the application of a valve control gas/vacuum or other pressure to cause the diaphragm to be displaced between an open position and closed position for a valve. As an example, flow passage 1050 runs from an input on valve control plate 230 to the corresponding opening in the arced surface of purge valve chamber 1040. By selective application of vacuum or low pressure through flow passage 1050, diaphragm 1002 can be displaced into chamber 1040, thereby causing purge valve 140 to open. An annular ring around each valve chamber provides for sealing with O-rings 1004. For example, annular ring 1055 is used to partially contain an o-ring to seal purge valve 140. FIG. 13 is a diagrammatic representation of valve plate 230 made transparent to show the flow passages, including flow passage 1050, for the application of pressure or vacuum to each valve.

Figure 14A:
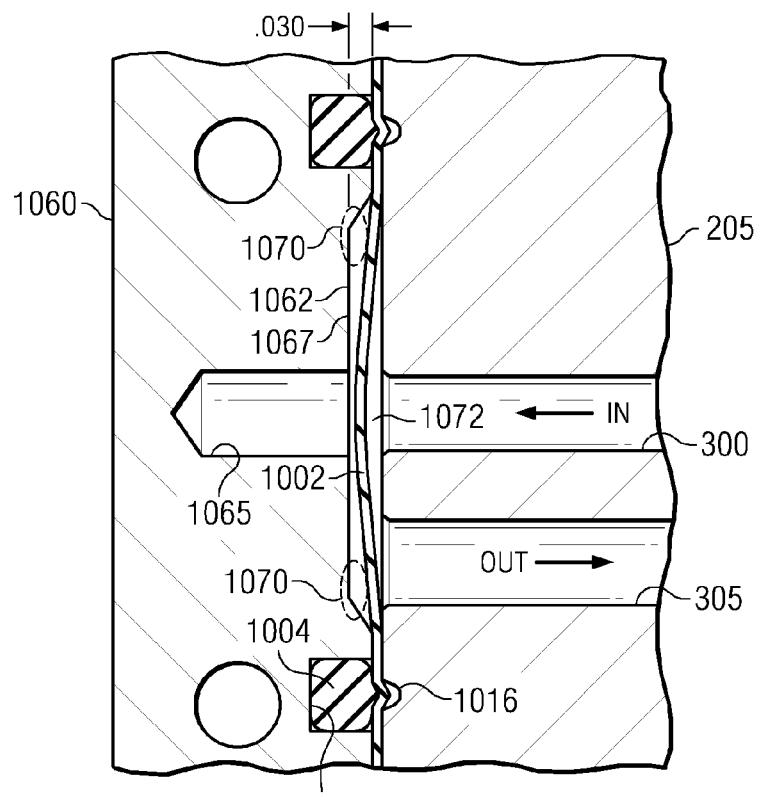
FIG. 14A is a diagrammatic representation of a valve plate having a flat valve chamber.

FIG. 14A is a diagrammatic representation of a valve plate design in which the displacement volume of the valve varies with the amount of pressure applied to diaphragm 1002. Shown in FIG. 14A is an embodiment of a purge valve. In the example of FIG. 14A, a valve plate 1060 is connected to dispense block 205. Diaphragm 1002 is sandwiched between valve plate 1060 and dispense block 205. Valve plate 1060 forms a valve chamber 1062 into which diaphragm 1002 is displaced when vacuum is applied through flow passage 1065. An annular ring 1070 surrounding valve chamber seats o-ring 1004. When valve plate 1060 is attached to dispense block 205, o-ring 1004 presses diaphragm 1002 into annular ring 1016, which further seals the purge valve.

In the embodiment of FIG. 14A, valve chamber 1062 has chamfered sides to a substantially flat surface (indicated at 1067) towards which diaphragm 1002 displaces. When vacuum is applied to diaphragm 1002 through flow passage 1065, diaphragm 1002 displaces towards surface 1067 in a generally semi-hemispherical shape. This means that there will be some dead space (i.e., unused space) between diaphragm 1002 and valve plate 1060. This unused space is indicated at area 1070. As the amount of pull applied through flow passage 1065 increases (i.e., by increasing the vacuum), there is less unused space, however diaphragm 1002 does not completely bottom out. Consequently, depending on the pressure used to displace diaphragm 1002, the displacement volume of diaphragm 1002 changes (e.g., the amount of volume in the bowl of the diaphragm, generally indicated at 1072, changes).

When positive pressure is applied through flow passage 1065, diaphragm 1002 moves to seal the inlet and outlet (in this case flow passage 300 from the dispense chamber and flow passage 305 to the feed chamber). The volume of fluid in area 1072 will therefore be moved out of purge valve 140. This will cause a pressure spike in the dispense chamber (or other enclosed space to which the fluid is moved). The amount of fluid displaced by the valve will depend on how much volume was held up in the valve. Because this volume varies with the amount of pressure applied, different pumps of the same design, but operating using different vacuum pressures, will show different pressure spikes in the dispense chamber or other enclosed space. Moreover, because diaphragm 1002 is plastic, the displacement of diaphragm 1002 for a given vacuum pressure will vary depending on temperature. Consequently, the volume of unused area 1070 will change depending on temperature. Because the displacement volume of the valve of FIG. 14A varies based on the vacuum applied and temperature, it is difficult to accurately compensate for the volume displaced by the pump opening and closing.

Figure 14B:
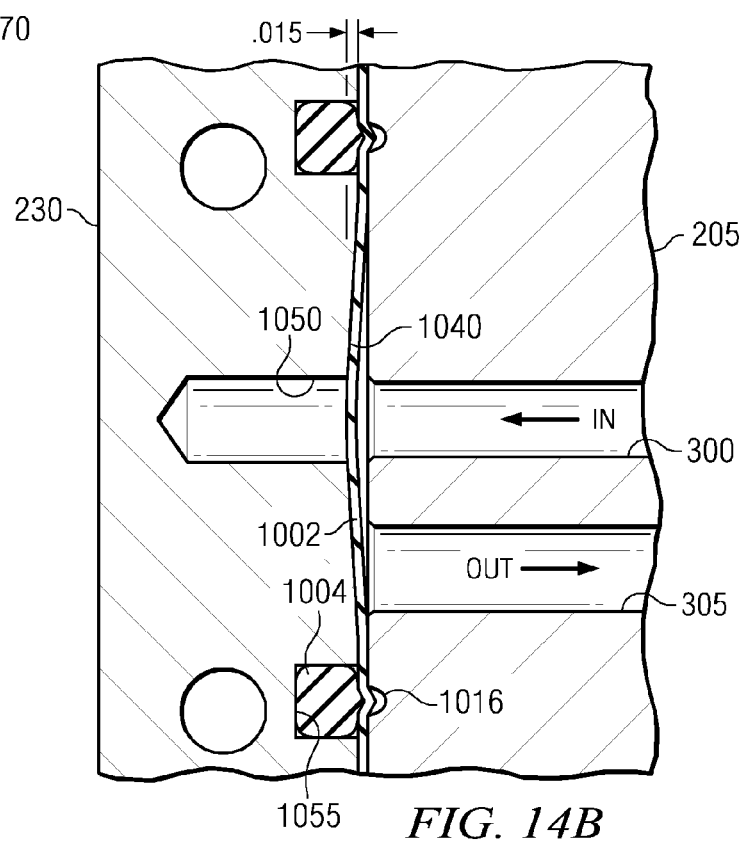
FIG. 14B is a diagrammatic representation of a valve plate having a hemispherical valve chamber.

Embodiments described herein reduce or eliminate the problems associated with a valve chamber having a flat surface. FIG. 14B is a diagrammatic representation of one embodiment of a purge valve using a valve plate design. Shown in FIG. 14B is an embodiment of purge valve 140. In the example of FIG. 14B, valve plate 230 is connected to dispense block 205. Diaphragm 1002 is sandwiched between valve plate 230 and dispense block 205. Valve plate 230 forms a valve chamber 1040 into which diaphragm 1002 can be displaced based on the application of vacuum (or low pressure) through flow passage 1050. An annular ring 1055 surrounding valve chamber 1040 seating o-ring 1004. When valve plate 230 is attached to dispense block 205, o-ring 1004 presses diaphragm 1002 into annular ring 1016, further sealing purge valve 140. This creates a seal and fixes diaphragm 1002. According to one embodiment, dispense block 205 can be PTFE or modified PTFE, diaphragm 1002 PFTE or modified PTFE and valve plate 230 machined aluminum. Other suitable materials can be used.

In the embodiment of FIG. 14B, the area of valve chamber 1040 into which diaphragm 1002 displaces is semi-hemispherical. When vacuum is applied to diaphragm 1002 through flow passage 1050, diaphragm 1002 displaces towards the hemispherical surface in a semi-hemispherical shape. By sizing the semi-hemisphere of valve chamber 1040 appropriately, the hemisphere formed by diaphragm 1002 will match the shape of valve chamber 1040. As shown in FIG. 14B, this means that the dead space between the semi-hemisphere of diaphragm 1002 and the surface of the valve chamber (e.g., area 1070 in FIG. 9A) is eliminated. Moreover, because diaphragm 1002 displaces in a semi-hemispherical shape corresponding to the semi-hemispherical shape of valve chamber 1040, diaphragm 1002 will always have the same shape, and hence displacement volume, in its displaced position (this is illustrated in FIG. 10, discussed below). Consequently, the amount of hold up volume in valve 140 will be approximately the same regardless of the amount of vacuum applied (in the operational range of the valve) or temperature. Therefore, the volume of fluid displaced when purge valve 140 closes is the same. This allows a uniform volumetric correction to be implemented to correct for pressure spikes due to the displaced volume when the valve closes. As an additional advantage, the semi-hemispherical shaped valve chamber allows the valve chamber to be shallower. Moreover, because the diaphragm conforms to the shape of the valve seat, the stress on the diaphragm is reduced.

The valve chamber can be sized to allow the diaphragm to displace sufficiently to allow fluid flow from the inlet to the outlet path (e.g., from flow path 300 to flow path 305 of FIG. 5B). Additionally, the valve chamber can be sized to minimize pressure drop while reducing displacement volume. For example, if the valve chamber is made too shallow, diaphragm 1002 may unduly constrict flow passage 305 for a particular application in the open position. However, as the depth of the valve chamber increases, it takes a stronger minimum vacuum to displace the diaphragm to its fully open position (i.e., the position in which the diaphragm is fully displaced into the valve chamber), leading to additional stress on the diaphragm. The valve chamber can be sized to balance the flow characteristics of the valve with the stress on the diaphragm.

It should also be noted that flow passage 1050 for the application of pressure/vacuum to the diaphragm does not have to be centered in the valve chamber, but may be off center (this is shown, for example, on the barrier valve chamber 1035 in FIG. 12). Additionally, the inlet and outlet flow passages to/from the valve can be positioned in any position that allows fluid to flow between them when the valve is open and to be restricted in the closed position. For example, the inlet and outlet flow passages to the valve can be positioned so that, when the valve closes, less of the fluid volume is displaced through a particular passage. In FIG. 14B, because the outlet flow passage 305 to the feed chamber is further from the center of the valve chamber (i.e., further from the center of the hemisphere) than inlet flow passage 300 from the dispense chamber, a smaller amount of fluid will be displaced through flow passage 305 than flow passage 300 when the valve is closed.

However, the positioning of these flow passages with respect to the valve can be reversed or otherwise changed in other embodiments so that less fluid is displaced back to the dispense chamber than displaced to the feed chamber when purge valve 140 closes. For inlet valve 125, on the other hand, the inlet flow passage can be closer to the center so that more fluid is displaced back to the fluid source than to the feed chamber when inlet valve 125 is closed (i.e., inlet valve 125 can have the inlet/outlet flow path arrangement shown in FIG. 14B). The inlets and outlets to various valves (e.g., barrier valve 135, outlet valve 147) can also be arranged, according to various embodiments, to reduce the amount of fluid pushed into the dispense chamber when the valves close.

Other configurations of inlet and outlet flow passages can also be utilized. For example, both the inlet and outlet flow passage to a valve can be off center. As another example, the widths of the inlet and outlet flow passages can be different so that one flow passage is more restricted, again helping to cause more fluid to be displaced through one of the flow passages (e.g., the larger flow passage) when the valve closes.

Figure 15:
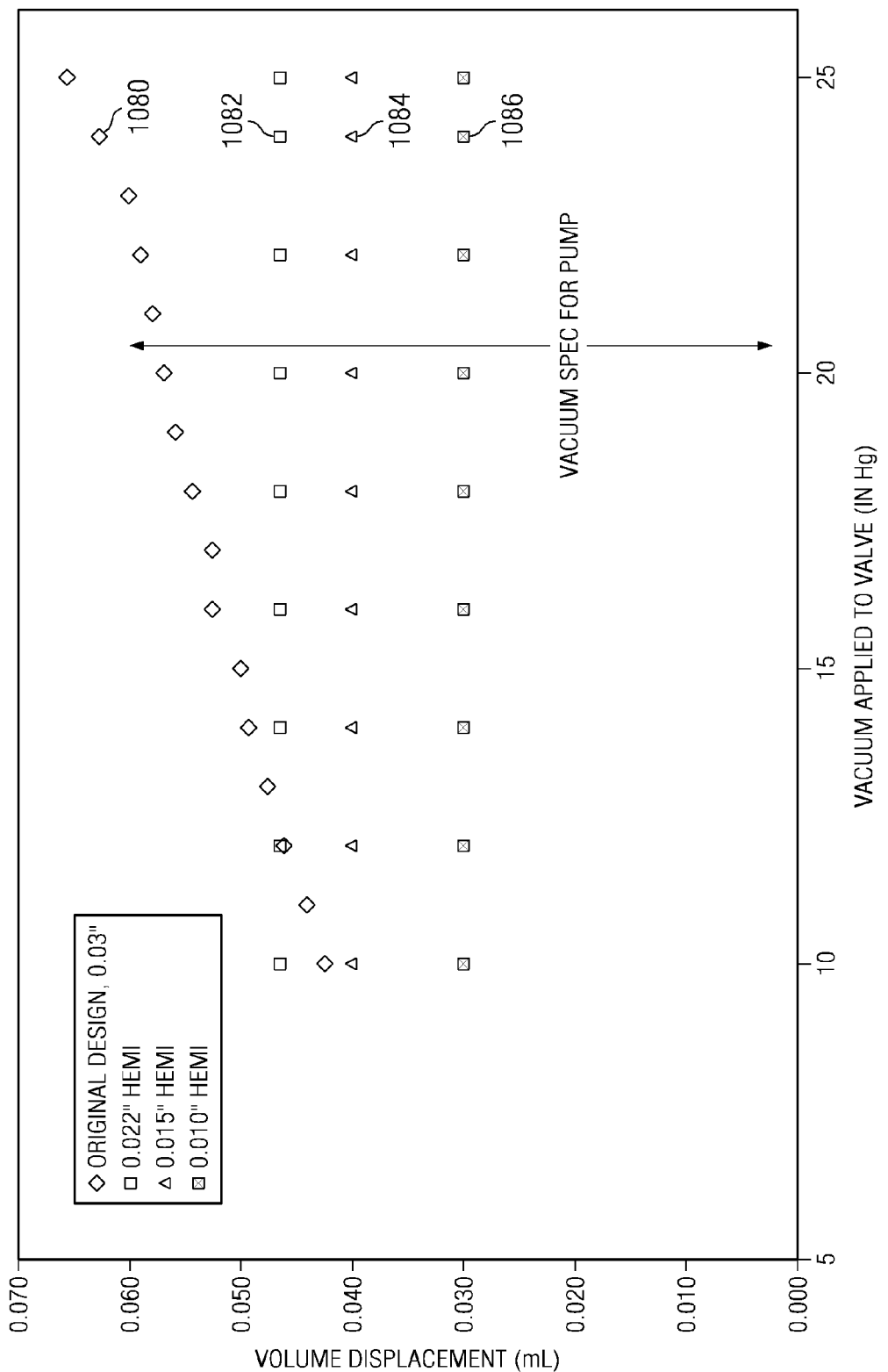
FIG. 15 is a graph illustrating how a hemispherically shaped valve chamber reduces displacement volume fluctuations due to vacuum.

FIG. 15 provides charts illustrating the displacement volume of various valve designs. Line 1080 is for valve design with a valve chamber having a flat valve chamber surface and a depth of 0.030 inches (e.g., the valve depicted in FIG. 14A), line 1082 is for a valve design having a semi-hemispherical valve chamber surface with a depth of 0.022 inches, line 1084 is for a valve design having a semi-hemispherical valve chamber surface with a depth of 0.015 inches (e.g., the valve depicted in FIG. 14B), line 1086 is for a valve having a semi-hemispherical valve chamber surface with a depth of 0.010 inches. The chart of FIG. 15 represents the amount of fluid volume displaced by the valve when the valve control pressure is switched from 35 psi pressure to vacuum. The x axis is the amount of vacuum applied in Hg (inches of mercury) and the y access is the volume displacement in mL. A minimum vacuum of 10 Hg is used to open the valves.

As can be seen from FIG. 15, the valve chamber with a flat valve chamber surface has a different displacement volume depending on the amount of vacuum applied (i.e., if 10 Hg is applied the displacement volume is approximately 0.042 mL, whereas if 20 Hg is applied the displacement volume is approximately 0.058 mL). The valves with hemispherical shaped valve chambers into which the diaphragm displaces, on the other hand, show an approximately constant displacement regardless of the vacuum applied. In this example, the 0.022 inch semi-hemisphere valve displaces 0.047 mL (represented by line 1082), the 0.015 inch semi-hemisphere valve displaces 0.40 mL (represented by line 1084) and the 0.010 inch semi-hemisphere valve displaces 0.030 mL (represented by line 1086). Thus, as can be seen in FIG. 15, a valve plate with semi-hemispherical valve chambers provides for repeatable displacement volumes as the vacuum pressure applied to the valve varies.

Figure 16A:
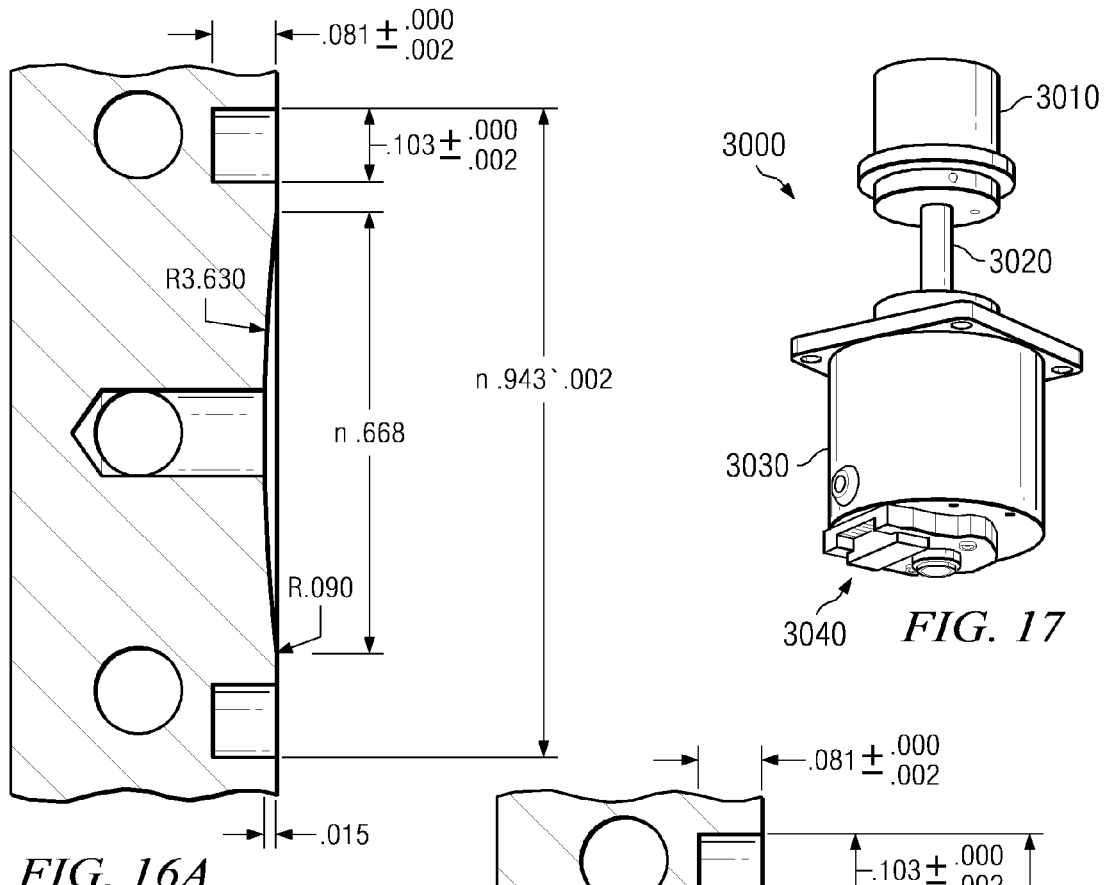
FIG. 16A is a diagrammatic representation of one embodiment of a portion of a valve plate.
Figure 16B:
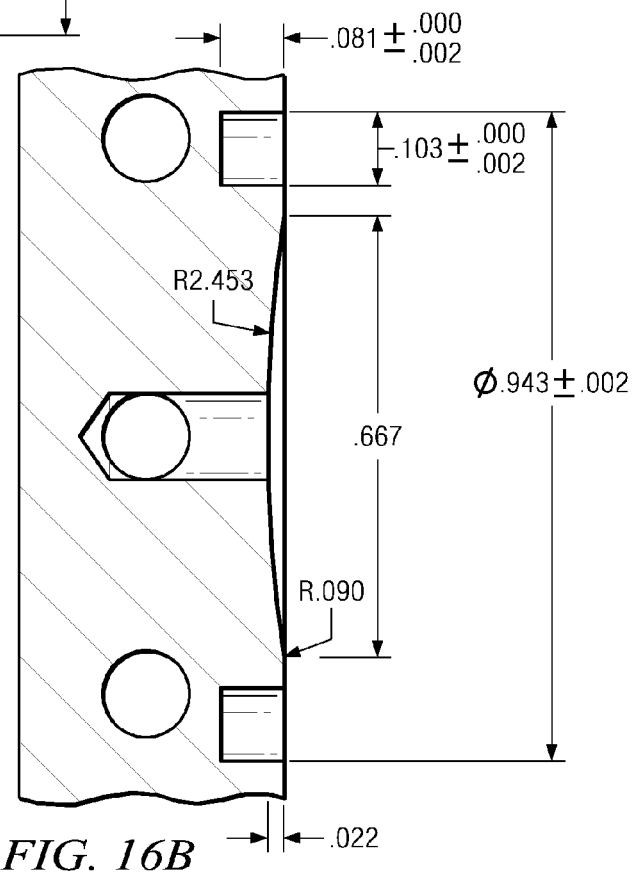
FIG. 16B is a diagrammatic representation of another embodiment of a portion of a valve plate.

The valves of valve plate 230 may have different dimensions. For example, the purge valve 140 can be smaller than the other valves or the valves can be otherwise dimensioned. FIG. 16A provides an example of dimensions for one embodiment of purge valve 140, showing a hemispherical surface 1090 towards the diaphragm displaces. As shown in FIG. 16A, the valve chamber has a hemispherical surface with a spherical depth of 0.015 inches corresponding to a sphere with a radius of 0.3.630 inches. FIG. 16B provides an example of dimensions for one embodiment of input valve 125, isolation valve 130, barrier valve 135 and vent valve 145. In this embodiment, the spherical depth of the valve chamber is 0.022 inches corresponding to a sphere with a radius of 2.453 inches.

The size of each valve can be selected to balance the desire to minimize the pressure drop across the valve (i.e., the desire to minimize the restriction caused by the valve in the open position) and the desire to minimize the amount of hold up volume of the valve. That is, the valves can be dimensioned to balance the desire for minimally restricted flow and to minimize pressure spikes when the valve opens/closes. In the examples of FIGS. 16A and 16B, purge valve 140 is the smallest valve to minimize the amount of holdup volume that returns to the dispense chamber when purge valve 140 closes. Additionally, the valves can be dimensioned to be fully opened when a threshold vacuum is applied. For example, purge valve 140 of FIG. 16A is dimensioned to be fully opened when 10 Hg of vacuum is applied. As the vacuum increases, purge valve 140 will not open any further. The dimensions provided in FIGS. 16A and 16B are provided by way of example only for a specific implementation and are not provided for limitation. Valves according various embodiments can have a wide variety of dimensions. Embodiments of valve plates are also described in U.S. Provisional Application No. 60/742,147, entitled "VALVE PLATE SYSTEM AND METHOD", by Inventors Gashgaee et al., filed Dec. 2, 2005 and U.S. patent application Ser. No. 11/602,457, entitled "FIXED VOLUME VALVE SYSTEM", by Inventors Gashgaee et al., filed Nov. 20, 2006, which are hereby fully incorporated by reference herein.

As discussed above, feed pump 150 according to one embodiment can be driven by a stepper motor while dispense pump 180 can be driven by a brushless DC motor or PSMS motor. FIGS. 17-19 below describe embodiments of motors usable according to various embodiments. Examples of control schemes for motors are described in U.S. Provisional Application No. 60/741,660, entitled "SYSTEM AND METHOD FOR POSITION CONTROL OF A MECHANICAL PISTON IN A PUMP", by Inventors Gonnella et al., filed Dec. 2, 2005, and U.S. Provisional Application No. 60/841,725, entitled "SYSTEM AND METHOD FOR POSITION CONTROL OF A MECHANICAL PISTON IN A PUMP", by Inventors Gonnella et al., filed Sep. 1, 2006, which are hereby fully incorporated by reference herein.

FIG. 17 is a schematic representation of a motor assembly 3000 with a motor 3030 and a position sensor 3040 coupled thereto, according to one embodiment. In the example shown in FIG. 17, a diaphragm assembly 3010 is connected to motor 3030 via a lead screw 3020. In one embodiment, motor 3030 is a permanent magnet synchronous motor ("PMSM"). In a brush DC motor, the current polarity is altered by the commutator and brushes. However, in a PMSM, the polarity reversal is performed by power transistors switching in synchronization with the rotor position. Hence, a PMSM can be characterized as "brushless" and is considered more reliable than brush DC motors. Additionally, a PMSM can achieve higher efficiency by generating the rotor magnetic flux with rotor magnets. Other advantages of a PMSM include reduced vibration, reduced noises (by the elimination of brushes), efficient heat dissipation, smaller foot prints and low rotor inertia. Depending upon how the stator is wounded, the back-electromagnetic force, which is induced in the stator by the motion of the rotor, can have different profiles. One profile may have a trapezoidal shape and another profile may have a sinusoidal shape. Within this disclosure, the term PMSM is intended to represent all types of brushless permanent magnet motors and is used interchangeably with the term brushless DC motors ("BLDCM").

PMSM 3030 can be utilized as feed motor 175 and/or dispense motor 200 as described above. In one embodiment, pump 100 utilizes a stepper motor as feed motor 175 and PMSM 3030 as dispense motor 200. Suitable motors and associated parts may be obtained from EAD Motors of Dover, N.H., USA or the like. In operation, the stator of BLDCM 3030 generates a stator flux and the rotor generates a rotor flux.

The interaction between the stator flux and the rotor flux defines the torque and hence the speed of BLDCM 3030. In one embodiment, a digital signal processor (DSP) is used to implement all of the field-oriented control (FOC). The FOC algorithms are realized in computer-executable software instructions embodied in a computer-readable medium. Digital signal processors, alone with on-chip hardware peripherals, are now available with the computational power, speed, and programmability to control the BLDCM 3030 and completely execute the FOC algorithms in microseconds with relatively insignificant add-on costs. One example of a DSP that can be utilized to implement a controller is a 16-bit DSP available from Texas Instruments, Inc. based in Dallas, Tex., USA (part number TMS320F2812PGFA).

BLDCM 3030 can incorporate at least one position sensor to sense the actual rotor position. In one embodiment, the position sensor may be external to BLDCM 3030. In one embodiment, the position sensor may be internal to BLDCM 3030. In one embodiment, BLDCM 3030 may be sensorless.

In the example shown in FIG. 17, position sensor 3040 is coupled to BLDCM 3030 for real time feedback of BLDCM 3030's actual rotor position, which is used by the DSP to control BLDCM 3030. An added benefit of having position sensor 3040 is that it proves extremely accurate and repeatable control of the position of a mechanical piston (e.g., piston 192 of FIG. 2), which means extremely accurately and repeatable control over fluid movements and dispense amounts in a piston displacement dispense pump (e.g., dispense pump 180 of FIG. 2). In one embodiment, position sensor 3040 is a fine line rotary position encoder. In one embodiment, position sensor 3040 is a 2000 line encoder. Using a 2000 line encoder giving 8000 pulses to the DSP, it is possible to accurately measure to and control at 0.045 degrees of rotation.

BLDCM 3030 can be run at very low speeds and still maintain a constant velocity, which means little or no vibration. In other technologies such as stepper motors it has been impossible to run at lower speeds without introducing vibration into the pumping system, which was caused by poor constant velocity control. This variation would cause poor dispense performance and results in a very narrow window range of operation. Additionally, the vibration can have a deleterious effect on the process fluid. Table 1 below and FIGS. 18-19 compare a stepper motor and a BLDCM and demonstrate the numerous advantages of utilizing BLDCM 3030 as dispense motor 200 in multi-stage pump 100.

TABLE 1

| Item | Stepper Motor | BLDCM |
| --- | --- | --- |
| Volume resolution ($\mu$l/step) | 1 | 0.1 10x improvement |
| Basic motion | Move, stop, wait, move, stop wait; Causes motor vibration and "dispense flicker" at low rates | Continuous motion, never stops |
| Motor current, Power | Current is set and power consumed for maximum conditions, whether required or not | Adaptable to load |
| Torque delivery | Low | High |
| Speed capability | 10-30x | 30,000x |

As can be seen from TABLE 1, compared to a stepper motor, a BLDCM can provide substantially increased resolution with continuous rotary motion, lower power consumption, higher torque delivery, and wider speed range. Note that, BLDCM resolution can be about 10 times more or better than what is provided by the stepper motor. For this reason, the smallest unit of advancement that can be provided by BLDCM is referred to as a "motor increment," distinguishable from the term "step", which is generally used in conjunction with a stepper motor. The motor increment is smallest measurable unit of movement as a BLDCM, according to one embodiment, can provide continuous motion, whereas a stepper motor moves in discrete steps.

FIG. 18 is a plot diagram comparing average torque output and speed range of a stepper motor and a BLDCM, according to one embodiment. As illustrated in FIG. 18, the BLDCM can maintain a nearly constant high torque output at any speed. In addition, the usable speed range of the BLDCM is wider (e.g., about 1000 times or more) than that of the stepper motor. In contrast, the stepper motor tends to have lower torque output which tends to undesirably fall off with increased speed (i.e., torque output is reduced at higher speed).

FIG. 19 is a plot diagram comparing average motor current and load between a stepper motor and a BLDCM, according to one embodiment. As illustrated in FIG. 6, the BLDCM can adapt and adjust to load on system and only uses power required to carry the load. In contrast, whether it is required or not, the stepper motor uses current that is set for maximum conditions. For example, the peak current of a stepper motor is 150 milliamps (mA). The same 150 mA is used to move a 1-lb. load as well as a 10-lb. load, even though moving a 1-lb. load does not need as much current as a 10-lb. load. Consequently, in operation, the stepper motor consumes power for maximum conditions regardless of load, causing inefficient and wasteful use of energy.

With the BLDCM, current is adjusted with an increase or decrease in load. At any particular point in time, the BLDCM will self-compensate and supply itself with the amount of current necessary to turn itself at the speed requested and produce the force to move the load as required. The current can be very low (under mA) when the motor is not moving. Because a BLDCM is self-compensating (i.e., it can adaptively adjust current according to load on system), it is always on, even when the motor is not moving. In comparison, the stepper motor could be turned off when the stepper motor is not moving, depending upon applications.

To maintain position control, the control scheme for the BLDCM needs to be run very often. In one embodiment, the control loop is run at 30 kHz. So, every 33 μs, the control loop checks to see if the BLDCM is at the right position. If so, try not to do anything. If not, it adjusts the current and tries to force the BLDCM to the position where it should be. This rapid self-compensating action enables a very precise position control, which is highly desirable in some applications. Running the control loop at a speed higher (e.g., 30 kHz) than normal (e.g., 10 kHz) could mean extra heat generation in the system. This is because the more often the BLDCM switches current, the more opportunity to generate heat.

According to one aspect, in some embodiments the BLDCM is configured to take heat generation into consideration. Specifically, the control loop is configured to run at two different speeds during a single cycle. During the dispense portion of the cycle, the control loop is run at a higher speed (e.g., 30 kHz). During the rest of the non-dispense portion of the cycle, the control loop is run at a lower speed (e.g., 10 kHz). This configuration can be particularly useful in applications where super accurate position control during dispense is critical. As an example, during the dispense time, the control loop runs at 30 kHz. It might cause a bit of extra heat, but it provides an excellent position control. The rest of the time the speed is cut back to 10 kHz. By doing so, the temperature can be significantly dropped.

The dispense portion of the cycle could be customized depending upon applications. As another example, a dispense system may implement 20-second cycles. On one 20-second cycle, 5 seconds may be for dispensing, while the rest 15 seconds may be for logging or recharging, etc. In between cycles, there could be a 15-20 seconds ready period. Thus, the control loop of the BLDCM would run a small percentage of a cycle (e.g., 5 seconds) at a higher frequency (e.g., 30 kHz) and a larger percentage (e.g., 15 seconds) at a lower frequency (e.g., 10 kHz).

As one skilled in the art can appreciate, these parameters (e.g., 5 seconds, 15 seconds, 30 kHz, 10 kHz. etc.) are meant to be exemplary and non-limiting. Operating speed and time can be adjusted or otherwise configured to suit. Empirical methodologies may be utilized in determining these programmable parameters. For example, 10 kHz is a fairly typical frequency to drive the BLDCM. Although a different speed could be used, running the control loop of the BLDCM slower than 10 kHz could run the risk of losing position control.

Since it is generally difficult to regain the position control, it is desirable for the BLDCM to hold the position.

Reducing speed as much as possible during the non-dispense phase of the cycle without undesirably compromising the position control is achievable in embodiments disclosed herein via a control scheme for the BLDCM. The control scheme is configured to increase the frequency (e.g., 30 kHz) in order to gain some extra/increased position control for critical functions such as dispensing. The control scheme is also configured to reduce heat generation by allowing non-critical functions to be run at a lower frequency (e.g., 10 kHz). Additionally, the custom control scheme is configured to minimize any position control losses caused by running at the lower frequency during the non-dispense cycle.

The control scheme is configured to provide a desirable dispense profile, which can be characterized by pressure. The characterization can be based on deviation of the pressure signal. For example, a flat pressure profile would suggest smooth motion, less vibration, and therefore better position control. Contrastingly, deviating pressure signals would suggest poor position control. As far as position control is concerned, the difference between running the BLDCM at 10 kHz and at 15 kHz can be insignificant. However, if the speed drops below 10 kHz (e.g., 5 kHz), it may not be fast enough to retain position control. For example, one embodiment of the BLDCM is configured for dispensing fluids. When the position loop runs under 1 ms (i.e., at about 10 kHz or more), no effects are visible to the human eye. However, when it gets up to the 1, 2, or 3 ms range, effects in the fluid become visible. As another example, if the timing of the valve varies under 1 ms, any variation in the results of the fluid may not be visible to the human eye or by other process monitors. In the 1, 2, or 3 ms range, however, the variations can be visible. Thus, the control scheme preferably runs time critical functions (e.g., timing the motor, valves, etc.) at about 10 kHz or more.

Another consideration concerns internal calculations in the dispense system. If the dispense system is set to run as slow as 1 kHz, then there is not any finer resolution than 1 ms and no calculations that need to be finer than 1 ms can be performed. In this case, 10 kHz would be a practical frequency for the dispense system. As described above, these numbers are meant to be exemplary. It is possible to set the speed lower than 10 kHz (e.g., 5 or even 2 kHz).

Similarly, it is possible to set the speed higher than 30 kHz, so long as it satisfies the performance requirement. The exemplary dispense system disclosed herein uses an encoder which has a number of lines (e.g., 2000 lines to give 8000 pulses to the DSP). The time between each line is the speed. Even if the BLDCM is running fairly slowly, these are very fine lines so they can come very fast, basically pulsing to the encoder. If the BLDCM runs one revolution per a second, that means 2000 lines and hence 8000 pulses in that second. If the widths of the pulses do not vary (i.e., they are right at the target width and remain the same over and over), it is an indication of a very good speed control. If they oscillate, it is an indication of a poorer speed control, not necessarily bad, depending on the system design (e.g., tolerance) and application.

Another consideration concerns the practical limit on the processing power of a digital signal processor (DSP). As an example, to dispense in one cycle, it may take almost or just about 20 ms to perform all the necessary calculations for the position controller, the current controllers, and the like. Running at 30 kHz gives about 30 ms, which is sufficient to do those calculations with time left to run all other processes in the controllers. It is possible to use a more powerful processor that can run faster than 30 kHz. However, operating at a rate faster than 30 ms results a diminishing return. For example, 50 kHz only gives about 20 ms (1/50000 Hz=0.00002 s=20 µs). In this case, a better speed performance can be obtained at 50 kHz, but the system has insufficient time to conduct all the processes necessary to run the controllers, thus causing a processing problem. What is more, running 50 kHz means that the current will switch that much more often, which contributes to the aforementioned heat generation problem.

In summary, to reduce the heat output, one solution is to configure the BLDCM to run at a higher frequency (e.g., 30 kHz) during dispensing and drop down or cut back to a lower frequency (e.g., 10 kHz) during non-dispensing operations (e.g., recharge). Factors to consider in configuring the custom control scheme and associated parameters include position control performance and speed of calculation, which relates to the processing power of a processor, and heat generation, which relates to the number of times the current is switched after calculation. In the above example, the loss of position performance at 10 kHz is insignificant for non-dispense operations, the position control at 30 kHz is excellent for dispensing, and the heat generation is significantly reduced. By reducing the heat generation, embodiments can provide a technical advantage in preventing temperature changes from affecting the fluid being dispensed. This can be particularly useful in applications involving dispensing sensitive and/or expensive fluids, in which case, it would be highly desirable to avoid any possibility that heat or temperature change may affect the fluid. Heating a fluid can also affect the dispense operation. One such effect is called the natural suck-back effect. The suck-back effect explains that when the dispense operation warms and expands the fluid out of the nozzle, it starts to cool and as it starts to cool, it can lose a little bit. When the dispense operation retracts, the fluid in the nozzle starts to increase the volume. Therefore, with the suck-back effect the volume may not be precise and may be inconsistent.

Figures 20B, 20C:
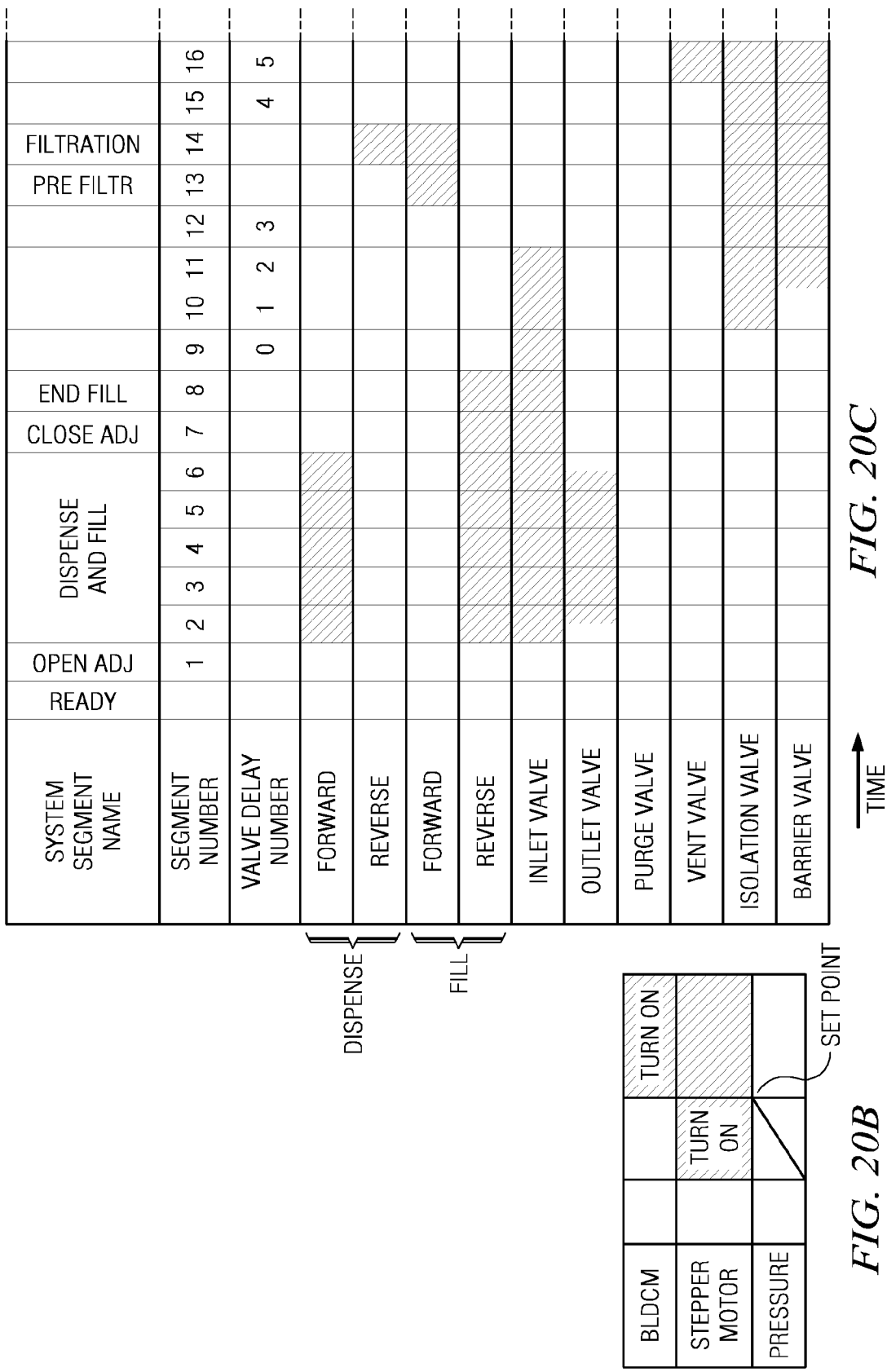
Figure 20E:
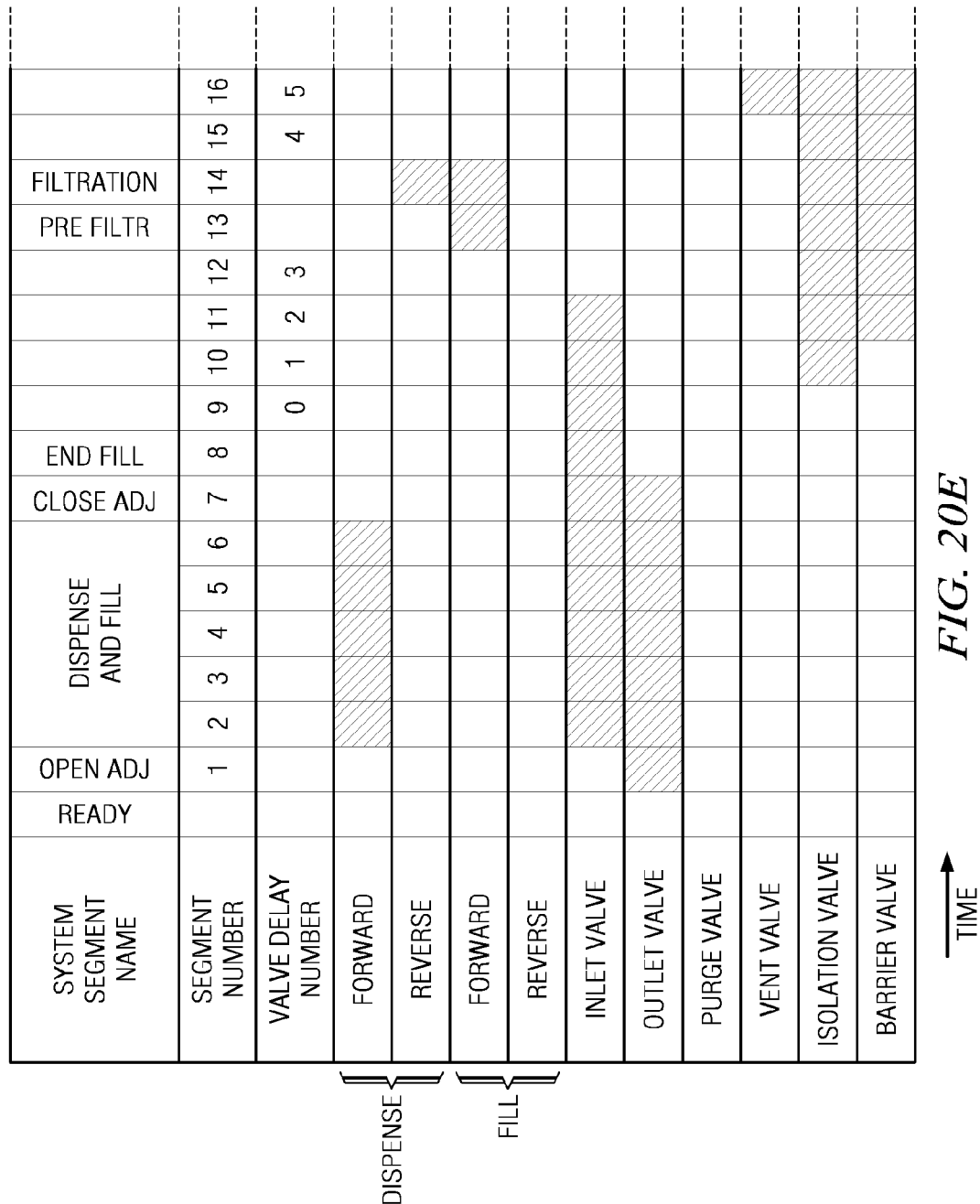
Figure 20F:
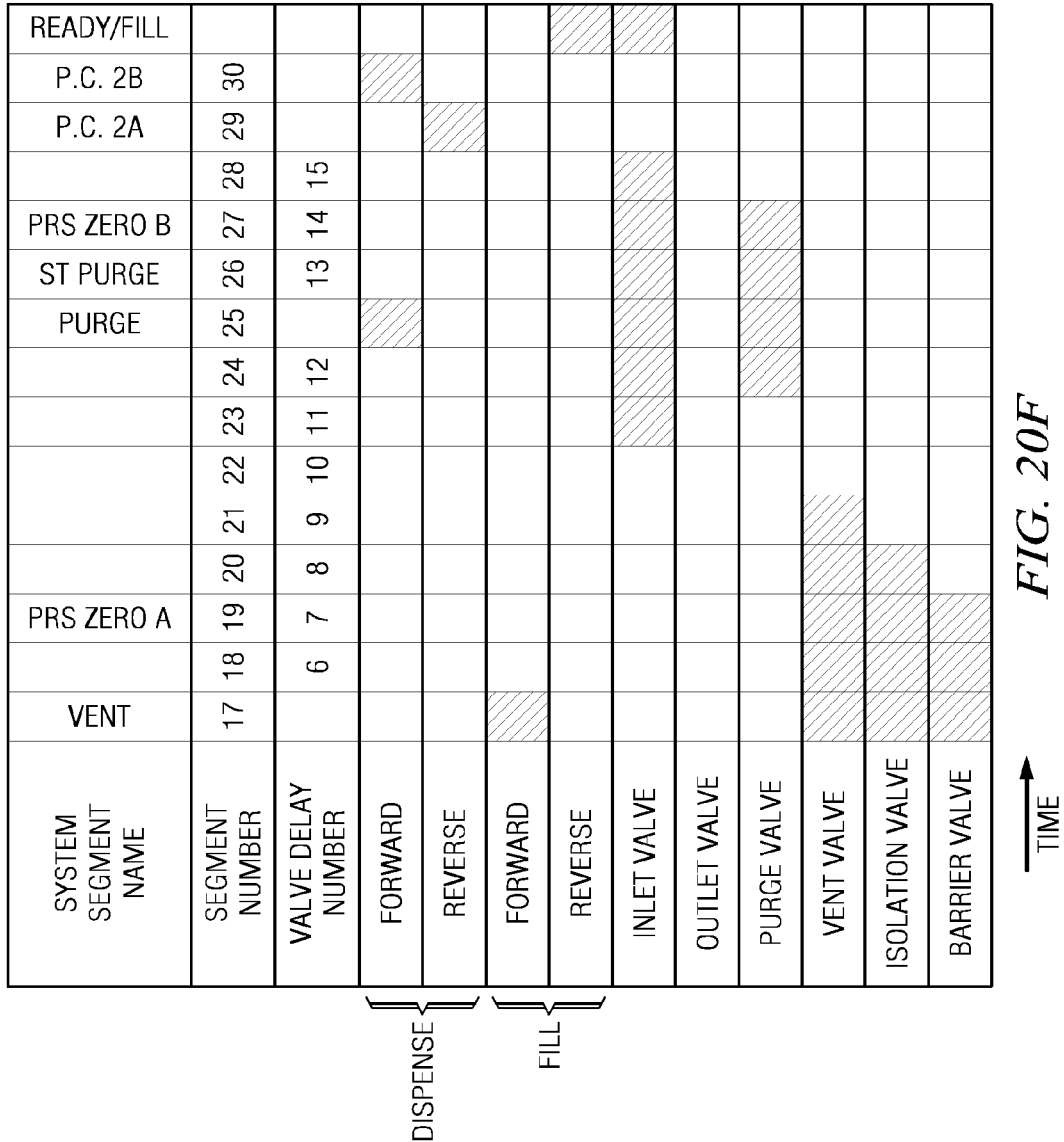
Figures 1, 21A:
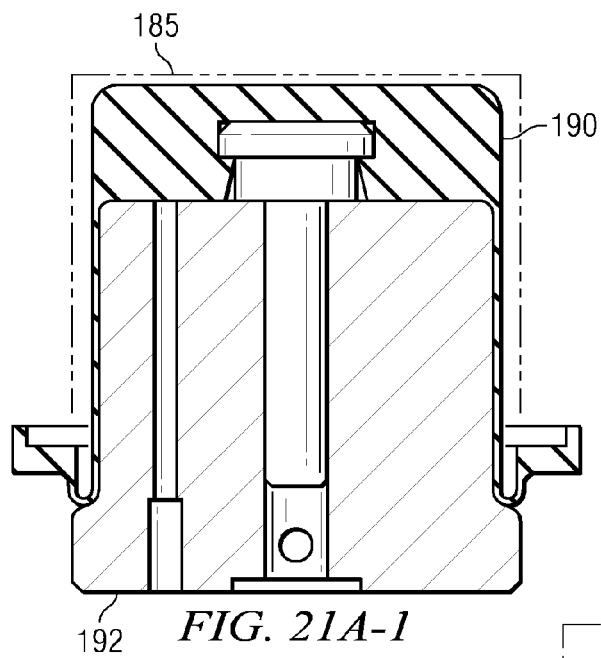
FIGS. 21A-21C are diagrammatic representations of a rolling diaphragm and a dispense chamber.
Figures 2, 21A:
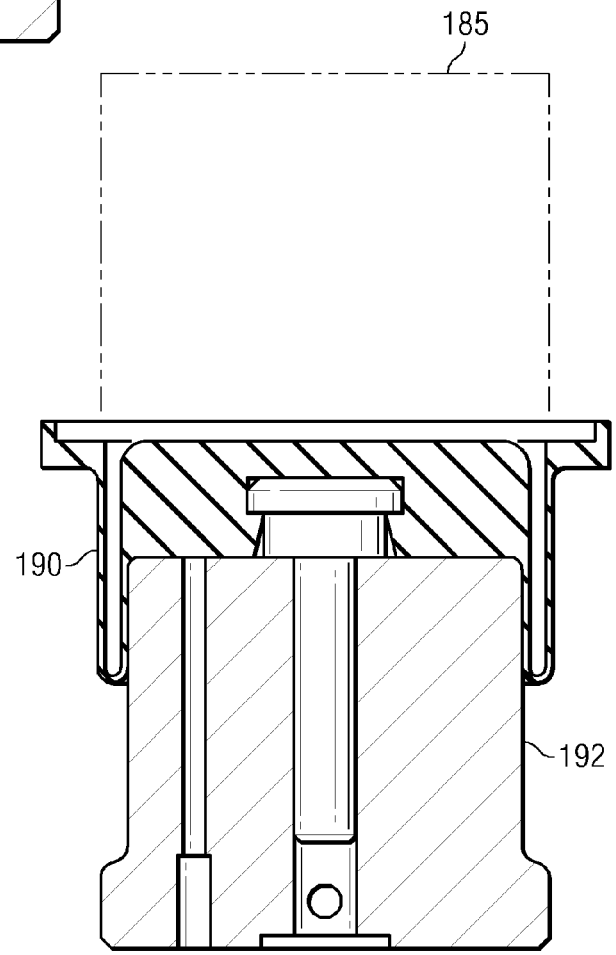

FIG. 20A is a chart diagram illustrating cycle timing of a stepper motor and a BLDCM in various stages, according to one embodiment. Following the above example, the stepper motor implements feed motor 175 and the BLDCM implements dispense motor 200. The shaded area in FIG. 21A indicates that the motor is in operation. According to one embodiment, the stepper motor and the BLDCM can be configured in a manner that facilitates pressure control during the filtration cycle. One example of the pressure control timing of the stepper motor and the BLDCM is provided in FIG. 20B where the shaded area indicates that the motor is in operation.

FIG. 20B illustrates an exemplary configuration of feed motor 175 and dispense motor 200. More specifically, once the set point is reached, the BLDCM (i.e., dispense motor 200) can start reversing at the programmed filtration rate. In the meantime, the stepper motor (i.e., feed motor 175) rate varies to maintain the set point of pressure signal. This configuration provides several advantages. For instance, there are no pressure spikes on the fluid, the pressure on the fluid is constant, no adjustment is required for viscosity changes, no variation from system to system, and vacuum will not occur on the fluid.

FIGS. 20C-20F provide other example valve and motor timing diagrams. For the valves, the black sections indicate that the valve is open in various segments of the dispense cycle. For the dispense and feed motors, the black sections indicated when the motor is an forward or reverse state. Using the example of 30 segment dispense cycle, FIGS. 20C and 20E indicate example motor and valve timings during segments 1-16 and FIGS. 20C and 20F indicate example motor and valve timings during segments 1-17 of the dispense cycle. It should be noted that the multi-stage pump can utilize other valve and motor timings, more or less segments and other control schemes. It should also be noted that the segments can have varying amounts of time. U.S. Provisional Patent Application No. 60/742,168 entitled "SYSTEM AND METHOD FOR VALVE SEQUENCING IN A PUMP" by Inventors Gonnella et al., filed Dec. 2, 2005 and U.S. patent application Ser. No. 11/602,465, entitled "SYSTEM AND METHOD FOR VALVE SEQUENCING IN A PUMP" by Inventors Gonnella et al., filed Nov. 20, 2006 which are hereby fully incorporated by reference herein, describe various embodiments of valve and motor timings.

Multi-stage pumps, according to various embodiments, can be significantly smaller than previous multi-stage pumps, while providing gentler fluid handling characteristics and a wider range of operation. Various features of the multi-stage pump contribute to the smaller size.

Some previous pump designs relied on flat diaphragms in the feed and dispense chambers to move exert pressure on the process fluid. Hydraulic fluid was typically used to assert pressure on one side of the diaphragm to cause the diaphragm to move, thereby displacing the process fluid. The hydraulic fluid could either be put under pressure by a pneumatic piston or a stepper motor driven piston. In order to get the displacement volume required by dispense pumps, the diaphragm had to have a relatively large surface area, and therefore diameter.

Figure 21B:
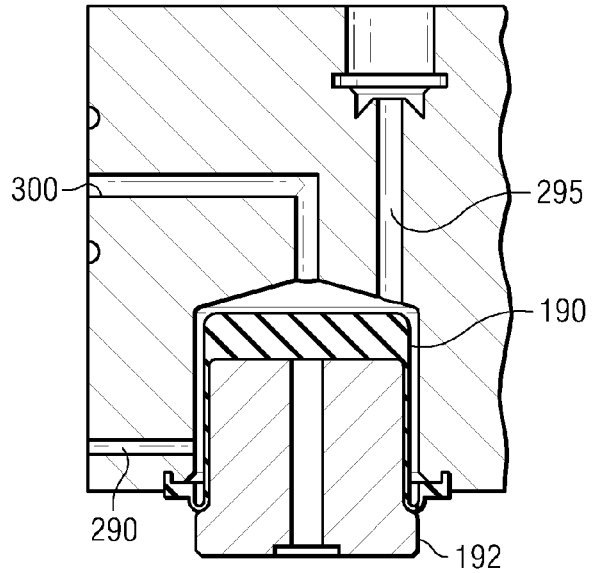
Figure 21C:
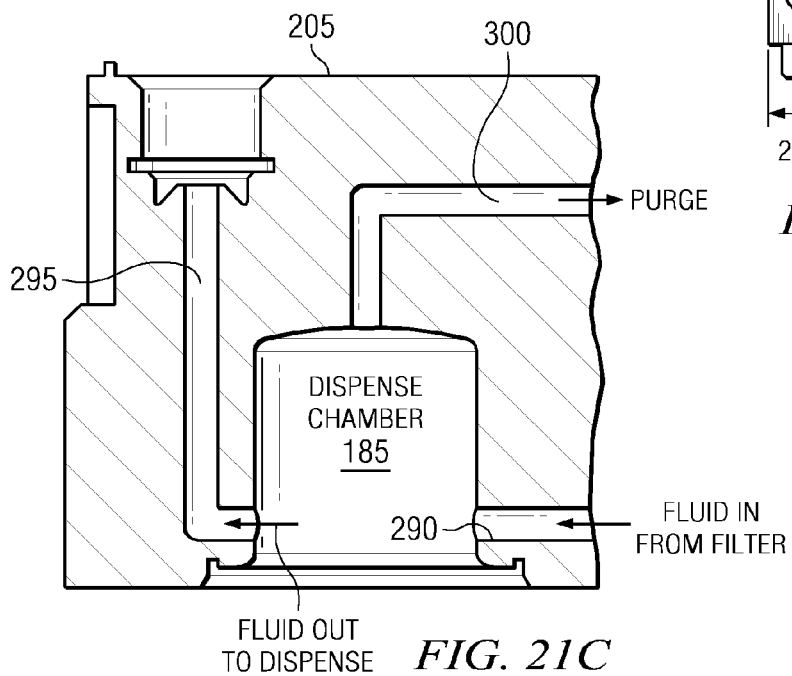

As discussed above in conjunction with FIGS. 21a-21c, diaphragm 190 of dispense pump 180 and diaphragm 160 of feed pump 150, on the other hand, can be rolling diaphragms. The use of rolling diaphragms significantly reduces the required diameters of feed chamber 155 and dispense chamber 185 compared to the use of a flat diaphragm. Moreover, rolling diaphragms can be directly moved by a motor driven piston rather than hydraulic fluid. This eliminates the need for a hydraulic chamber on the obverse side of the diaphragm from the feed/dispense chamber and the need for associated hydraulic lines. Thus, the use of rolling diaphragms allows the dispense and feed chambers to be much narrower and shallower and does away with the need for hydraulics.

For example, previous pumps that used flat diaphragms to achieve a 10 ml displacement, required a pump chamber with a 4.24 square inch (27.4193 square centimeter) cross section. A pump chamber using a rolling diaphragm can achieve a similar displacement with a 1.00 square inch (6.4516 square centimeter) diaphragm. Even taking into account the space between the piston and chamber wall for the diaphragm to roll and the sealing flange, the rolling diaphragm pump only requires a footprint of 1.25 square inches (8.064 square centimeters). Additionally, the rolling diaphragm is able handle much higher pressures than the flat diaphragm due to the reduced wetted surface area. Consequently, the rolling diaphragm pump does not require reinforcement, such as metal encasement, to handle pressures for which the flat diaphragm requires reinforcement.

Additionally, the use of a rolling diaphragm allows the flow passages into and out of feed chamber 155 and dispense chamber 185 to be advantageously placed to reduce size. As discussed in conjunction with FIG. 21c, for example, the openings to the inlet, outlet and purge flow passages from dispense chamber 185 can be positioned anywhere in the chambers. It should also be noted that the use of rolling diaphragms also reduces the cost of the pump by eliminating hydraulics.

Another feature that reduces size is the use of a single piece dispense block that defines the various flow passages from inlet to outlet, including the pump chambers. Previously, there were multiple (e.g., five or more) blocks that defined the flow passages and chambers. Because dispense block 205 is a single block, seals are reduced and the complexity of the assembly is reduced.

Yet another feature that helps reduce the size is that all the pump valves (e.g., input, isolation, barrier, vent and purge) are in a single valve plate. Previously, valves were split between valve plates and the various dispense blocks. This provided for more interfaces that could cause fluid leaks.

Figure 22A:
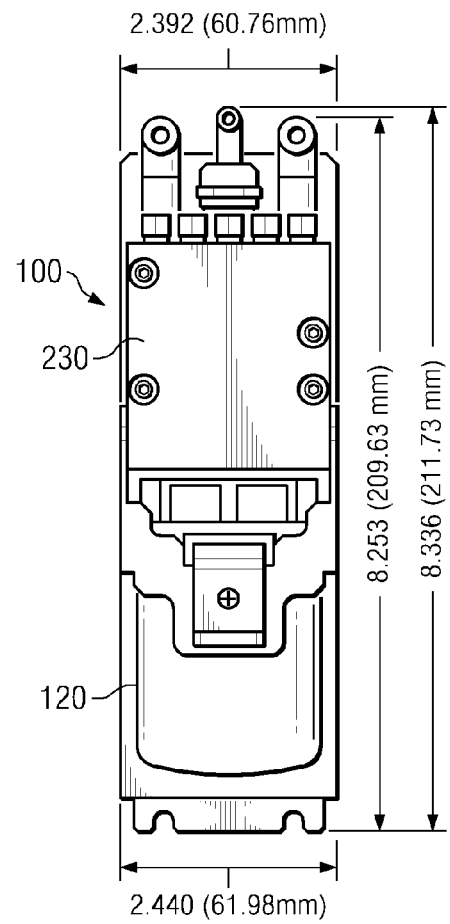
FIG. 22 provides dimensions for an example embodiment of a multi-stage pump.
Figure 22C:
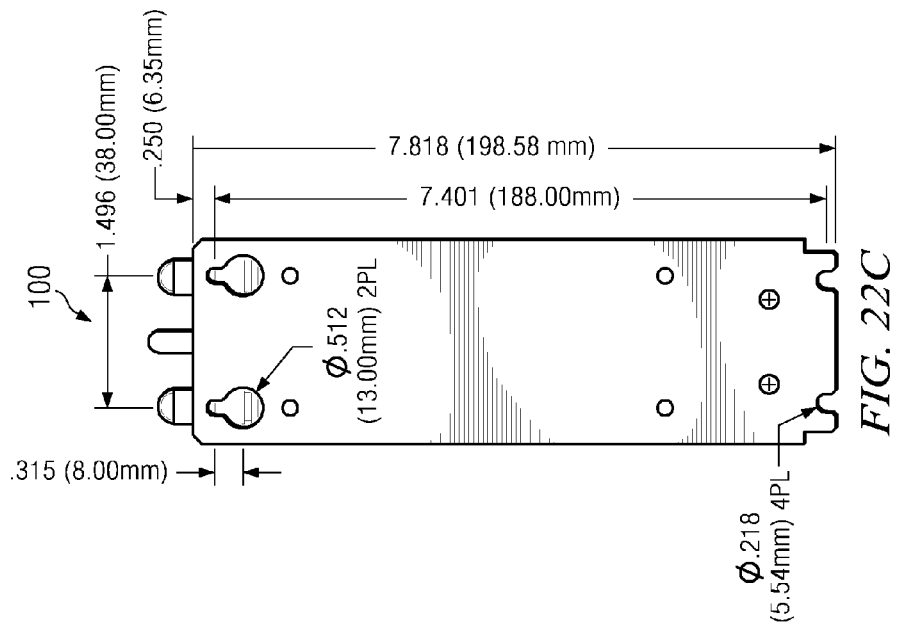
Figure 22B:
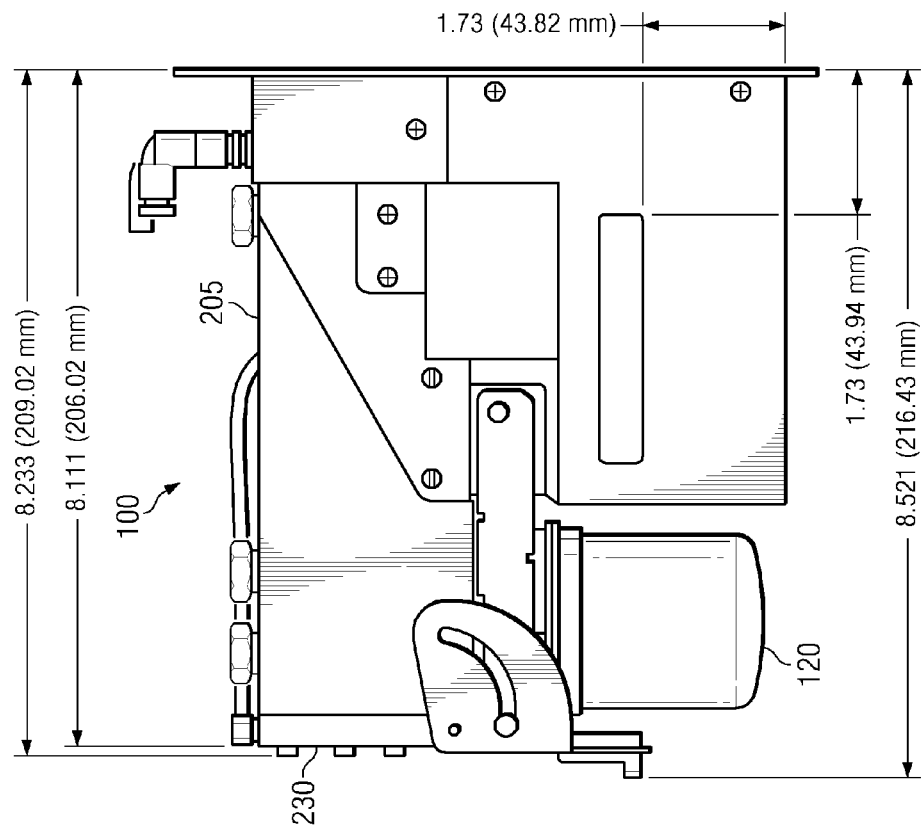

FIG. 22 provides example dimensions of an embodiment of a multi-stage pump that can produce up to a 10 mL dispense.

Moreover, in previous pumps the various PTFE plates were held together by external metal plates that were clamped or screwed together. Screwing or otherwise attaching component to PTFE is difficult because PTFE is a relatively weak material. Embodiments described herein can solve this problem by the use of bars (e.g., inserts) with perpendicular female threaded holes as described in conjunction with FIGS. 5 and 6. The bars provide a mechanism for screwing in other components with the strength of metal.

Figure 23:
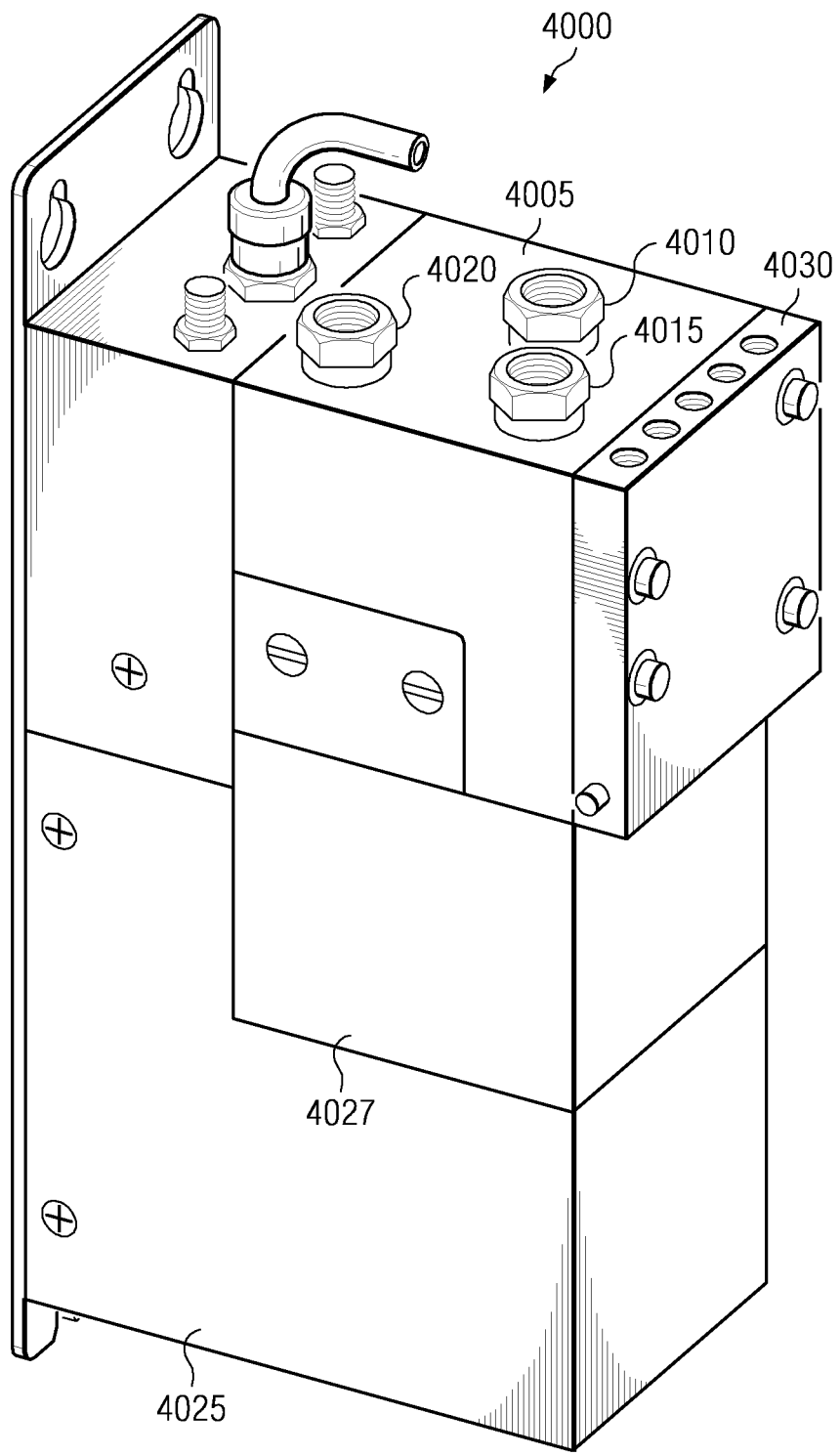
FIG. 23 is a diagrammatic representation of a single stage pump.

Although described in terms of a multi-stage pump, various embodiments described herein can also be utilized in a single stage pump. FIG. 23 is a diagrammatic representation of one embodiment of a pump assembly for a pump 4000. Pump 4000 can be similar to one stage, say the dispense stage, of multi-stage pump 100 described above and can include a rolling diaphragm pump driven by a stepper, brushless DC or other motor. Pump 4000 can include a dispense block 4005 that defines various fluid flow paths through pump 4000 and at least partially defines a pump chamber. Dispense pump block 4005, according to one embodiment, can be a unitary block of PTFE, modified PTFE or other material. Because these materials do not react with or are minimally reactive with many process fluids, the use of these materials allows flow passages and the pump chamber to be machined directly into dispense block 4005 with a minimum of additional hardware. Dispense block 4005 consequently reduces the need for piping by providing an integrated fluid manifold.

Dispense block 4005 can include various external inlets and outlets including, for example, inlet 4010 through which the fluid is received, purge/vent outlet 4015 for purging/venting fluid, and dispense outlet 4020 through which fluid is dispensed during the dispense segment. Dispense block 4005, in the example of FIG. 23, includes the external purge outlet 4010 as the pump only has one chamber. U.S. Patent Application No. 60/741,667, entitled "O-RING-LESS LOW PROFILE FITTING AND ASSEMBLY THEREOF" by Iraj Gashgaee, filed Dec. 2, 2005, and U.S. patent application Ser. No. 11/602,513, entitled "O-RING-LESS LOW PROFILE FITTINGS AND FITTING ASSEMBLIES", by Inventor Iraj Gashgaee, filed Nov. 20, 2006, which are hereby fully incorporated by reference herein, describes an embodiment of fittings that can be utilized to connect the external inlets and outlets of dispense block 4005 to fluid lines.

Dispense block 4005 routes fluid from the inlet to an inlet valve (e.g., at least partially defined by valve plate 4030), from the inlet valve to the pump chamber, from the pump chamber to a vent/purge valve and from the pump chamber to outlet 4020. A pump cover 4225 can protect a pump motor from damage, while piston housing 4027 can provide protection for a piston and, according to one embodiment, be formed of polyethylene or other polymer. Valve plate 4030 provides a valve housing for a system of valves (e.g., an inlet valve, and a purge/vent valve) that can be configured to direct fluid flow to various components of pump 4000. Valve plate 4030 and the corresponding valves can be formed similarly to the manner described in conjunction with valve plate 230, discussed above. According to one embodiment, each of the inlet valve and the purge/vent valve is at least partially integrated into valve plate 4030 and is a diaphragm valve that is either opened or closed depending on whether pressure or vacuum is applied to the corresponding diaphragm. In other embodiments, some of the valves may be external to dispense block 4005 or arranged in additional valve plates. According to one embodiment, a sheet of PTFE, modified PTFE, a composite material of different layer types or other suitable material that is non-reactive with the process fluid is sandwiched between valve plate 4030 and dispense block 4005 to form the diaphragms of the various valves. Valve plate 4030 includes a valve control inlet (not shown) for each valve to apply pressure or vacuum to the corresponding diaphragm.

As with multi-stage pump 100, pump 4000 can include several features to prevent fluid drips from entering the area of multi-stage pump 100 housing electronics. The "drip proof" features can include protruding lips, sloped features, seals between components, offsets at metal/polymer interfaces and other features described above to isolate electronics from drips. The electronics and manifold and PCB board can be configured similarly to the manner described above to reduce the effects of heat on fluid in the pump chamber.

Thus, similar features as used in a multi-stage pump to reduce form factor and the effects of heat and to prevent fluid from entering the electronics housing can be used in a single stage pump.

In some embodiments, a multi-stage pump or single stage pump can pump fluids having a high viscosity, meaning, for purposes of this application, fluids with a viscosity of 1000 centipoises or greater. As the viscosity of the fluid increases, the pressures required to move the fluid generally increase, causing expansion of the pump components. The amount of expansion will vary with the pressure experienced by each component. While compensating for this expansion can be addressed in software, it can be difficult to configure a pump for operations that occur at different pressures. To reduce errors caused by different amounts of expansion at different pressures, components of the multi-stage pump or single stage pump can be selected to reduce compliance. FIG. 24A-D are diagrammatic representations of an embodiment of a multi-stage pump 5000 adapted for use with high viscosity fluids. Multi-stage pump 5000 can be rated for a particular dispense volume corresponding to a maximum dispense volume that the pump will dispense during operation. Preferably, various components of dispense pump 5000 are selected so that dispense pump 5000 has a compliance of less than 2% of the rated volume at 250 psi.

Similar to other embodiments of a multi-stage pump discussed above, multi-stage pump 5000 can include a dispense block 5005 that defines various fluid flow paths through multi-stage pump 100 including a flow path from an inlet to a feed chamber, from the feed chamber to a filter 120, from filter 120 to a dispense chamber and from the dispense chamber to a dispense outlet. Dispense block 5005 can partially or fully define a feed chamber 155 and a dispense chamber 185 (discussed above). Dispense block 5005 can be a unitary block of PTFE, modified PTFE or other material. Dispense block 5005 can include various external inlets and outlets including, for example, inlet 5010 (shown in FIG. 24B) through which fluid is received and dispense outlet 5020 (shown in FIG. 24C) through which fluid exits during a dispense operation and a vent outlet 5021 (shown in FIG. 24C) through which venting occurs. Dispense block 5005 does not include an external purge from the dispense chamber as fluid can be purged back into the feed chamber. However, in other embodiments, dispense block 5005 can include a purge outlet to allow purging external to pump 5000. U.S. Provisional Patent Application No. 60/741,667, entitled "O-RING-LESS LOW PROFILE FITTING AND ASSEMBLY THEREOF" by Iraj Gashgaee, filed Dec. 2, 2005, and U.S. patent application Ser. No. 11/602,513, which are hereby fully incorporated by reference herein, describe embodiments of fittings that can be utilized to connect the external inlets and outlets of dispense block 5005 to fluid lines.

A pump cover 5025 can protect feed motor 175 and dispense motor 200 from damage. The feed and dispense motors can be the same or different types of motors. According to one embodiment, both can be brushless DC motors and can have the same or different sizes. One suitable motor is an Electrocraft from Dover N.H., P/N DA34HBB-274E17A, Voltage 24 VDS, Current 1.15 A, Max Speed at 250 pounds (max load) =0.2 inch/sec, Torque output, Kt=87 oz-in/amp, winding resistance 11.8 Ohms. A first valve plate 5028 and a second valve plate 5029 provides housings for a system of valves (e.g., inlet valve 125, isolation valve 130, barrier valve 135, purge valve 140 and vent valve 145 of FIG. 2) that can be configured to direct fluid flow to various components of multi-stage pump 5000. According to one embodiment, each of inlet valve 125, barrier valve 135 and purge valve 140 are at least partially integrated into valve plate 5028, while vent valve 145 and isolation valve 130 are at least partially integrated into valve plate 5029. These valves can be diaphragm valves that are individually opened or closed by applying pressure or vacuum to the corresponding diaphragm. In other embodiments, some of the valves may be external to dispense block 5005 or arranged in additional valve plates or a single valve plate. The various valves can be shaped, sized and formed as discussed above or as discussed below or in other suitable manners.

A valve control gas and vacuum are provided to valve plates 5028 and 5029 via valve control supply lines (not shown), which run from a valve control manifold (in electronics housing 5030) and/or through dispense block 5005 to valve plates 5028 and 5029. Valve control gas supply inlet 5065 provides a pressurized gas to the valve control manifold and vacuum inlet 5070 provides vacuum (or low pressure) to the valve control manifold. The valve control manifold can be similar to the manifold previously described and acts as a three way valve to route pressurized gas or vacuum to the appropriate inlets of valve plate 5029 via the supply lines to actuate the corresponding valve(s). As discussed above in conjunction with FIGS. 9-16, valve plates can be used that reduce the hold-up volume of the valves, eliminates volume variations due to vacuum fluctuations, reduces vacuum requirements and reduces stress on the valve diaphragm.

Valve plate 5029 can provide inlets that provide inlets for the valve control gas for the purge valve 140, vent valve 145, inlet valve 125, isolation valve 130 and barrier valve 135, respectively. Fluid flow passages in dispense block 5005 can further direct valve control gas to inlet valve 125, purge valve 140 and barrier valve 135.

Electronics can be arranged in the manner discussed above or, in the example shown in FIG. 24A, can be housed in an electronics housing 5030 that optionally can be separated from dispense block 5005 by an air gap to reduce heat transfer to the dispense block 5005. Alternatively, electronics can be arranged as described above or according to other suitable arrangement. Furthermore, while not illustrated, pump 5000 can include various drip resistant features such those discussed previously.

Figure 24A:
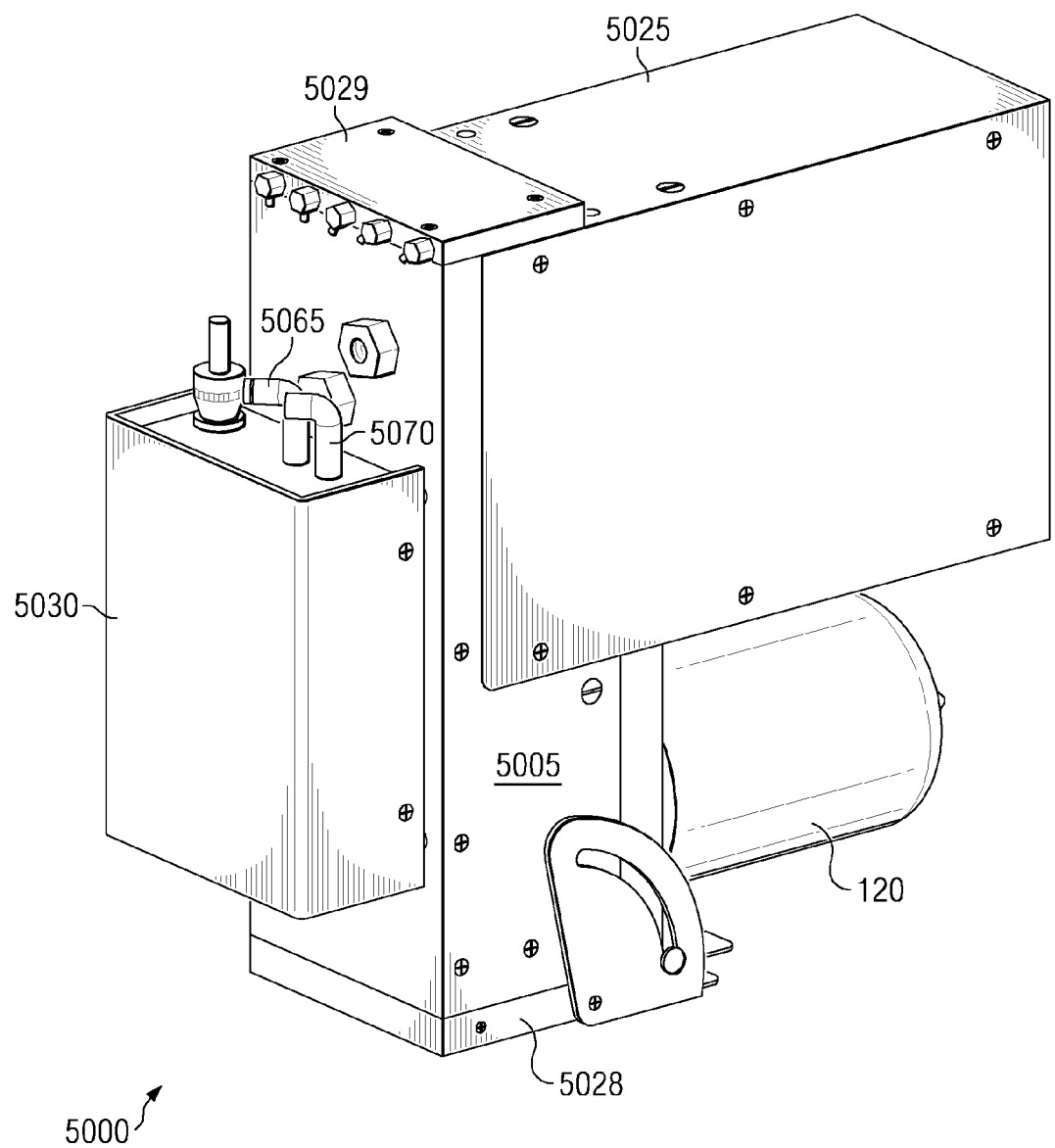
FIGS. 24A-D are diagrammatic representations of one embodiment of a multi-stage pump and embodiments of flow paths through the multi-stage pump.
Figure 24B:
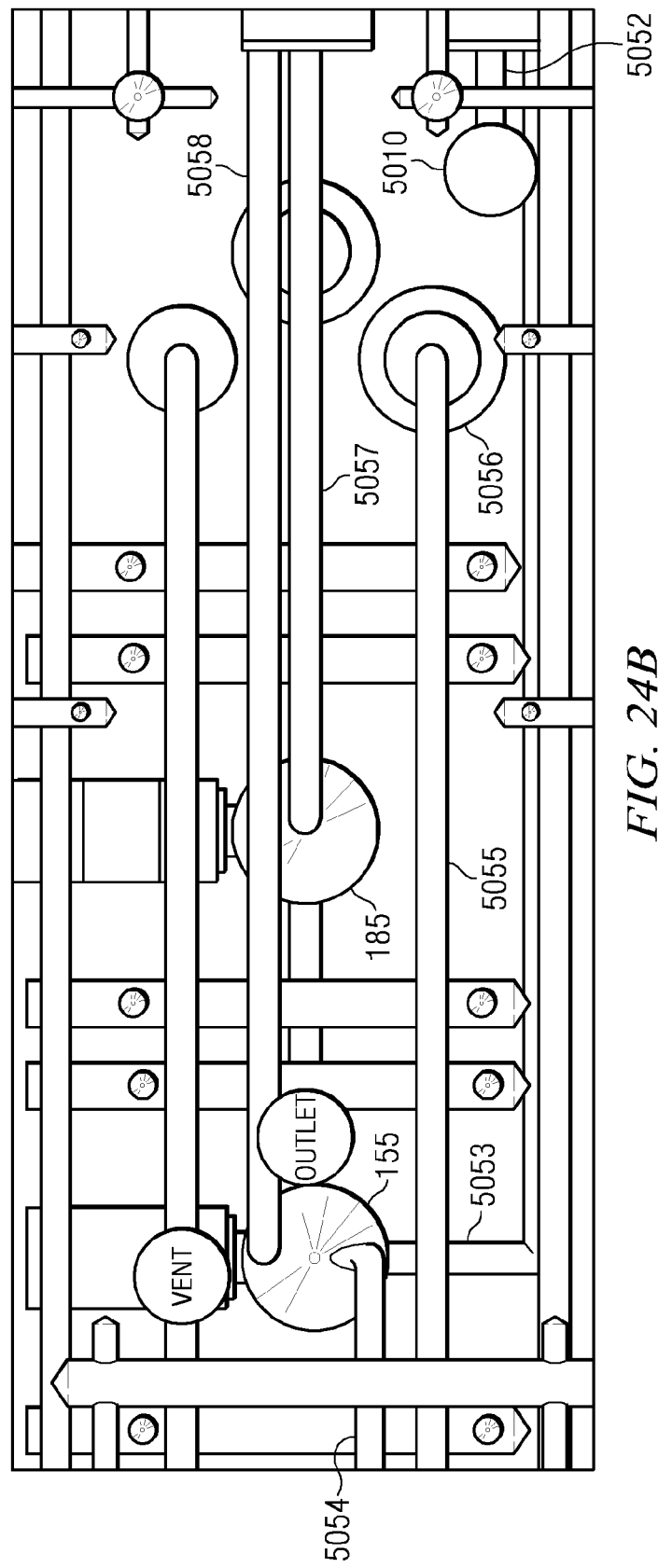
Figure 24C:
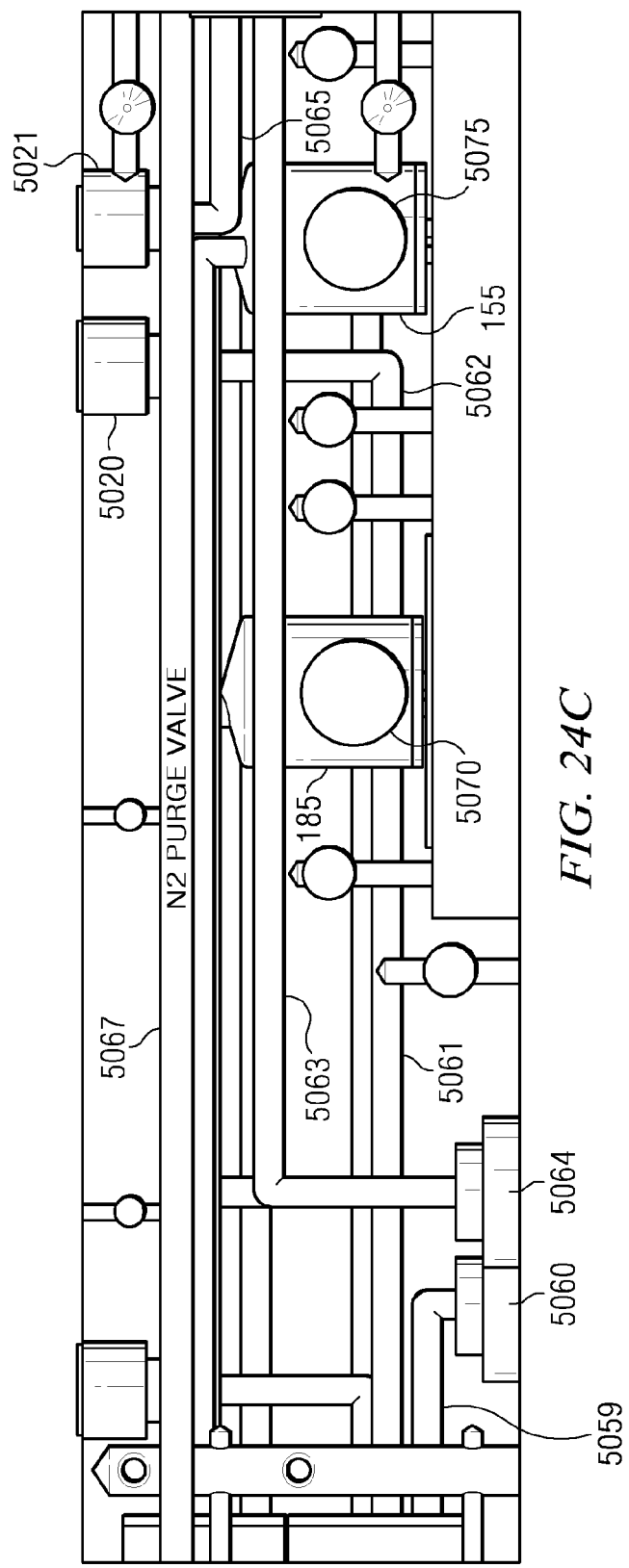
Figure 24D:
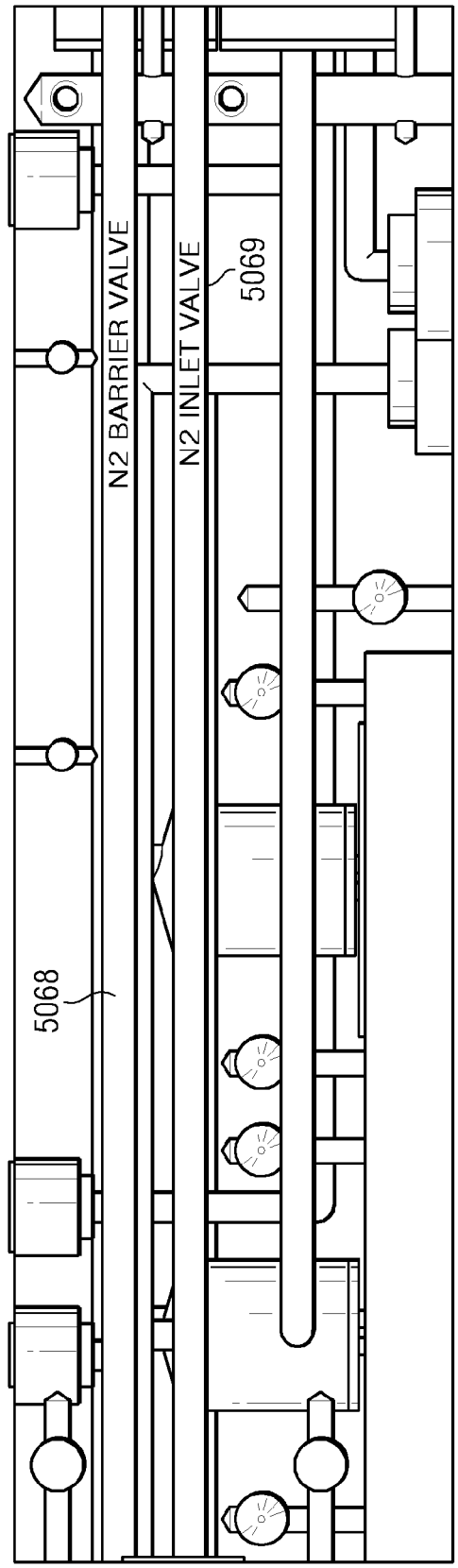

FIGS. 24B-D are diagrammatic representations of views of one embodiment of dispense block 5005 illustrating various fluid flow path sections. A flow path section can be a portion of a flow path or an entire flow path. According to one embodiment, flow path section 5052 runs from inlet 5010 to inlet valve 125 and flow path section 5053 run from inlet valve 125 to feed chamber 155. Flow path section 5054 runs from feed chamber 155 to isolation valve 130 and flow path section 5055 runs from isolation valve 130 to filter inlet 5056. Path section 5057 runs from dispense chamber 185 to purge valve 140 and path section 5058 runs to feed chamber 155.

Shown in FIG. 24C, flow path section 5059 runs from filter outlet 5060 to barrier valve 135 and flow path section 5061 runs from barrier valve 135 to dispense chamber 185. Path section 5062 runs from dispense chamber 185 to outlet 5020. Path section 5063 runs from filter vent 5064 to vent valve 145 and path section 5065 runs from vent valve 145 to vent outlet 5021.

The various flow paths can be sized such that the maximum pressure in pump 5000 does not exceed a particular pressure during operation. According to one embodiment, for fluids with a viscosity of greater than 1000 centipoises, the flow paths can be approximately 0.25 inches in diameter or greater. In other embodiments, the flow paths can be smaller or larger.

Also shown in FIG. 24C is a flow path section 5067 for a valve control gas. In this example, flow path section 5067 is the flow path for the valve control gas for purge valve 140. FIG. 25D illustrates additional flow path section 5068 and 5069 for guiding the valve control gas for barrier valve 135 and inlet valve 125, respectively.

Returning to FIG. 24C, this figure further illustrates ports 5070 and port 5075. These ports can be shaped to allow a pressure sensor to be inserted in dispense block 5005 to take pressure readings from dispense chamber 185 and feed chamber 155. Embodiments of pressure control of a pump are described in U.S. patent application Ser. No. 11/292,559, entitled "System and Method for Control of Fluid Pressure," by George Gonnella and James Cedrone, filed Dec. 2, 2005; U.S. patent application Ser. No. 11/364,286, entitled "System And Method For Monitoring Operation Of A Pump", by George Gonnella and James Cedrone, filed Feb. 28, 2006; U.S. patent application Ser. No. 11/292,559 entitled "System and Method for Control of Fluid Pressure" by George Gonnella et al., filed Dec. 2, 2005; U.S. patent application Ser. No. 11/364,286 entitled "System and Method for Monitoring Operation of a Pump" by George Gonnella et al., filed Feb. 28, 2006 and U.S. patent application Ser. No. 11/948,585 entitled "System and Method for Operation of a Pump" by Paul Magoon et al. filed Nov. 30, 2007, all of which are fully incorporated herein by reference. Additional pressure control is described below.

Figure 25A:
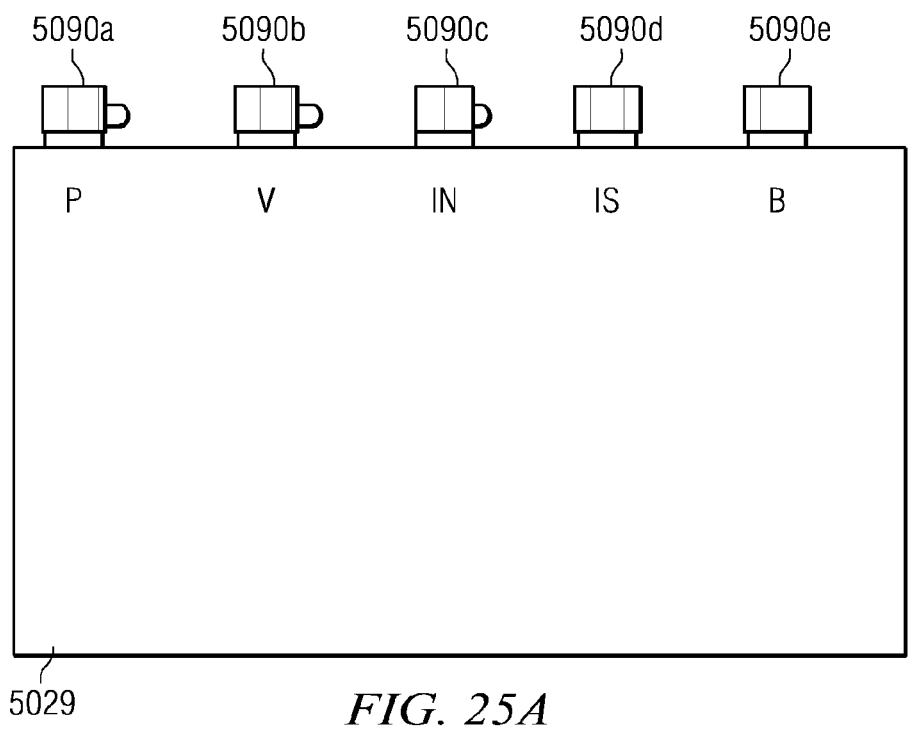
FIGS. 25A-C are diagrammatic representations of one embodiment of a valve assembly.
Figure 25B:
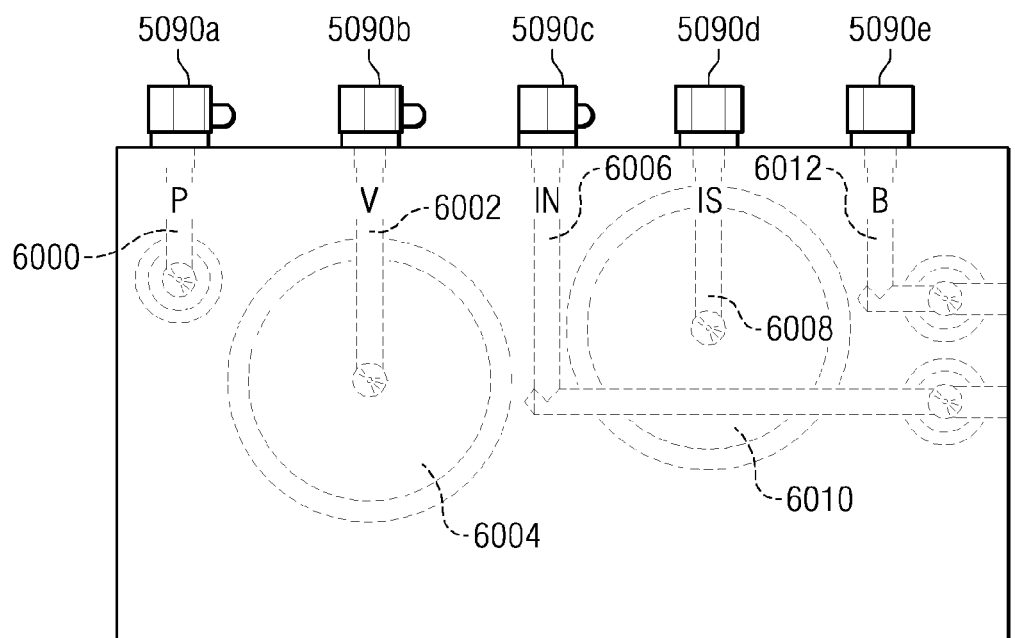

FIG. 25A illustrates an embodiment of valve plate 5029 showing inlets 5090a-d for the valve control gas for purge valve 140, vent valve 145, inlet valve 125, isolation valve 130, and barrier valve 135, respectively. FIG. 25B illustrates an embodiment of valve plate 5029 illustrating the flow paths for the valve control gas in valve plate 5029. Flow path section 6000 leads from inlet 5090a to flow path section 5067 (shown in FIG. 24C) through the dispense block. Flow path section 6002 leads from inlet 5090b to valve chamber 6004. Flow path section 6006 leads from inlet 5090c to section 5069 (shown in FIG. 24D) that passes through dispense block 5005. Flow path section 6008 leads from inlet 5090c to valve chamber 6010. Flow path section 6012 leads from inlet 5090e to path section 5068 (shown in FIG. 24D) that passes through dispense block 5005.

Figure 25C:
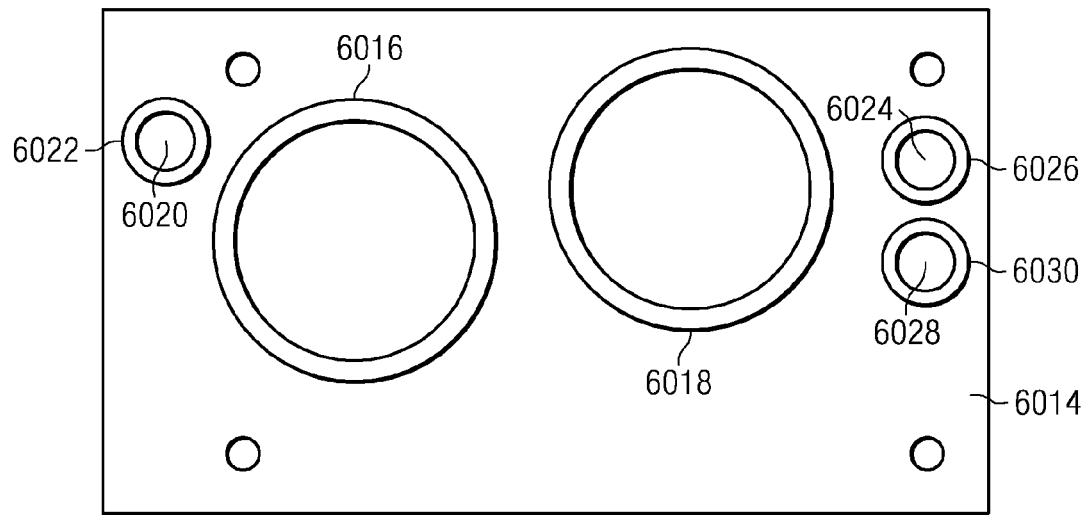

Valve chambers 6004 and 6010 can form the valve chambers for vent valve 145 and isolation valve 130. Flow passages 6002 and 6008 can guide gas to a diaphragm to open or close the valves as discussed above in conjunction with FIGS. 9-26 above. FIG. 25C, for example, illustrates on embodiment of a valve diaphragm for vent valve 145 and isolation valve 130. As described previously, a single flexible diaphragm, such as made out of PTFE or other suitable material, can be used for multiple valves. O-rings 6016 can 6018 can seat in corresponding grooves in valve plate 5029. Openings 6020, 6024 and 6028 can allow gas to flow from flow path sections 6000, 6006 and 6012 in valve plate 5029 to sections 5067, 5069 and 5068 in dispense block 5005. O-rings 6022, 6026 and 6030 can prevent leaks at the interface between the passages and can partially seat in corresponding grooves in valve plate 5029. The various o-rings, along with a portion of the diaphragm 6014 can also seat in corresponding grooves in the end of dispense block 5005.

Figure 26A:
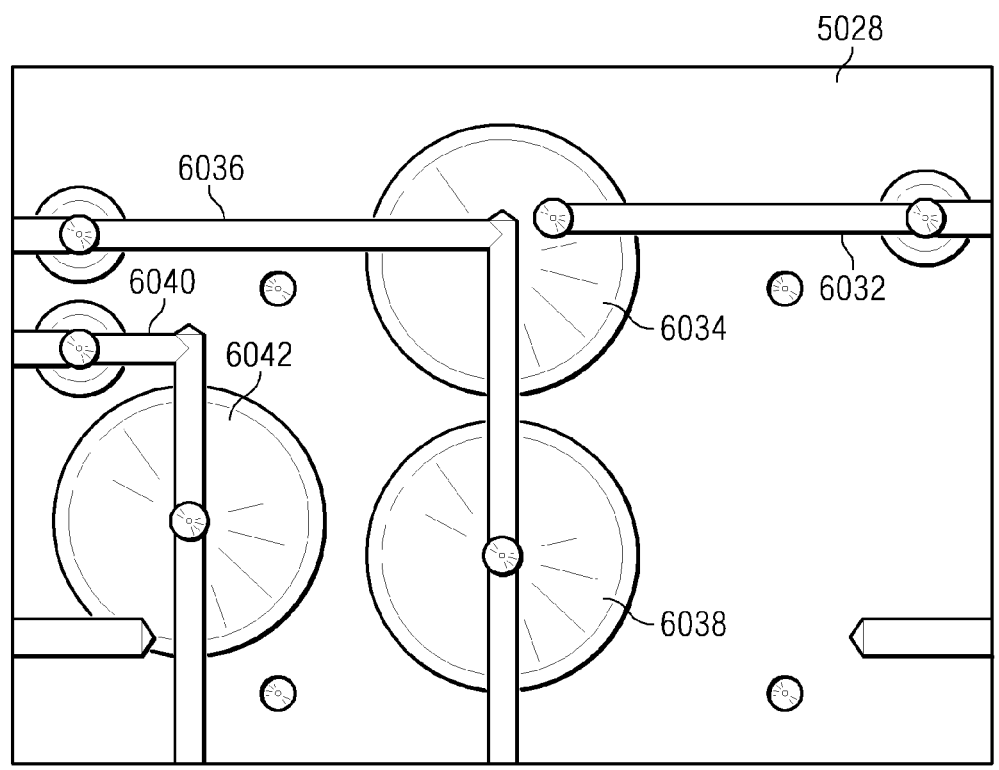
FIGS. 26A-B are diagrammatic representations of another embodiment of a valve assembly.

FIG. 26A is a diagrammatic representation of flow paths for valve control gas in valve plate 5028. Flow path section 6032 leads from section 5067 (shown in FIG. 24C) to valve chamber 6034. Flow path section 6036 leads from flow path section 5068 (shown in FIG. 24D) to valve chamber 6038 and flow path section 6040 leads from path section 5069 (shown in FIG. 24D) to valve chamber 6042. Valve chambers 6034, 6038 and 6042 form the valve chamber for purge valve 140, barrier valve 135 and inlet valve 125, respectively. According to one embodiment, the valve chambers can be sized so that a sufficient force is exerted by the valve control gas to keep the valves closed against the potentially higher pressure of the process fluid on the other side of the diaphragm.

Figure 26B:
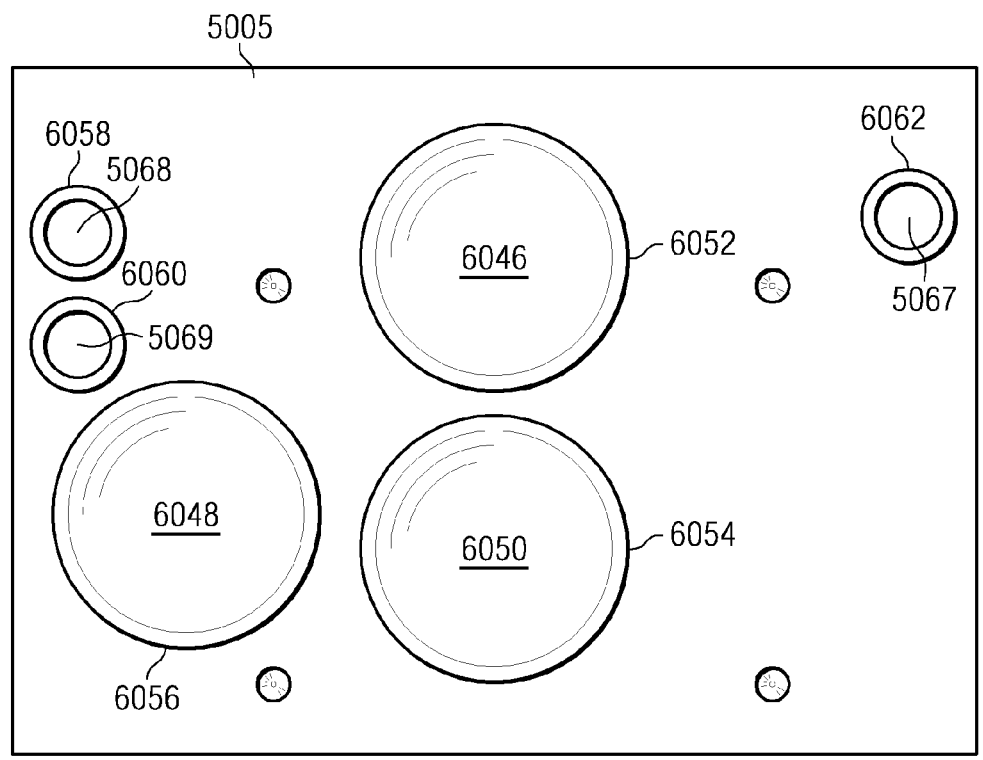

FIG. 26B illustrates one embodiment of an arrangement of diaphragms an o-rings at the end of dispense block 5005 proximate to valve plate 5028. In the embodiments shown diaphragm's 6046, 6048 and 6050 are separate diaphragms that can be made of any suitable material including, but not limited to PTFE, modified PTFE, a composite material of different layer types or other suitable material that is non-reactive with the process fluid. O-rings 6054, 6056 and 6052 can seat in corresponding rings in valve plate 5028 and these o-rings and portions of the corresponding diaphragms can seat in rings on the end of the dispense block 5005. O-rings 6062, 6060 and 6058 can seat in grooves on valve plate 5028 and dispense block 5005 and act to prevent leaks at the interface between flow path sections 5067, 5068 and 5069 with the corresponding flow path sections in valve plate 5028.

Compliance in pump 5000 can come from any portion of the flow path, but particularly from the filter 120. Embodiments of a high-viscosity pump can utilize filters designed to reduce compliance. With reference to the filter, non-compliance means that the filter has an overall change in volume of less than 2 ml at 65 psi. Preferably, the filter has a change in volume of less than 1.5 mL at 65 psi and even more preferably a change in volume of less than 0.5 ml at 65 psi. Furthermore, as discussed above, high-viscosity pump 5000 is noncompliant as a whole, exhibiting less than a 2% change in rated volume at 250 psi.

Figure 27:
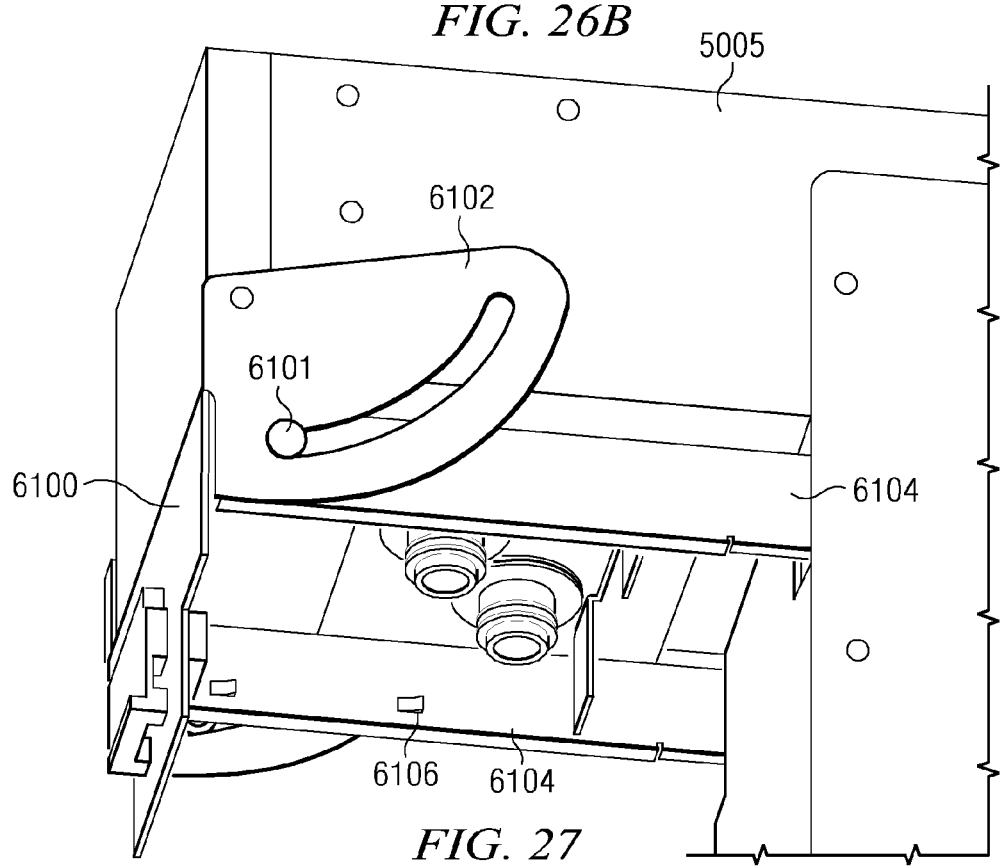
FIG. 27 is a diagrammatic representation of a quick change mechanism for a pump.

According to an embodiment, the filter is configured to be compatible with rapid change out filter systems such as the Optimizer II ST Manifold by Entegris, Inc. of Chaska, Minn. FIG. 27, for example, illustrates one embodiment of a quick change mechanism for connecting a filter. In this example, handle 6100 rotates clockwise relative to dispense block 5005. As handle 6100 rotates, member 6101 can move along the tracks of plate 6102 allowing guides 6104 to drop away from dispense block 5005. A filter can be positioned with a head portion of the filter resting on guides 6104 (for example on protrusions 6106), with the remainder of the filter extending through the space between guides 6104. Handle 6100 can be moved counterclockwise to force guides 6104 back towards dispense block 5005 so that the filter mates with the filter ports of dispense block 5005. FIG. 24A illustrates filter 120 in place in the manifold. Preferably, the rapid change out filter system allows filters to be changed in less than two minutes and even more preferably, in less than one minute without requiring the filter to be screwed onto or into dispense block 5005.

Figure 28:
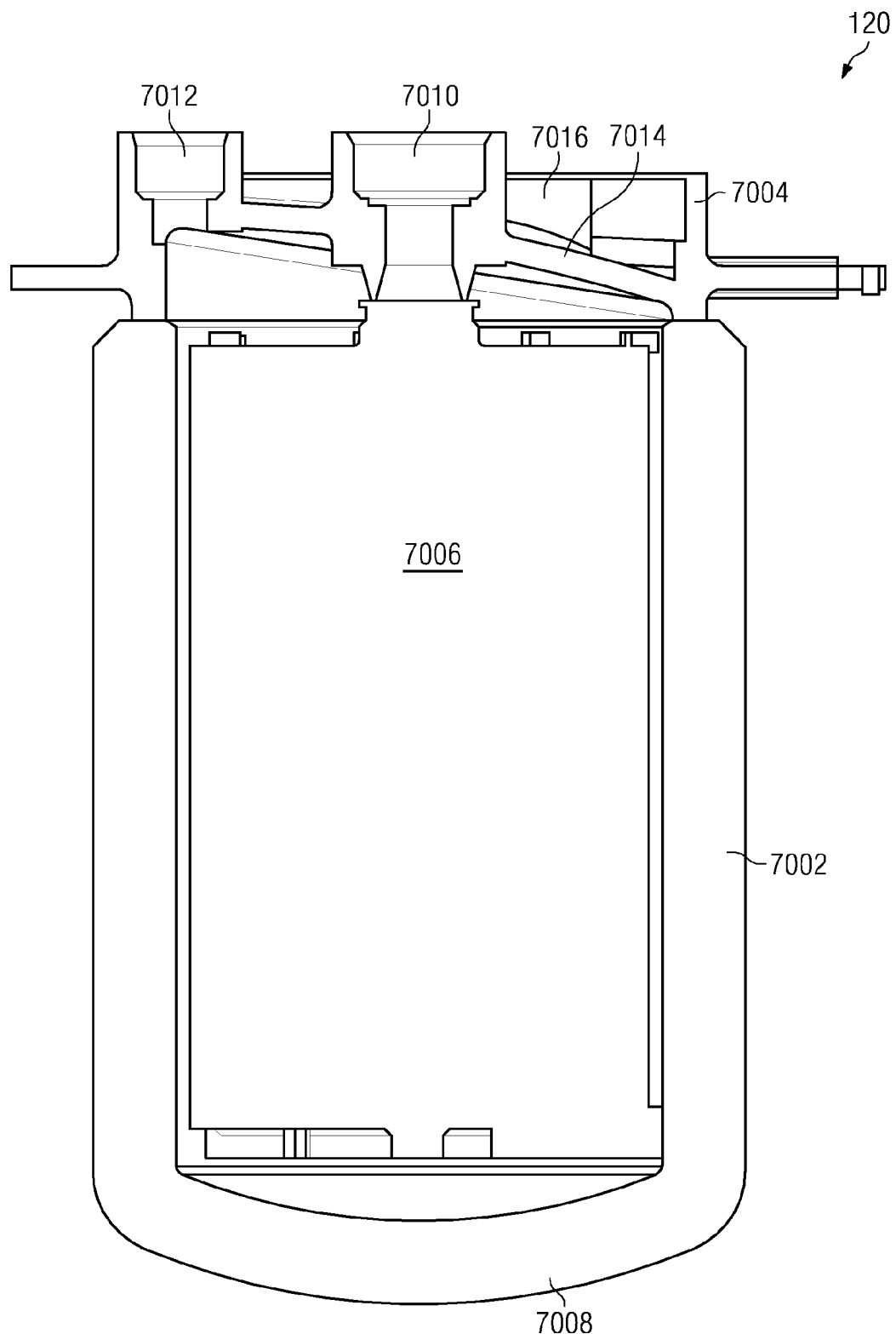
FIG. 28 is a diagrammatic representation of one embodiment of filter.

FIG. 28 is a diagrammatic representation of a cross-section of one embodiment of a filter 120 suitable for high viscosity pumps including single stage and multi-stage pumps. In the embodiment of FIG. 27, filter 120 includes a bowl 7002 and a head 7004 forming a filter housing and defining a filter cavity. Bowl 7002 and head 7004 can be made of any suitable material. According to one embodiment they are both made of HDPE. A filter cartridge 7006, filter membrane or other filter device can be disposed in the filter cavity. The filter device can comprise a pleated filter, tube filter, disk filter or other filter known or developed in the art.

Bowl 7002 includes a sidewall and bottom portion. The sidewall can have a sufficient thickness to reduce compliance. For example, for an HDPE bowl 7002, the sidewalls can be greater than 0.375 inches thick and are preferably approximately 0.44 inches thick. The sidewall may be thicker or thinner depending on the material and construction used and the process requirements. In various embodiments, the sidewall can be thinner and additional structures, such as bands, sleeves or other structures can be used to reduce compliance. Bowl 7002 can further include a hemispherical, elliptical or otherwise curved bottom portion 7008. The curve can extend the entire distance of bottom portion 7008 or can be a portion of bottom portion 7008. Furthermore, the curvature may be on the inside surface or both the inside and outside surface of bottom portion 7008. In various embodiments, the curve can be convex or concave. The curvature of bottom portion 7008 can be selected to reduce compliance. In other embodiments, bottom portion 7008 can be flat. Corners between various surfaces can be radiused to distribute stress at the corners. Bowl 7002 can be machined, molded or otherwise formed. While bowl 7002 is shown as having a generally cylindrical sidewall, bowl 7002 can include other shapes and may have multiple sidewalls.

Head 7004 can be shaped and sized to fit a quick change mechanism of a pump and provide ports to allow air and fluid to flow between the pump and filter. FIG. 28 shows the outlet port 7010 and vent port 7012 that can interface with corresponding ports of the dispense block. Each of outlet port 7010, vent port 7012 and the inlet port (shown in FIG. 31) can have an o-ring disposed therein that aids in preventing leaks at the ports.

According to one embodiment, head 7004 can form a top surface 7014 that can be flat or curved. For example, top surface can be a hemisphere, elliptical shape or other concave shape across its entire area or a portion of the area. Top surface 7014, according to one embodiment, can slope towards vent port 7012. This allows air trapped under top surface 7014 to travel upwards to vent port 7012.

Head 7004 can further include ribs (such as rib 7016) to reduce deflection of top surface 7014, thereby reducing compliance of filter 120. While any suitable rib structure can be used, the ribs are preferably arranged in a hub and spoke pattern. The height and width of the ribs can be selected based on application to reduce compliance. In other embodiments, head 7004 can be of sufficient thickness to reduce deflection. Intersections between surfaces on head 7004 can be radiused to distribute stress at the corners.

Head 7004 can be machined, molded or otherwise formed. Head 7004 can be joined to bowl 7002 and cartridge 7006 through fusion bonding at surfaces that are in contact. In other embodiments, adhesive, chemical, interference fit, attachment mechanism (e.g., screw, rivet, rod or other mechanical attachment mechanism) can be used to couple head 7004 to bowl 7002 and cartridge 7004.

Figure 29:
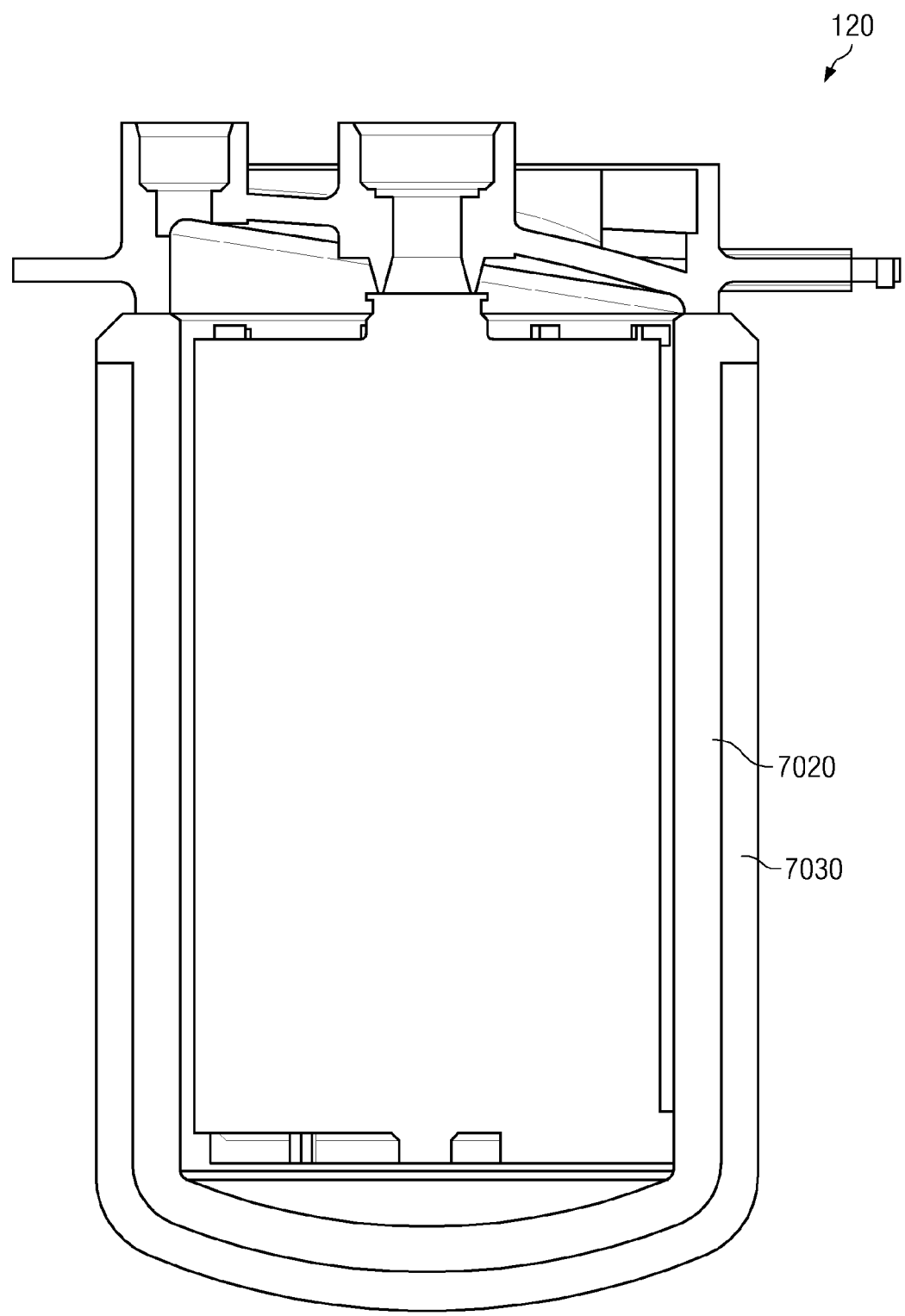
FIG. 29 is a diagrammatic representation of another embodiment of a filter.

FIG. 29 is a diagrammatic representation of a cross section of another embodiment of a filter 120 that utilizes two molded parts to form the bowl. In the embodiment of FIG. 29, the bowl can be molded as an inner portion 7020 and an outer portion 7030. Inner portion 7020 and outer portion 7030 can be coupled together via fusion bonding, chemical bonding, adhesives, mechanical attachment, friction fit, interlocking features, interference fit or other suitable mechanism. Molding the bowl as two or more pieces provides an advantage because it is easier to mold a thinner piece (e.g., less than 0.3 inches thick) than a single piece that is 0.44 inches thick without voids or other defects that can degrade the integrity of the walls. In other embodiments, thicker molded pieces can be formed using a suitable blowing agent. The inner portion 7020 and the outer portion 7030 can have the same thickness as a thicker walled single piece bowl to provide similar non-compliance, while reducing the cost to manufacture and the likelihood of defects. While both inner and outer portion 7020 and 7030 can be made of the same material, in other embodiments, they can be formed of different materials. For example, inner portion 7020 can be relatively compliant plastic, while outer portion 7030 can be formed of a metal, composite material, less compliant plastic or other suitable material. Both the inner portion 7020 and outer portion 7030 can be disposable, or inner portion 7020 can be disposable while outer portion 7030 is reusable.

As another embodiment, bands of reinforcing material can encircle inner portion 7020 or outer portion 7030, allowing the sidewalls to be thinner. Any suitable material to reduce compliance can be used, including, but not limited to, metal, hard plastic, carbon fiber, composites or other materials. According to one embodiment PEEK bands can be used. While the example of bands is used, other reinforcing structures may also be used.

Figure 30:
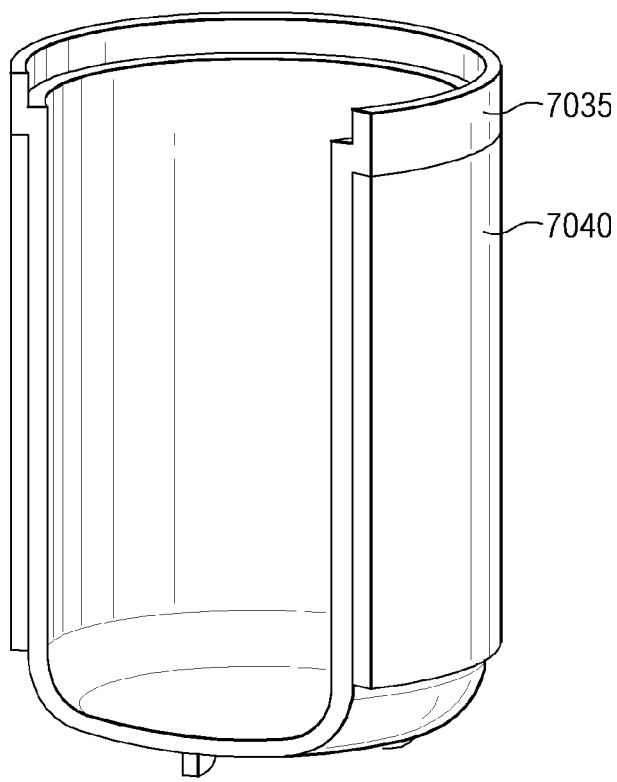
FIG. 30 is a diagrammatic representation of yet another embodiment of a filter.

FIG. 30 illustrates another embodiment of a bowl that has an inner portion 7035 and a reinforcing structure 7040. In this example, reinforcing structure 7040 is a stainless steel ring. Inner portion 7035 and reinforcing structure 7040 can be formed of suitable materials that allow the filter to be non-compliant. While reinforcing structure 7040 is illustrated as a single ring, it may be multiple bands or have other suitable configuration and be formed of any suitable material. Additionally, reinforcing structure 7040 may be used to reinforce a multiple portion bowl and can be located between the portions or on the outside of the bowl.

Figure 31A:
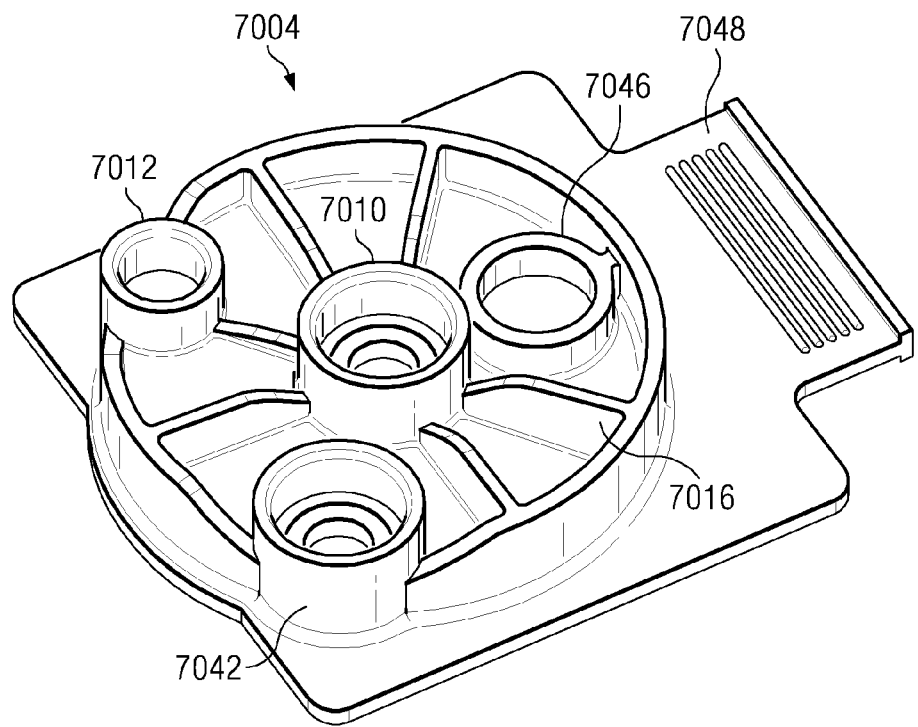
FIGS. 31A-B are diagrammatic representation including an embodiment of a head portion of a filter.

FIG. 31A illustrates one embodiment of a head 7004. Head 7004 can include an outlet port 7010, vent port 7012 and inlet port 7042 that are sized and shaped to complement ports on the pump. O-rings can be disposed in outlet port 7010, vent port 7012 and inlet port 7042 to prevent leaks. Ribs 7016 reduce deflection thereby reducing the compliance of head 7004. The ribs can be taller for filters that will experience higher pressures and shorter for other filters. In other embodiments, the surface of head 7004 can be made thick enough that ribs are not required.

According to one embodiment, head 7004 can include an identification receiving portion 7046 that is sized and shape to receive a mechanical or electronic identification. For example, a RFID, Bluetooth, IR, other wireless protocol or other identification device can be placed in portion 7046. The identification device can include manufacturer information about the filter (type of filter, rating, protocol for running the filter (by way of example, but not limitation, recipe variables, parameters, equations, curves for operations using the filter), priming/filling sequence for the filter pressure drop characteristics, flow rate, pore size or other information). In other embodiments a variety of sensors can be disposed in portions of head 7004.

Head 7004 can be shaped and sized to allow insertion into a quick change out device of a pump. For ease of installation, head 7004 can include a handle portion 7048 that can include features to ease gripping by a robot or human.

Figure 31B:
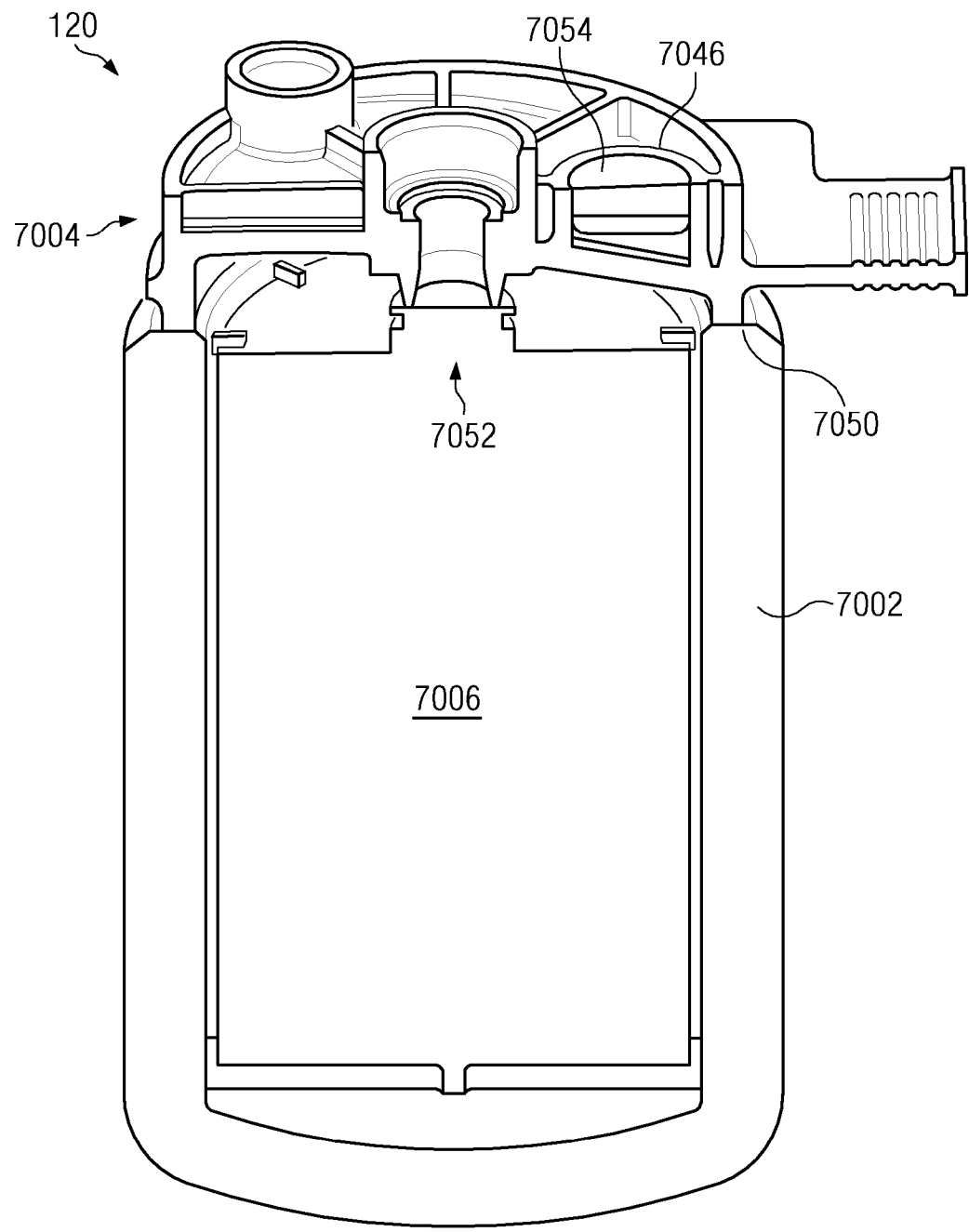

FIG. 31B is a diagrammatic embodiment of filter 120 with head 7004 coupled to bowl 7002 and cartridge 7006. According to one embodiment, head 7004 can be coupled to bowl 7002 and cartridge 7006 through fusion bonding at surfaces 7050 and 7052, respectively. As discussed above, these components can be otherwise coupled together. FIG. 31B also illustrates an identification device 7054 in place in portion 7046 of head 7004.

Figure 32A:
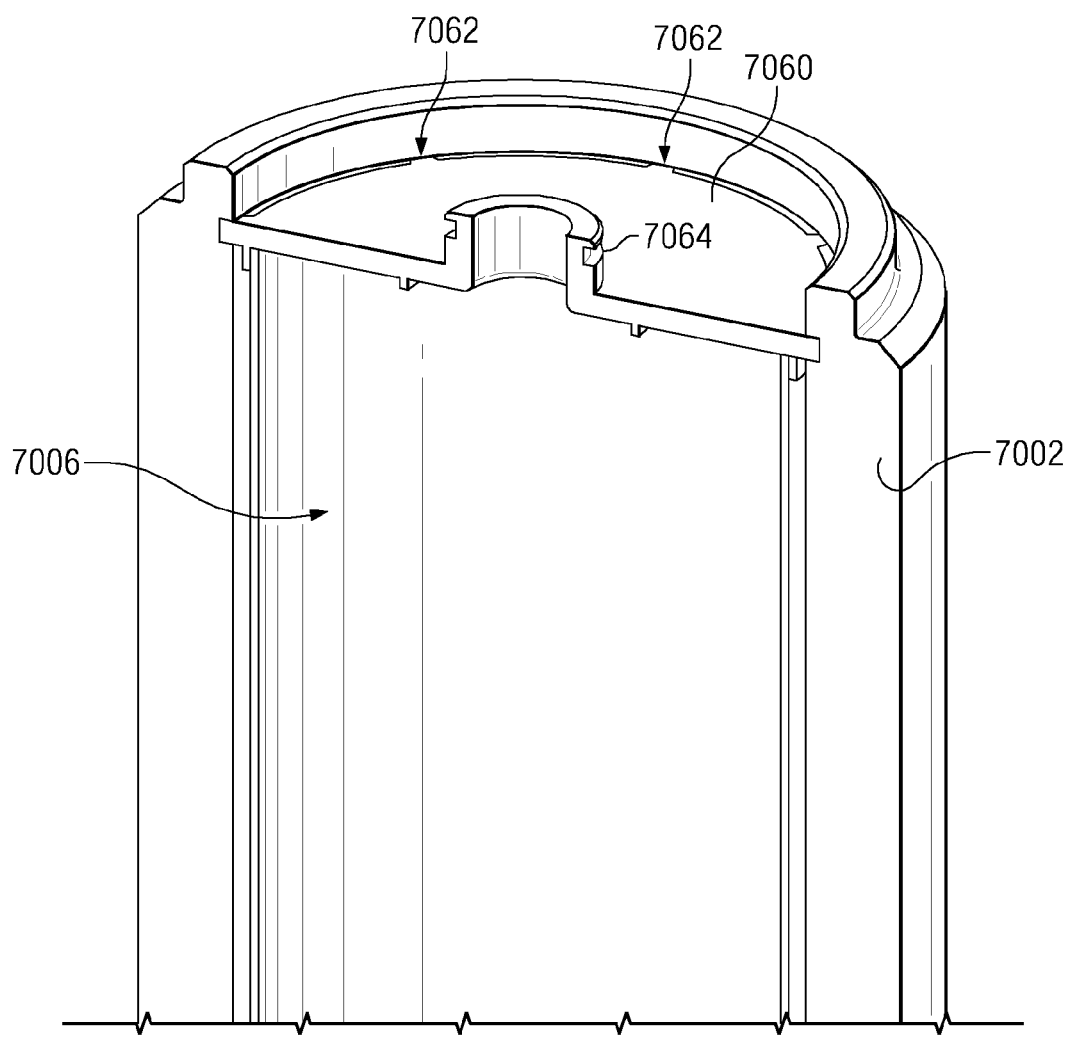
FIGS. 32A and 32B are diagrammatic representations of embodiments of a filter cartridge and filter bowl.
Figure 32B:
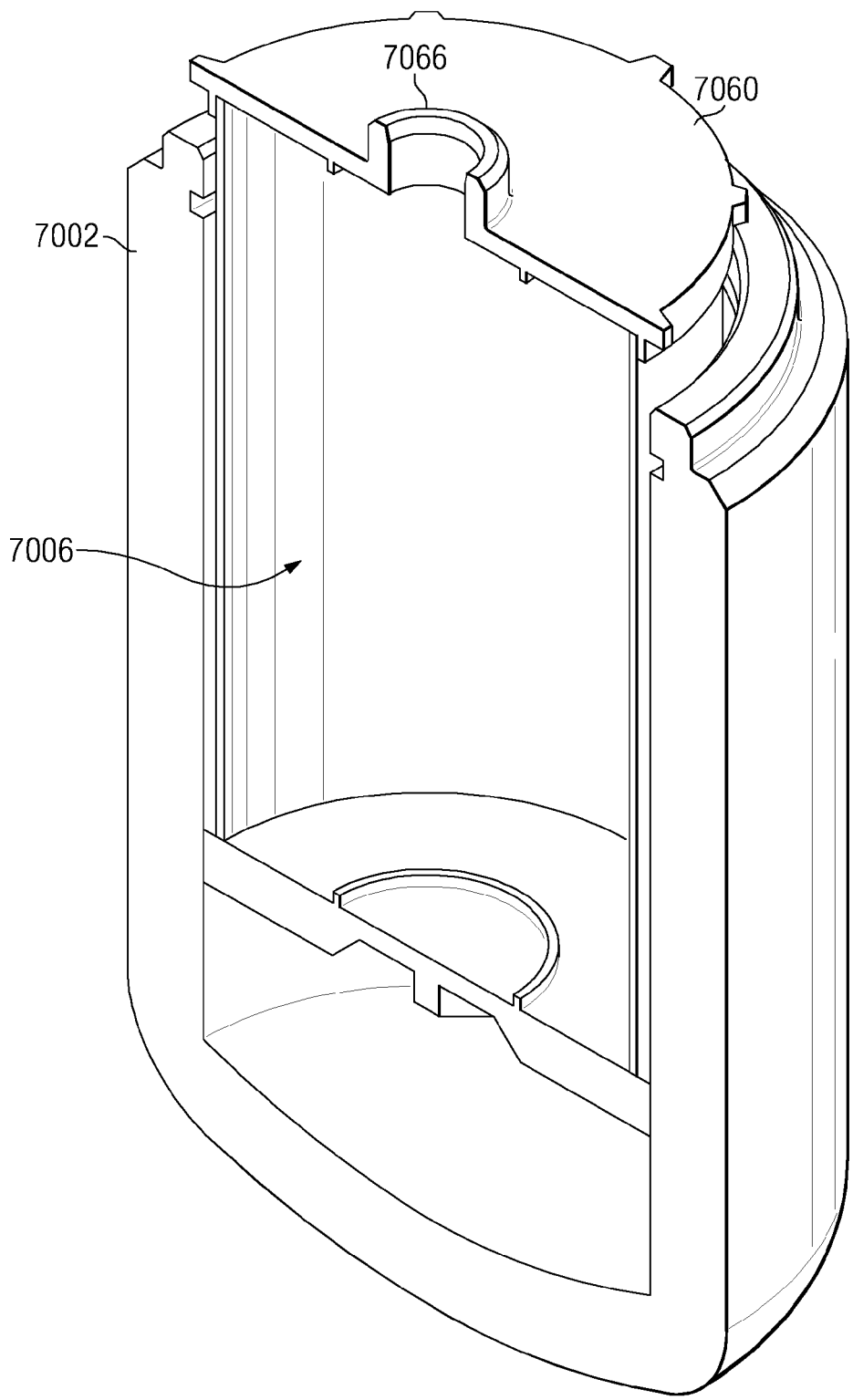

FIG. 32A is a diagrammatic representation of one embodiment of a filter cartridge end cap. Cartridge 7006 can include any suitable filter material. One example of a filter cartridge is an Optimizer HV 40 (1 micron), Catalog #SH5M004B05, from Entegris, Inc. In the embodiment of FIG. 32A, the end cap 7060 includes an outlet port that can fit in a corresponding portion of head 7004. An O-ring can be disposed in ring 7064. Additionally, the end cap can include lugs or other features that snap in groove 7063 of bowl 7002. The lugs allow for easy alignment of cartridge of 7006 in bowl 7002 while still allowing fluid entering the filter to flow between the lugs. Any number or shape of lugs can be used. FIG. 32B is a diagrammatic representation of another embodiment of a cartridge 7006 being inserted in bowl 7002. In the embodiment of FIG. 32B, end cap 7060 includes a surface 7066 that is suitable for boding with a corresponding portion of head 7004.

Returning to the operation of such a pump, it will be noted that pressure spikes and subsequent drops or other variations in pressure may be damaging to the fluid (for example, may change the physical characteristics of the fluid unfavorably). Additionally, pressure spikes can lead to built up fluid pressure that may cause a dispense pump to dispense more fluid than intended or dispense the fluid in a manner that has unfavorable dynamics.

Certain of these pressure variations may be minimized by the techniques described in U.S. patent application Ser. No. 11/292,559, entitled "System and Method for Control of Fluid Pressure," by George Gonnella and James Cedrone, filed Dec. 2, 2005; U.S. patent application Ser. No. 11/364, 286, entitled "System And Method For Monitoring Operation Of A Pump", by George Gonnella and James Cedrone, filed Feb. 28, 2006; U.S. patent application Ser. No. 11/292,559 entitled "System and Method for Control of Fluid Pressure" by George Gonnella et al., filed Dec. 2, 2005; U.S. patent application Ser. No. 11/364,286 entitled "System and Method for Monitoring Operation of a Pump" by George Gonnella et al., filed Feb. 28, 2006 and U.S. patent application Ser. No. 11/948,585 entitled "System and Method for Operation of a Pump" by Paul Magoon et al. filed Nov. 30, 2007, all of which are fully incorporated herein by reference.

However, these types of pressure variations may be caused by the opening and closing of valves within the pumping apparatus. In particular, in certain instances the dynamics of a dispense may be adversely affected by failing to allow the pressure within the multi-stage pump 100 to properly equalize before subsequent actions are initiated. This situation may manifest itself especially with respect to the use of multi-stage pump 100 in conjunction with a high-viscosity fluid, as the use of such a high-viscosity fluid may mean that higher pressure may be used within the multi-stage pump 100 to effectuate dispense of the high-viscosity. The use of high pressures within the multi-stage pump 100 may, however, mean that the time for the pressure of the fluid within the multi-stage pump 100 to equalize after performing an action (for example, filling a chamber, opening or closing a valve, etc.) may be commensurately longer as well. Thus, in many cases it is desired to coordinate the movement of the opening and closing of the various valves and/or engagement and disengagement of the motors can be timed to ensure that at least a certain amount of pressure equalization of the fluid within the multi-stage pump 100 has occurred before subsequent actions are taken.

It is desirable, therefore is to utilize a sequence for the opening and closing of valves within a pumping apparatus which minimizes or reduces pressure variations within the fluid. In certain cases, after a particular action or before another action takes place a pressure measurement (for example, from a pressure transducer within multi-stage pump 100) may be used to ensure that a desired amount of pressure equalization has taken place, or a desired pressure exists, before the next action may commence. In one embodiment, a pressure transducer may be used to ensure that the pressure within a particular area of multi-stage pump 100 is close to, or at, a desired pressure (for example, substantially at or around zero p.s.i) before a subsequent action occurs. This type of pressure equalization delay may be usefully applied after, for example, a fill of feed chamber 155 as will be discussed in more detail below. However, this type of pressure equalization delay may be equally well applied at other times during the operation of multi-stage pump 100 as will be noted by those of ordinary skill in the art after a thorough review of this disclosure.

Additionally, in some embodiments, a sufficient amount of time will be utilized between certain changes to ensure that a particular valve is fully opened or closed, a motor is fully started or stopped, or pressure within the system or a part of the system is substantially at zero p.s.i. (for example, gauge) or other non-zero level before another change (for example, valve opening or closing, motor start or stop) occurs (for example, is initiated). In many cases, for example when a high viscosity fluid is utilized with multi-stage pump a delay of between 100 and 700 milliseconds should be sufficient to allow a valve within multi-stage pump 100 to substantially fully open or close, and may in one particular embodiment be around half a second. The actual delay to be utilized in a particular application or implementation of these techniques may, however, be at least in part dependent on the viscosity of the fluid being utilized with multi-stage pump 100 along with a wide variety of other factors.

Furthermore, in order to ameliorate the pressure variations caused by the operation of multi-stage pump 100, the opening and closing of the various valves and/or engagement and disengagement of the motors can be timed to reduce pressure variations. In general, to reduce pressure variations, a valve should not be closed to create a closed or entrapped space in the fluid path if it can be avoided, and part and parcel with this, a valve between two entrapped spaces should not be opened if it can be avoided. Conversely, opening any valve should be avoided unless there is an open fluid path to an area external to multi-stage pump 100 or an open fluid path to atmosphere or conditions external to multi-stage pump 100 (for example, outlet valve 147, vent valve 145 or inlet valve 125 is open).

Figure 33A:
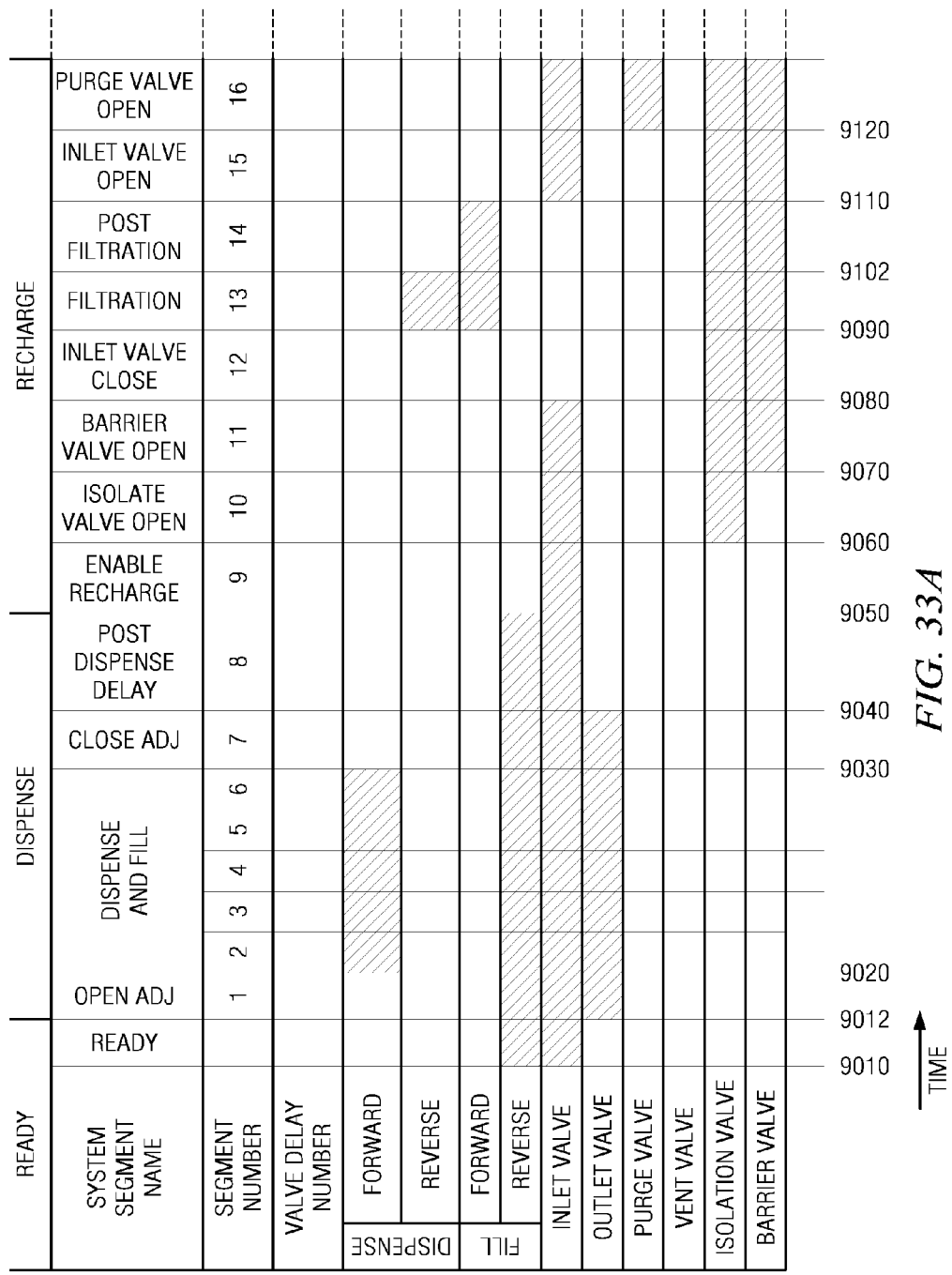
FIGS. 33A and 33B are diagrammatic representations of one embodiment of valve and motor timings for various segments of the operation of a pump.
Figure 33B:
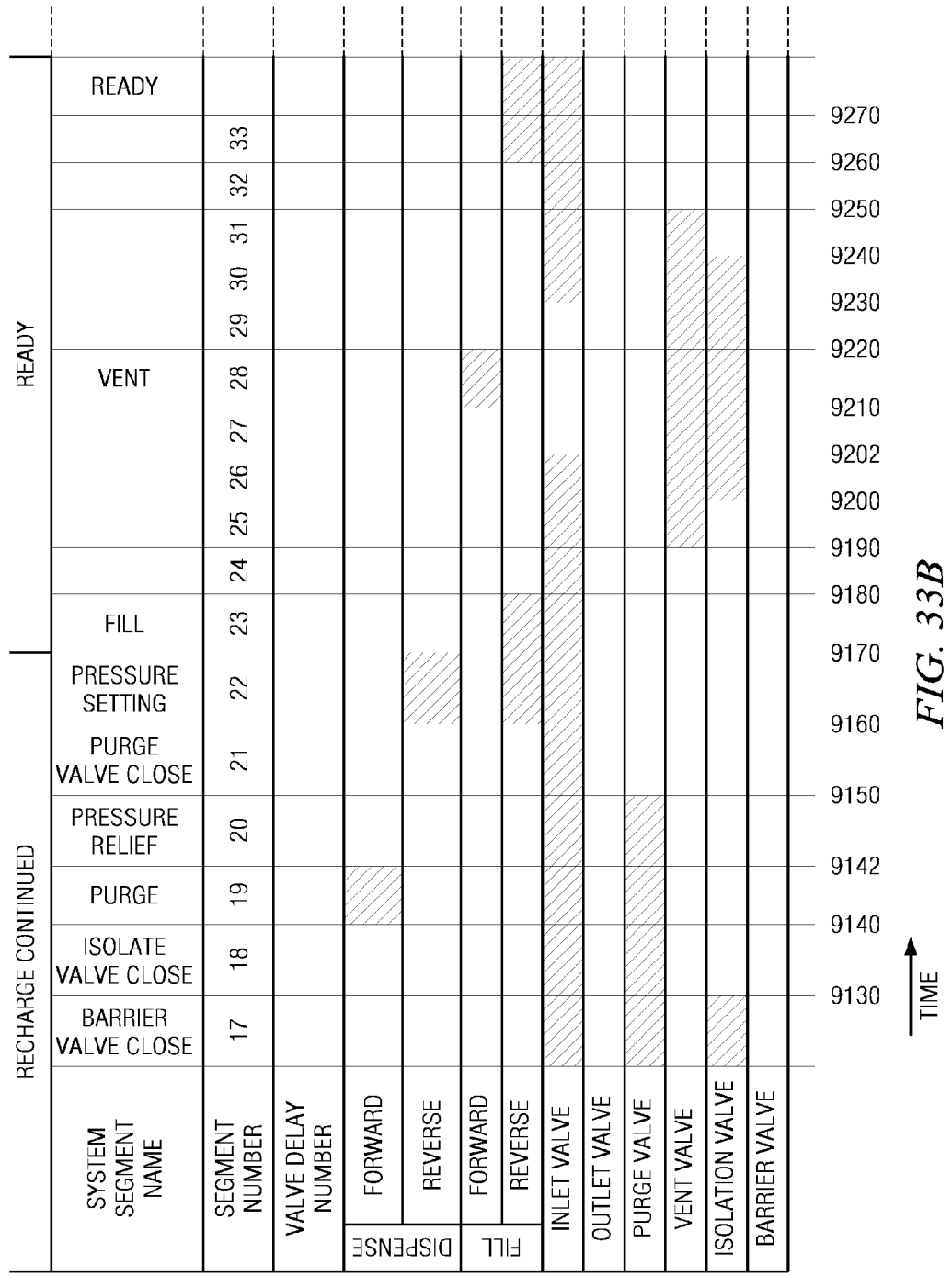

FIGS. 33A and 33B provide a diagrammatic representation of an embodiment of valve and motor timings for various segments of the operation of multi-stage pump 100 which may serve to ameliorate pressure variations and allow at least some pressure equalization during operation of the multi-stage pump 100. Embodiments such as those depicted in FIGS. 33A and 33B may be particularly useful in cases where multi-stage pump 100 is utilized to dispense a high viscosity fluid. It will be noted that FIGS. 33A and 33B are not drawn to scale and that each of the numbered segments may each be of different or unique lengths of time (including zero time), regardless of their depiction in these figures, and that the length of each of these numbered segments may be based on a wide variety of factors such as the user recipe being implemented, the type of valves being utilized in multi-stage pump 100, the viscosity of the fluid being utilized in conjunction with multi-stage pump 100, pressure measured in one or more chambers of multi-stage pump 100, etc.

Referring first to FIG. 33A, at time 9010 a ready segment signal may indicate that multi-stage pump 100 is ready to perform a dispense, sometime after which, at time 9012, a signal may be sent to open outlet valve 147. After a suitable delay to allow outlet valve 147 to open, one or more signals may be sent at time 9020, to operate dispense motor 200 in a forward direction to dispense fluid from outlet valve 147. At time 9030 a signal may be sent to stop dispense motor 200 to end the dispense segment and at time 9040 a signal sent to close outlet valve 147.

It will be apparent after reading this disclosure that the timing of the valve signals and motor signals may vary based on the time required to activate the various valves or motors of the pumps, the recipe being implemented in conjunction with multi-stage pump 100, the viscosity of the fluid being utilized with multi-stage pump 100 or other factors. For example (as depicted in FIG. 33A), a signal may be sent to open outlet valve 147 before the signal is sent to operate dispense motor 200 in a forward direction because, in this example, outlet valve 147 may operate more slowly than dispense motor 200 or it is desired to have the outlet valve 147 fully open before a dispense is started, and thus it is desired to time the opening of the outlet valve 147 and the activation of dispense motor 200 such that they substantially coincide to achieve a better dispense. Other valves and motors may, however, have different activation speeds, etc., and thus different timings may be utilized with these different valves and motors. For example, a signal to open outlet valve 147, may be sent earlier or substantially simultaneously with the signal to activate dispense motor 200 and similarly, a signal to close outlet valve 147 may be sent earlier, later or simultaneously with the signal to deactivate dispense motor 200, etc. It will be noted that these types of variations may be equally applicable in other portions of various embodiments of the valve sequences as well.

Thus, between time periods 9020 and 9030 fluid may be dispensed from multi-stage pump 100. Depending on the recipe being implemented by multi-stage pump 100, the viscosity of the fluid being dispensed or other factors, the rate of operation of dispense motor 200 may be variable between time periods 9020 and 9030 (for example, in each of segments 2-6) such that differing amounts of fluid may be dispensed at different points between time periods 9020-9030. For example, dispense motor may operate according to a polynomial function such that dispense motor 200 operates more quickly during segment 2 than during segment 6 and commensurately more fluid is dispensed from multi-stage pump 200 in segment 2 than in segment 6. After the dispense segment has occurred, at time 9030 a signal is sent to stop dispense motor 200 after which at time 9040 a signal is sent to close outlet valve 147.

It should be noted that there may be some delay between entering a ready segment and a dispense segment. As barrier valve 135 and isolation valve 130 may be closed when multistage pump 100 enters a ready segment, it may therefore be possible to introduce fluid into feed chamber 155 without affecting a dispense of multi-stage pump, irrespective of whether a dispense is initiated before the fill, during the fill or subsequent to this fill. Consequently, between times 9010 and 9050 (for example, segments 2-8) feed chamber 155 may be filled with fluid through the reversal of feed motor 175. More specifically, in one embodiment, inlet valve 125 may have been opened and feed motor 175 operated in a reverse direction while in the ready segment at time 9010 (discussed in more detail below). Thus, throughout a dispense segment, feed chamber 155 may be filled through the reversal of feed motor 175.

To control the filling of feed chamber 155, feed motor 175 may be controlled according to the pressure in feed chamber 155. Specifically, feed motor 175 may be reversed until feed motor 175 reaches its home position where the speed of feed motor 175 is controlled to substantially maintain a desired pressure in feed chamber 155, the pressure in feed chamber 155 being sensed by a pressure transducer coupled to feed chamber 155. For example, while being reversed to its home position the speed of feed motor 175 may be varied, if needed, to substantially maintain a pressure of 10 p.s.i. of vacuum. Though feed chamber 155 is being filled with fluid during a ready segment, this fill in no way effects the ability of multi-stage pump 100 to dispense fluid at any point subsequent to entering the ready segment, as barrier valve 135 and isolation valve 130 are closed, substantially separating feed chamber 155 from dispense chamber 185. Furthermore, any desired fill may continue substantially simultaneously with the dispense of fluid from multi-stage pump 100.

It will be noted that the number of segments or time for which feed motor 175 is reversed may be dependent on a number of other factors, such as the position of feed motor 175 (for example, after a vent segment), whether a separate fill segment has occurred previously (as discussed below), or a number of other factors. Thus, it should be realized that the depiction of the reversal of feed motor 175 in FIG. 33A is one embodiment only and is depicted only to show that the time beginning at time 9010 during the ready segment and ending at time 9050 at the end of the dispense segment may be utilized to fill feed chamber 155, if desired, while if the filling of feed chamber 155 or movement of feed motor 175 is not desired the feed motor 175 may not be reversed at all, or may be reversed for a lesser time period (for example, a fewer number of segments).

More particularly, in one embodiment, a fill may have occurred previously during a ready segment followed by a vent, as described in more detail below, thus a fill occurring during a dispense segment (for example segments 1-8) may only occur if it is desired to compensate for any volume or pressure fluctuations which occurred as the result of a vent segment. As such, no fill may be desired between time 9010 and time 9050 or a small fill may be desired. In this case, though the reversal of feed motor 175 is depicted as occurring between time 9010 and time 9050 it will be noted that the reversal of feed motor may occur for only a portion of this time, and may occur only long enough to accomplish a pressure controlled return to a home position as discussed above. If a fill occurs between time 9010 and time 9050 then, when the desired home position is reached a signal is then sent to stop feed motor 175, after which the fill of feed chamber 155 is ended.

As the operation of feed motor 175 may result in a certain amount of pressure being exerted upon the fluid (especially in cases where a high viscosity fluid is being utilized) as discussed above it may be desirable to allow at least some pressure equalization to occur in feed chamber 155 before subsequent actions are taken. Thus, after feed motor 175 is stopped and before opening isolation valve 130 it may be desirable to ensure that the pressure in feed chamber 155 is substantially near zero p.s.i. A pressure measurement taken using a pressure transducer in feed chamber 155 may therefore be utilized to ensure a desirable pressure exists in feed chamber 155 before at time 9060 a signal is sent to open isolation valve 130. Consequently then as feed motor 175 may be operated during the dispense segment all the way up until time 9050, during a portion of the dispense segment which ends before time 9050 or not at all, it will be noted that the time between the end of the post dispense delay at time 9050 and the opening of isolation valve 130 at time 9060 may vary from a zero time period to a time period which allows for the pressure within feed chamber 155 to reach a desired pressure (which may be on the order of seconds or longer depending upon the fluid being utilized).

Isolation valve 130 is then opened at time 9060 and barrier valve 135 opened at time 9070 in preparation for a filtration segment. To allow the pressure within feed chamber 155 to return substantially to zero p.s.i. (for example, gauge), inlet valve 125 may be left open until time 9080 at which point a signal is sent to close the inlet valve 125. After a certain delay period (which may be no delay, as may all delay periods referenced herein) one or more signals may be sent to activate feed motor 175 in a forward direction and dispense motor 200 in reverse at time 9090 during a filter segment.

In one embodiment a pressure transducer may be utilized to measure the pressure of the fluid and when the pressure transducer indicates that the pressure of the fluid has reached a setpoint the filter segment may commence at time 9090. Embodiments of these, and other, processes are described more thoroughly in U.S. patent application Ser. No. 11/292,559, entitled "System and Method for Control of Fluid Pressure", by George Gonnella and James Cedrone, filed Dec. 2, 2005, U.S. patent application Ser. No. 11/602,465 entitled "System and Method for Valve Sequencing in a Pump" by George Gonnella, James Cedrone, Iraj Gashgaee and Paul Magoon filed Nov. 20, 2006 and U.S. patent application Ser. No. 11/364,286 entitled "System and Method for Monitoring Operation of a Pump", by George Gonnella and James Cedrone which are hereby incorporated by reference.

After the filter segment, a signal is sent to stop dispense motor 200 at time 9102 such that feed motor 175 is left operating in reverse during a post-filter segment which ends when a signal is sent to stop feed motor 175 at time 9110. Substantially, simultaneously, a signal is sent to open inlet valve 125, after which at time 9120 a signal may be sent to open purge valve 140.

Moving now to FIG. 33B, a signal may be sent to close isolation valve 130 at time 9130 and after a suitable delay (which may be no delay) dispense motor 200 may be activated in a forward direction at time 9140 to initiate a purge segment. The purge segment may end at time 9142 when a signal is sent to deactivate dispense motor 200 and, following a suitable delay, a signal may be sent to close the purge valve 140 at time 9150.

During the purge segment (between time 9140 and 9142) fluid may be begin purged back to a reservoir for the fluid (or another location) at a certain pressure setpoint. The diameter or length of the piping involved in the purge segment may not be known. Similarly, then, it may be desired to allow the pressure in dispense chamber 185 to equalize before further actions are taken, as discussed above. Here, after dispense motor 200 is stopped and before closing purge valve 140 it may be desirable to ensure that the pressure in dispense chamber 185 is substantially near zero p.s.i. A pressure measurement taken using pressure transducer 112 in dispense chamber 185 may therefore be utilized to ensure a desirable pressure exists in dispense chamber 185 before at time 9150 a signal is sent to close purge valve 140. Again this time period may vary from a zero time period to a time period which allows for the pressure within dispense chamber 185 to reach a desired pressure.

At time 9160, then, a signal is sent to activate dispense motor 200 and the feed motor 175 in a reverse direction for a certain amount of time. More particularly, dispense motor 200 is activated to ensure that the pressure within dispense chamber 185 is at a desired setpoint. While in FIG. 33B the dispense motor 200 has been depicted as being activated in reverse the direction of the activation of dispense motor 200 will depend on the pressure in dispense chamber 200 as measured by pressure transducer 112 and a desired setpoint. After the activation of dispense motor 200 (if activation of dispense motor 200 is desired at all) a signal is sent at time 9170 to deactivate the dispense motor 200 to begin a fill segment. During this fill segment feed motor 175 continues to operate in reverse until at time 9180 a signal is sent to deactivate feed motor 175 and end the fill segment.

This fill segment may last (for example, the time between time 9170 and 9180) long enough to allow at least a portion of a desired volume of fluid into feed chamber 155. As discussed above, to control the filling of feed chamber 155, feed motor 175 may be controlled according to the pressure in feed chamber 155. Specifically, during the fill segment feed motor 175 may be reversed until feed motor 175 reaches its home position (or another position) where the speed of feed motor 175 is controlled to substantially maintain a desired pressure in feed chamber 155, the pressure in feed chamber 155 being sensed by a pressure transducer coupled to feed chamber 155. For example, while being reversed to its home position the speed of feed motor 175 may be controlled, if needed, to substantially maintain a pressure of 10 P.S.I. of vacuum.

It will be noted that the time consumed by the fill segment or the time for which feed motor 175 is reversed may be dependent on a number of other factors, such as the position of feed motor 175 or a number of other factors. Thus, it should be realized that the fill segment depicted in FIG. 33B is one embodiment only and is depicted to show that beginning at time 9170 during this fill segment (for example, segment 23) feed chamber 155 may be at least partially filled if desired.

As discussed above, as the operation of feed motor 175 may result in a certain amount of pressure being exerted upon the fluid (especially in cases where a high viscosity fluid is being utilized) it may be desirable to allow at least some pressure equalization to occur in feed chamber 155 before subsequent actions are taken. Thus, after feed motor 175 is stopped and before opening vent valve 145 it may be desirable to ensure that the pressure in feed chamber 155 is substantially near zero p.s.i. A pressure measurement taken using a pressure transducer in feed chamber 155 may therefore be utilized to ensure a desirable pressure exists in feed chamber 155 before at time 9190 a signal is sent to open vent valve 145. It will be noted that the time between the end of fill segment at time 9180 and the opening of vent valve 145 at time 9190 may vary from a zero time period to a time period which allows for the pressure within feed chamber 155 to reach a desired pressure.

In any event, after the fill segment ends at time 9180 plus a suitable delay a signal may be sent at time 9190 to open vent valve 145, followed by a signal at time 9200 to open isolation valve 130. Inlet valve 125 may then be signaled to close at time 9202. A signal can then be sent to feed motor 175 at time 9210 to activate feed motor 175 in a forward direction for a vent segment. While barrier valve 135 has been depicted as being closed during the vent segment, barrier valve 135 may be open during vent segment to allow monitoring of the pressure of fluid within multi-stage pump 100 by pressure transducer 112.

To end the vent segment, a signal is sent at time 9220 to deactivate feed motor 175. If desired, between time 9220 and 9230 a delay may be taken to allow the pressure of the fluid to suitably dissipate, for example, if the pressure of the fluid during the vent segment is high or the fluid is of a high viscosity. The time period between time 9220 and 9230 may be used, in one embodiment, to zero pressure transducer 112.

At time 9230, then, a signal is sent to open inlet valve 125 followed by a delay to allow inlet valve 125 to open. A signal is sent at time 9240 to close isolation valve 130, and, after a suitable delay to allow isolation valve 130 to close, a signal is sent at time 9250 to close vent valve 145. A suitable delay is allowed so that vent valve 145 may close completely after which, at time 9260 if it is desired to fill feed chamber 155 for any reason at time 9260 a signal may be sent to operate feed motor 175 in reverse. At time 9270 then a ready signal may be asserted indicating the multi-stage pump 100 is once again ready to perform a dispense. As there may be some delay between entering a ready segment and a subsequent dispense of fluid from multi-stage pump the pressure may vary in dispense chamber 185 during this delay. To control the pressure in the dispense chamber 185 during this delay it may be helpful to utilize methodologies such as those discussed in U.S. patent application Ser. No. 11/292,559, entitled "System and Method for Control of Fluid Pressure", by George Gonnella and James Cedrone, filed Dec. 2, 2005, U.S. patent application Ser. No. 11/602,465 entitled "System and Method for Valve Sequencing in a Pump" by George Gonnella, James Cedrone, Iraj Gashgaee and Paul Magoon filed Nov. 20, 2006 and U.S. patent application Ser. No. 11/364,286 entitled "System and Method for Monitoring Operation of a Pump", by George Gonnella and James Cedrone which are hereby incorporated by reference.

Thus, embodiments provide a pumping apparatuses with gentle fluid handling characteristics of high viscosity fluids. By allowing pressure equalization to occur at certain places in the operation of multi-stage pump 100, sequencing the opening and closing of valves and/or the activation of motors within a pumping apparatus, potentially damaging pressure variations can be avoided or mitigated. Embodiments can also employ other pump control mechanisms and valve linings to help reduce deleterious effects of pressure on a high viscosity process fluid.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the disclosure. It is to be understood that the forms of the disclosure shown and described herein are to be taken as the presently preferred embodiments. Elements and materials may be substituted for those illustrated and described herein, parts and processes may be reversed, and certain features of the disclosure may be utilized independently, all as would be apparent to one skilled in the art after having the benefit of this description of the disclosure. Changes may be made in the elements described herein without departing from the spirit and scope of the disclosure as described in the following claims.

What is claimed is:

1. A multi-stage pump comprising:
   a dispense block defining a pump inlet flow path, a pump outlet flow path, at least a portion of a feed chamber and at least a portion of a dispense chamber, a flow path from the feed chamber to a first dispense block filter port and a flow path from a second dispense block filter port to the dispense chamber;
   a feed stage diaphragm movable in the feed chamber;
   a dispense stage diaphragm movable in the dispense chamber;
   a feed stage piston contacting the feed stage diaphragm;
   a dispense stage piston contacting the dispense stage diaphragm;
   a feed stage motor coupled to the feed stage piston;
   a dispense stage motor coupled to the dispense stage piston;
   a quick change filter manifold configured to allow replacement of filters without screws, the quick change filter manifold comprising spaced guides rotatable relative to the dispense block;
   a noncompliant disposable filter for high viscosity fluid in a flow path between the feed stage and the dispense stage, the noncompliant disposable filter comprising:
     a bowl portion at least partially defining a filter cavity sized to fit between the spaced guides;
     a head portion compatible with the quick change filter manifold, the head portion sized to rest on the spaced guides and the head portion comprising an inlet port and an outlet port, wherein the inlet port is configured to mate with the first dispense block filter port and the outlet port is configured to mate with the second dispense block filter port, and wherein the spaced guides are configured to rotate to couple and decouple the noncompliant disposable filter from the dispense block without screws; and
   a set of valves to selectively allow fluid flow through the multi-stage pump.

2. The multi-stage pump of claim 1, wherein the multi-stage pump is noncompliant.

3. The multi-stage pump of claim 1, wherein the multi-stage pump comprises a unitary dispense block formed of a single piece of material.

4. The multi-stage pump of claim 3, wherein the dispense block further defines a flow path from a third filter port to an outlet and the head portion defines a vent port configured to mate with the third filter port.

5. The multi-stage pump of claim 1, wherein the disposable filter exhibits less than a 2 mL change in volume at 65 psi.

6. The multi-stage pump of claim 1, wherein the disposable filter exhibits less than a 1.5 mL change in volume at 65 psi.

7. The multi-stage pump of claim 1, wherein the disposable filter exhibits less than a 0.5 mL change in volume at 65 psi.

8. The multi-stage pump of claim 1, the head portion is bonded to an uppermost edge of the bowl portion.

9. The multi-stage pump of claim 8, wherein the bowl portion comprises an inner portion and an outer portion, wherein the inner portion forms at least one sidewall of the filter cavity and extends above the outer portion to form the uppermost edge of the bowl portion.

10. The multi-stage pump of claim 9, wherein the at least one sidewall is at least 0.375 inches thick.

11. The multi-stage pump of claim 8, wherein the bowl portion comprises a curved bottom portion.

12. The multi-stage pump of claim 8, wherein the disposable filter further comprises a reinforcing structure positioned to reduce compliance of the bowl portion.

13. The multi-stage pump of claim 1, wherein the head portion further comprises a vent port.

14. The multi-stage pump of claim 13, wherein the head portion comprises a curved top surface at least partially defining the filter cavity.

15. The multi-stage pump of claim 14, wherein the curved top surface is angled upwards toward the vent port when the filter is installed.

16. The multi-stage pump of claim 1, wherein the head portion comprises a set of ribs to reduce deflection.

17. The multi-stage pump of claim 1, wherein the head portion comprises a device identification portion shaped and sized to receive an identification device.

18. The multi-stage pump of claim 17, further comprising a wireless identification device disposed in the device identification portion.

19. The multi-stage pump of claim 1, wherein the multi-stage pump is configured to exhibit less than a 2% change in rated volume at 250 psi.

20. The multi-stage pump of claim 1, wherein the noncompliant filter further comprises a cartridge, the bowl portion comprises a groove, the head portion is coupled to the bowl portion and the cartridge, the cartridge is configured to be inserted into the bowl portion and the cartridge comprises an end cap configured to snap in the groove of the bowl portion.

21. The multi-stage pump of claim 1, wherein the inlet flow path, outlet flow path, and flow path from the feed chamber to the first dispense block filter port and a flow path from the second dispense block filter port to the dispense chamber are 0.25 inches in diameter or greater.

* * * * *